(12) United States Patent
Hon

(10) Patent No.: US 7,104,064 B2
(45) Date of Patent: Sep. 12, 2006

(54) SOLAR POWER STATION

(76) Inventor: Wai Man Hon, Flat F, 24th Floor, Tower 1, Ocean Court, Praya Road, Aberdeen, Hong Kong (CN)

( * ) Notice: Subject to any disclaimer, the term of this patent is extended or adjusted under 35 U.S.C. 154(b) by 0 days.

(21) Appl. No.: 11/200,970

(22) Filed: Aug. 10, 2005

(65) Prior Publication Data

US 2006/0118104 A1    Jun. 8, 2006

Related U.S. Application Data

(63) Continuation-in-part of application No. 11/001,862, filed on Dec. 2, 2004.

(51) Int. Cl.
*B60K 16/00* (2006.01)
(52) U.S. Cl. ................ 60/641.8; 60/641.11; 60/641.15
(58) Field of Classification Search ............... 60/641.8, 60/641.9, 641.11, 641.15
See application file for complete search history.

(56) References Cited

U.S. PATENT DOCUMENTS

| | | | |
|---|---|---|---|
| 4,601,282 A | | 7/1986 | Mountain .................... 126/440 |
| 5,127,822 A | * | 7/1992 | Nakayama et al. ........... 431/10 |
| 6,123,067 A | | 9/2000 | Warrick ....................... 126/593 |
| 2006/0017809 A1 | * | 1/2006 | Carroll ........................ 348/158 |

FOREIGN PATENT DOCUMENTS

DE    101 17 622 A1    10/2001

* cited by examiner

*Primary Examiner*—Hoang Nguyen
(74) *Attorney, Agent, or Firm*—Alix, Yale & Ristas, LLP

(57) ABSTRACT

A method of operating a solar power station solar power station including a solar panel assembly having multiple towers, a solar panel pivotally mounted to an upper end of each tower, and a control system. Each of the towers has multiple floors and is individually extendable from a bottom position to an extended position. The control system includes a main routine for operating the towers comprising a normal operation subroutine for selectively positioning the towers between the bottom position and the extended position, whereby the solar power panel is positioned for maximum solar collection. A monitor parameter subroutine continually monitors the earthquake and wind sensors. A withdraw towers subroutine initiates withdrawal of the towers to the bottom position when the earthquake sensor or the wind sensor sense a seismic event or a high wind force, respectively, that is likely to damage the solar power station. A recover from event subroutine returns control from the withdraw towers subroutine to the normal operation subroutine when the seismic event or high wind force is no longer likely to damage the solar power station.

15 Claims, 53 Drawing Sheets

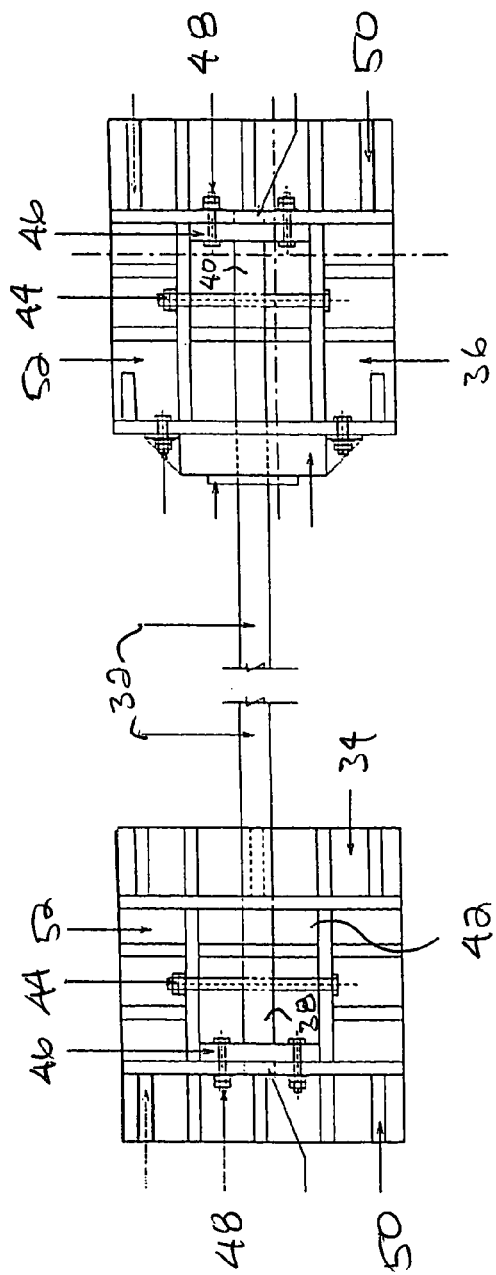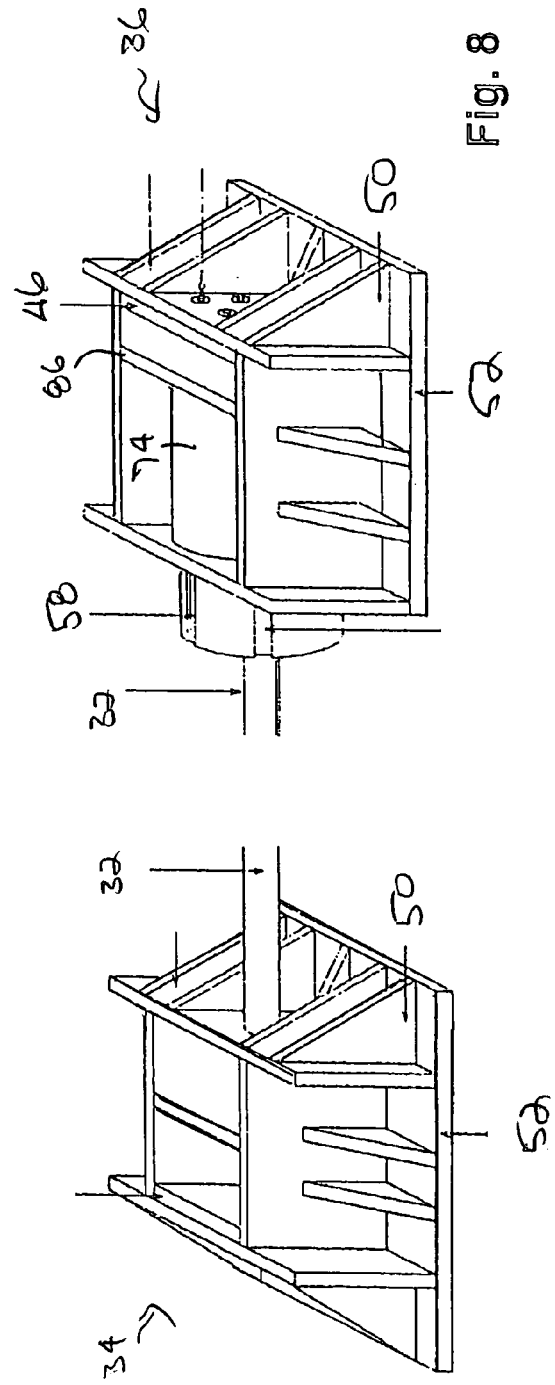

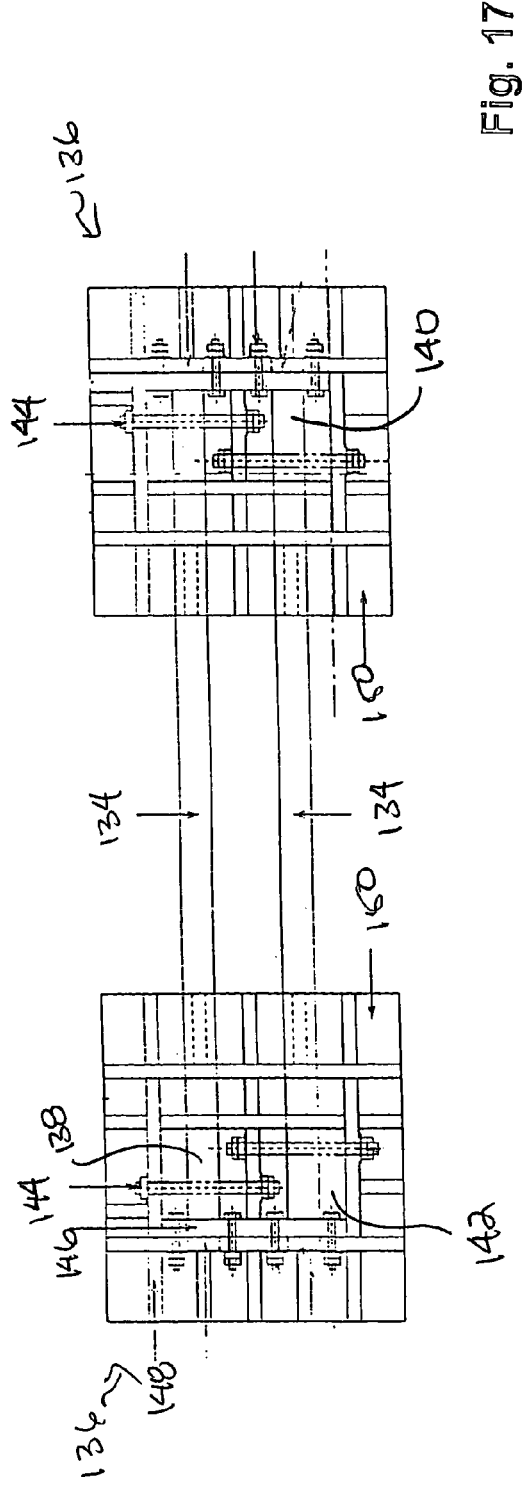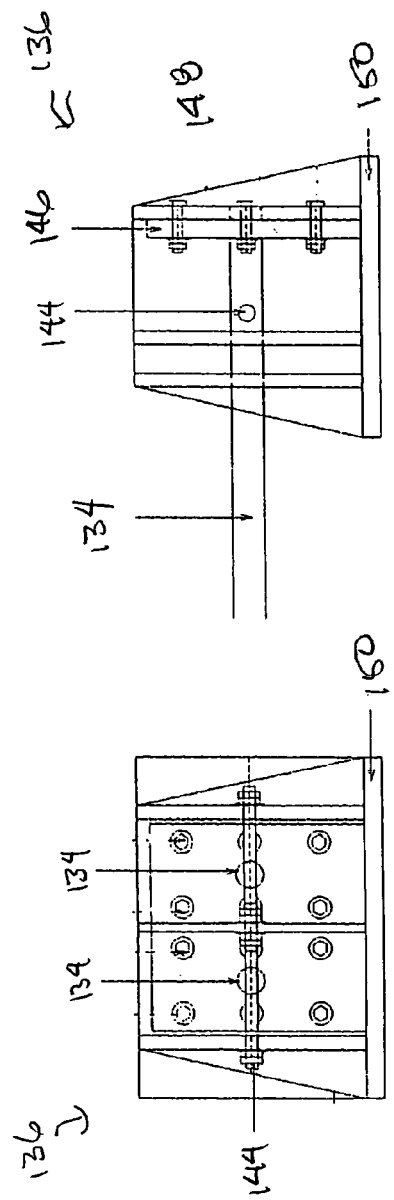

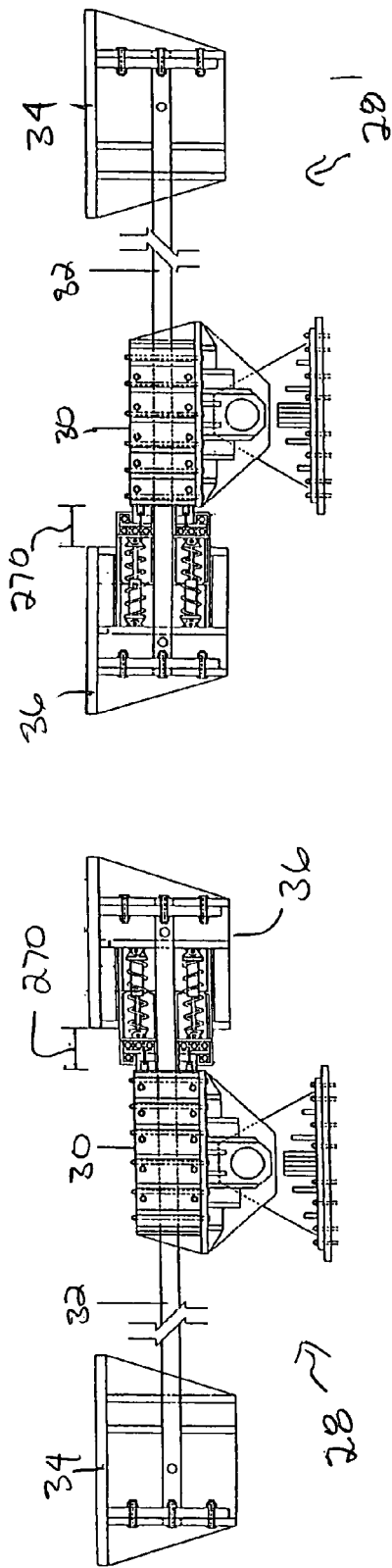
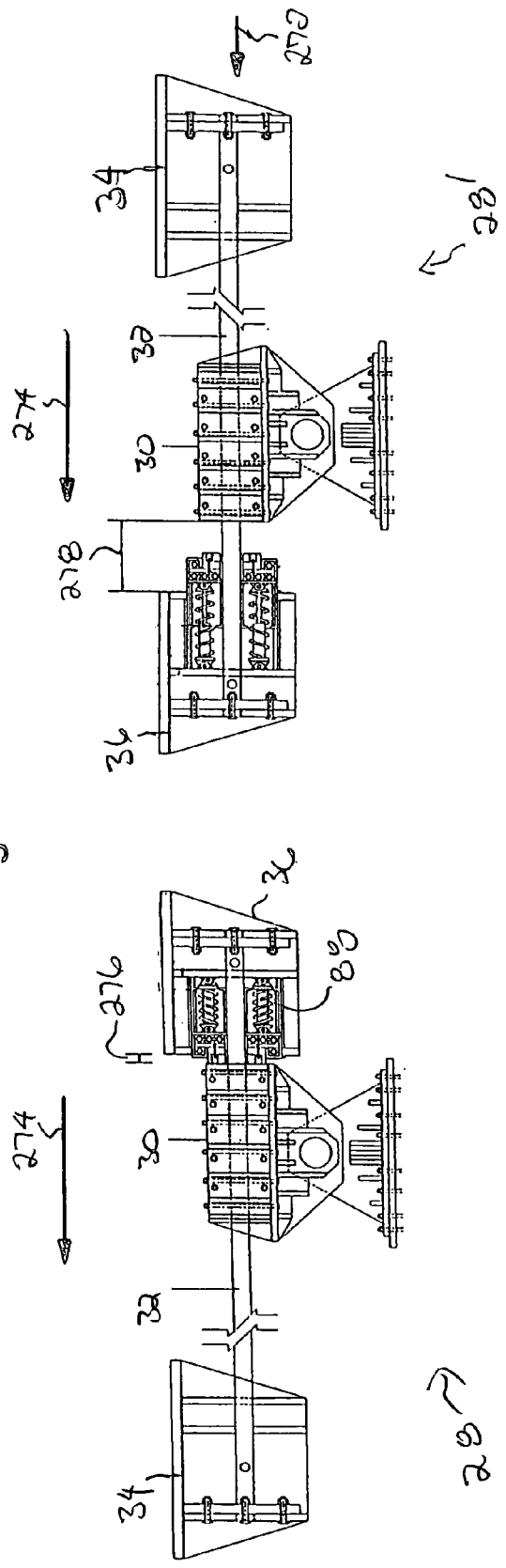
Fig. 27a
Fig. 27b

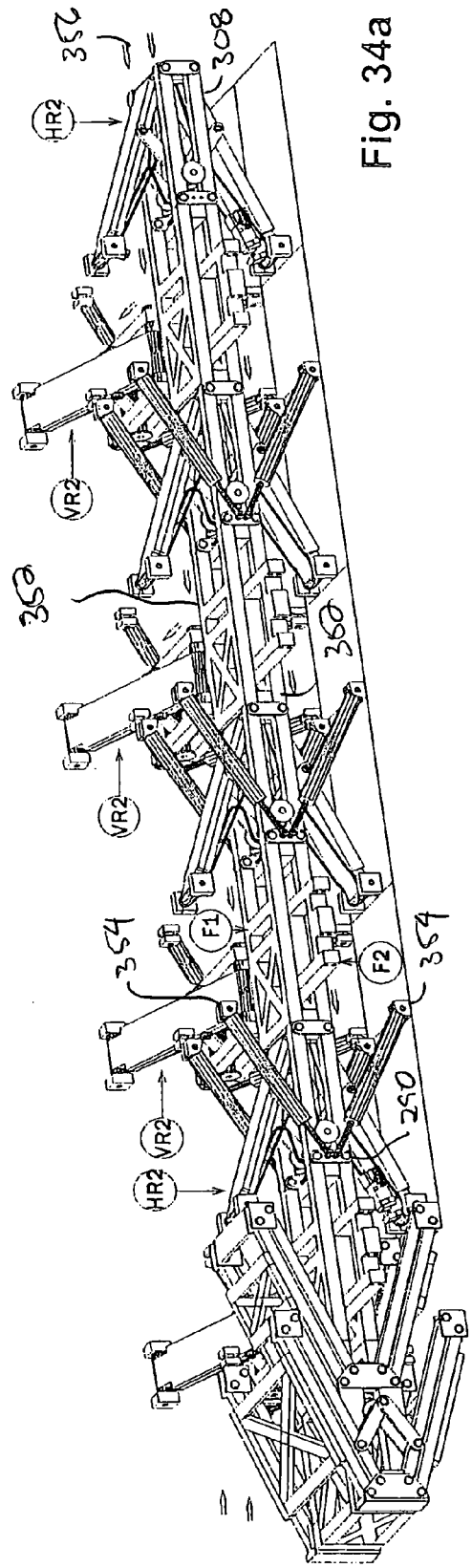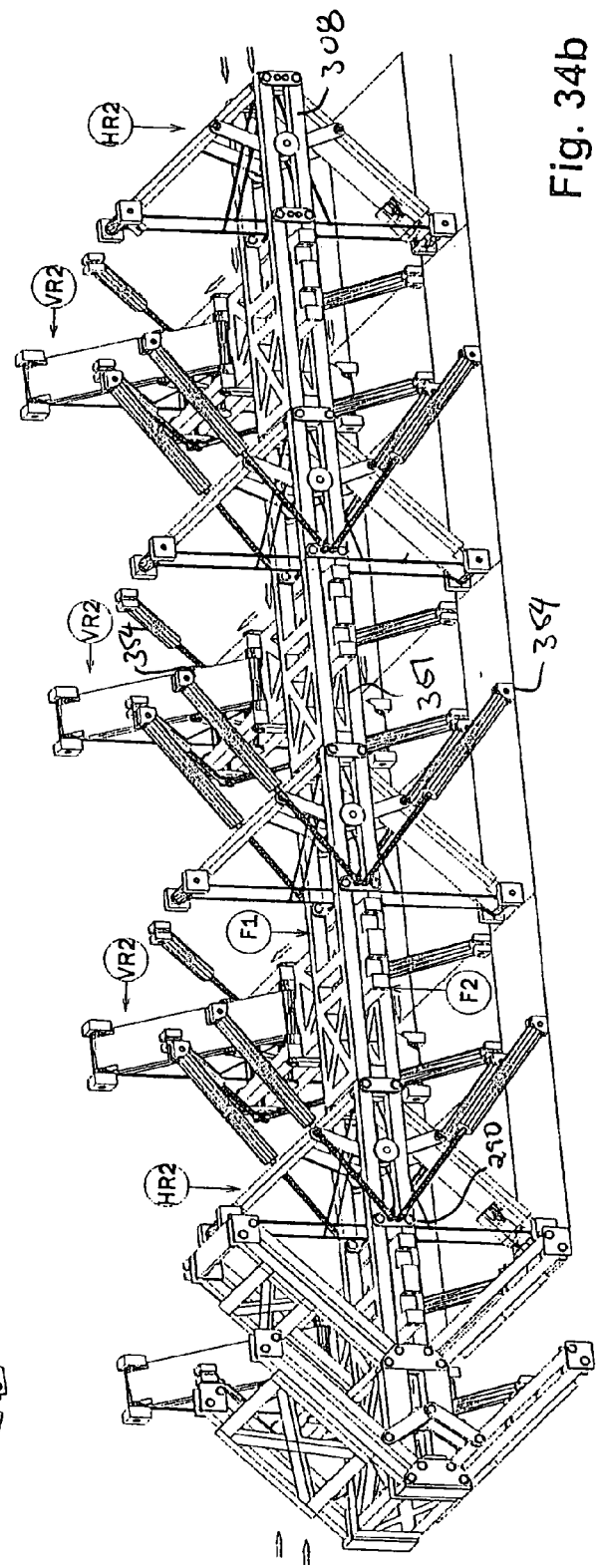
Fig. 34a
Fig. 34b

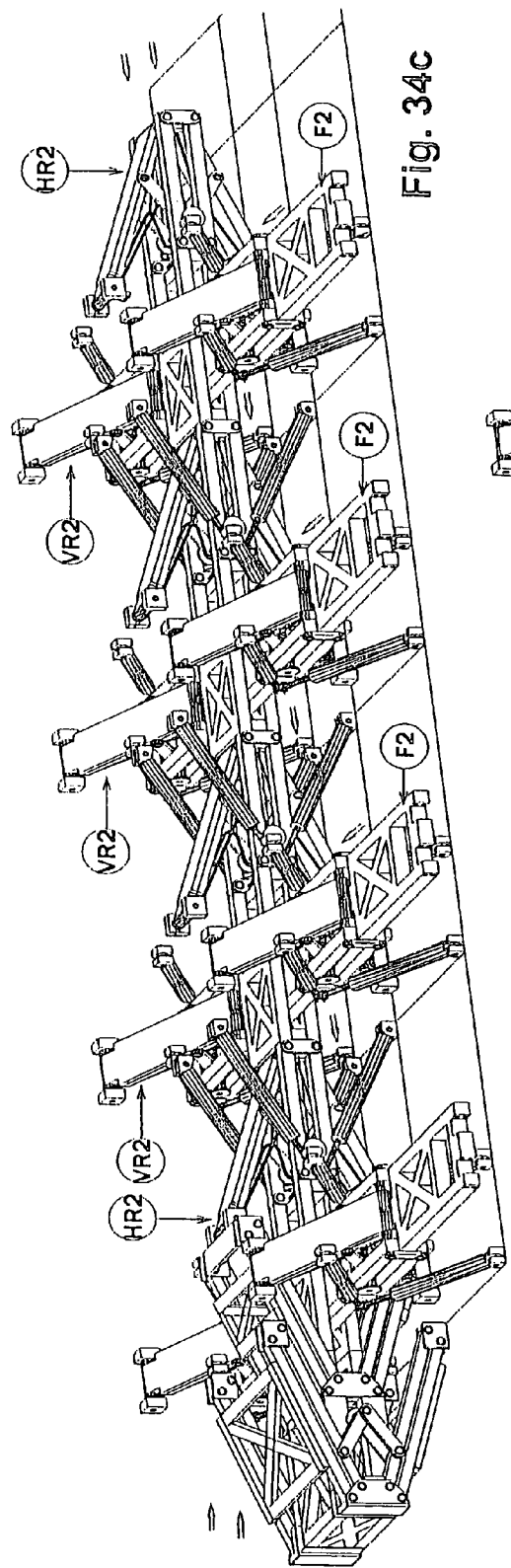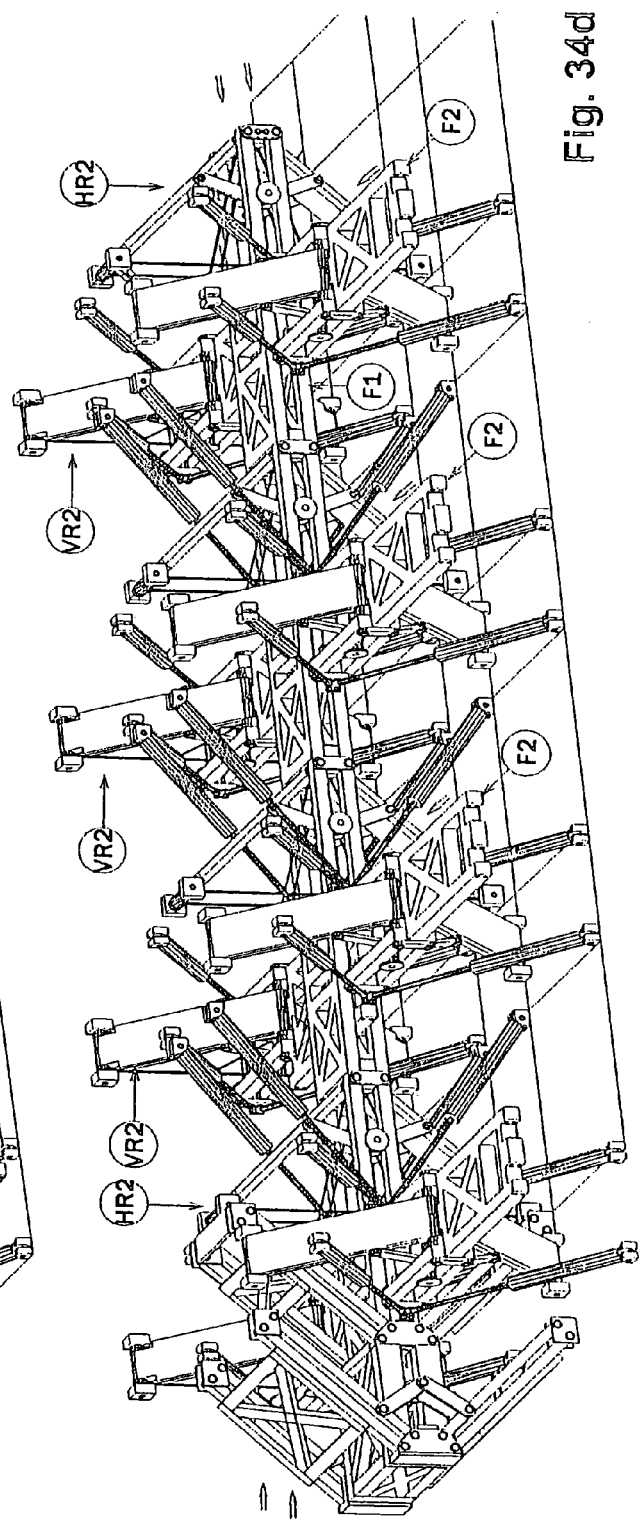

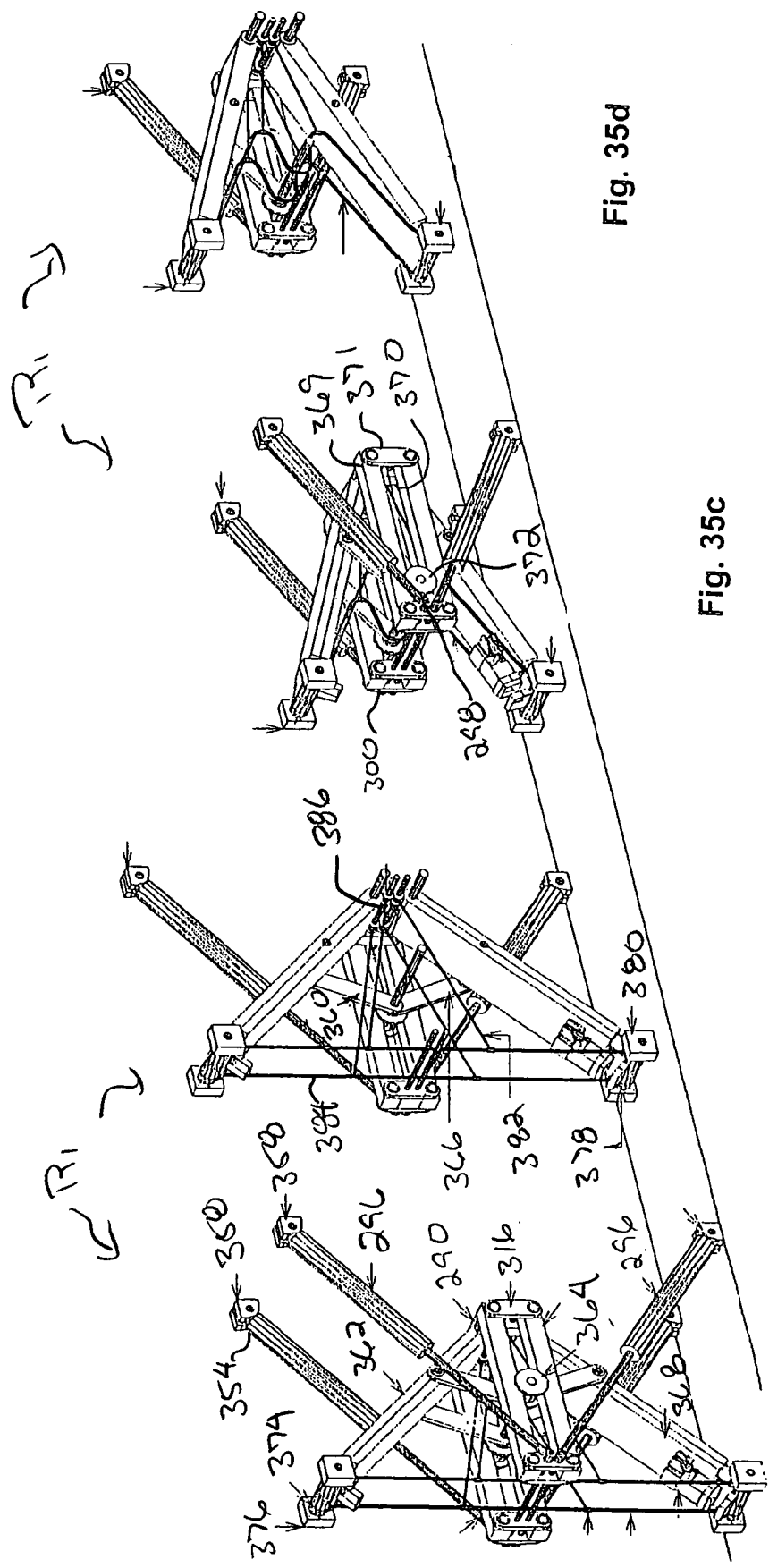

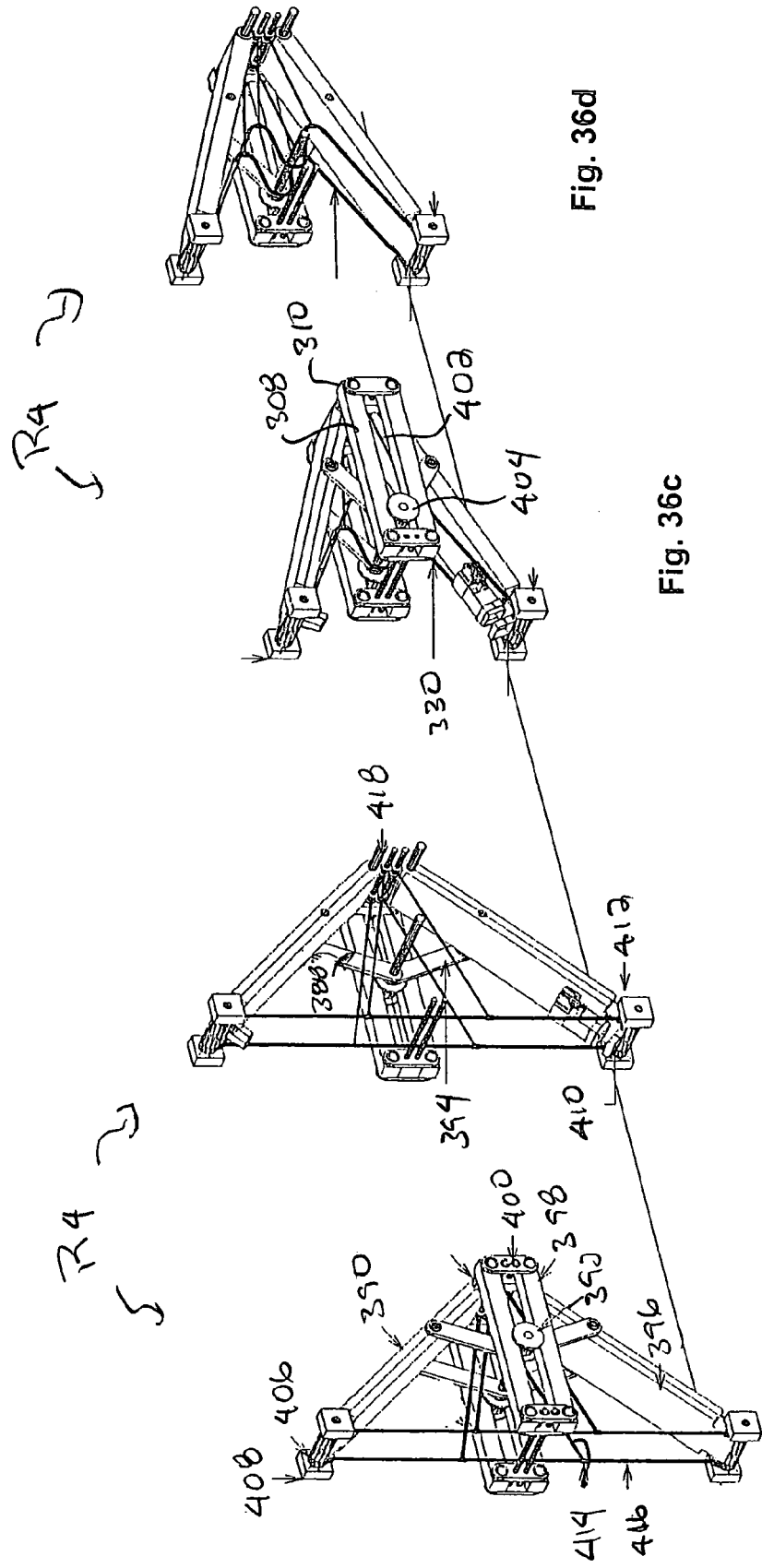

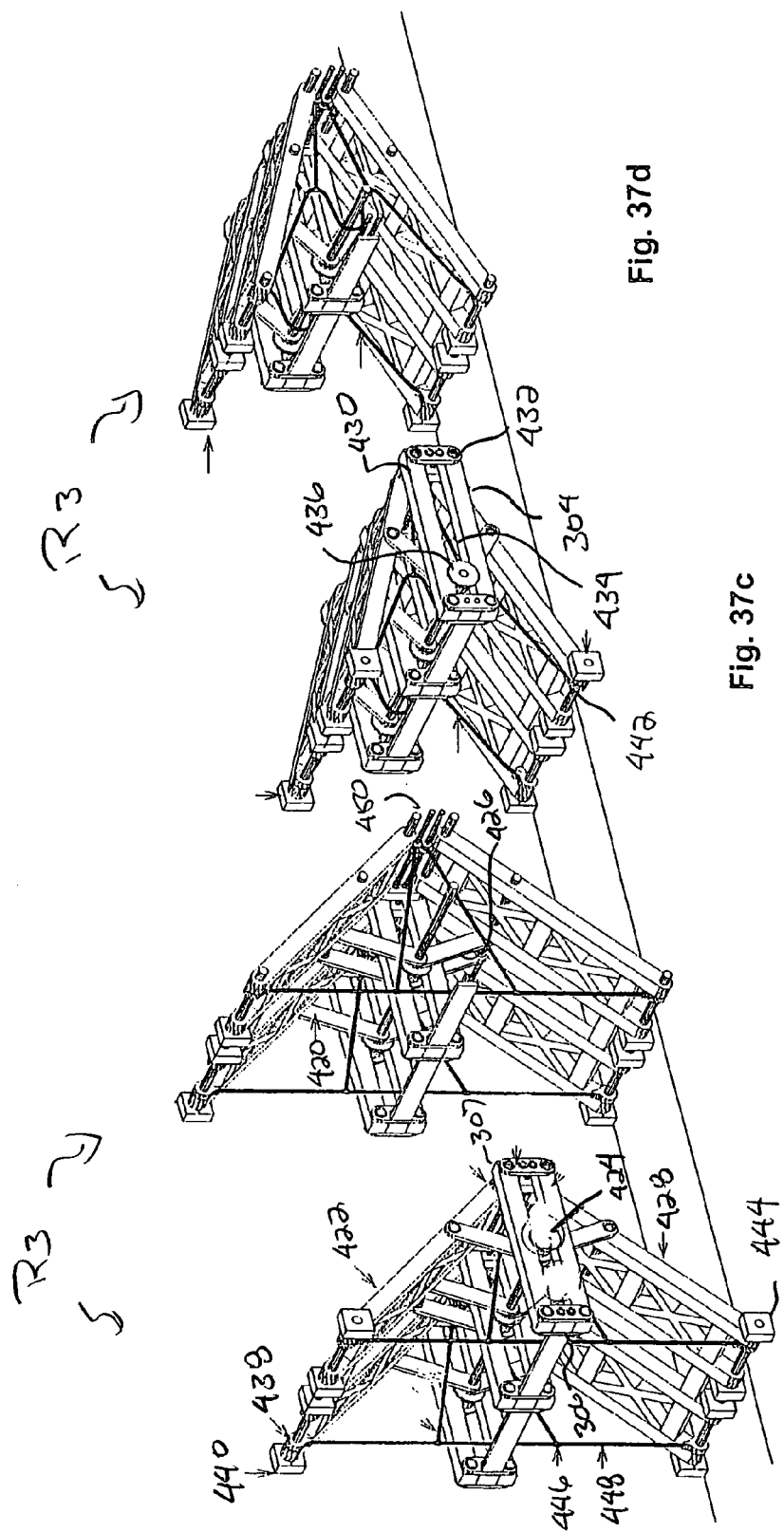

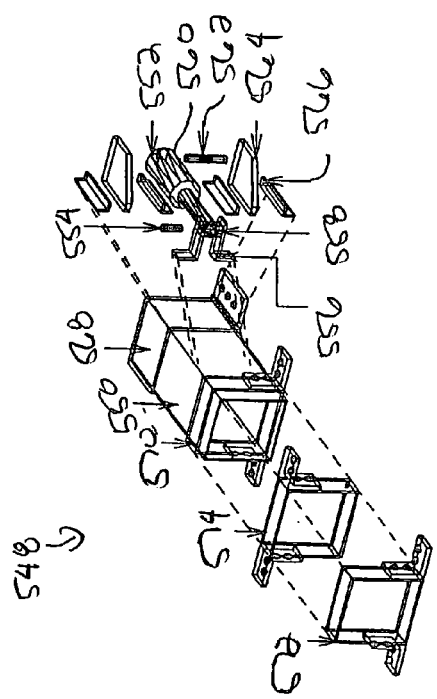

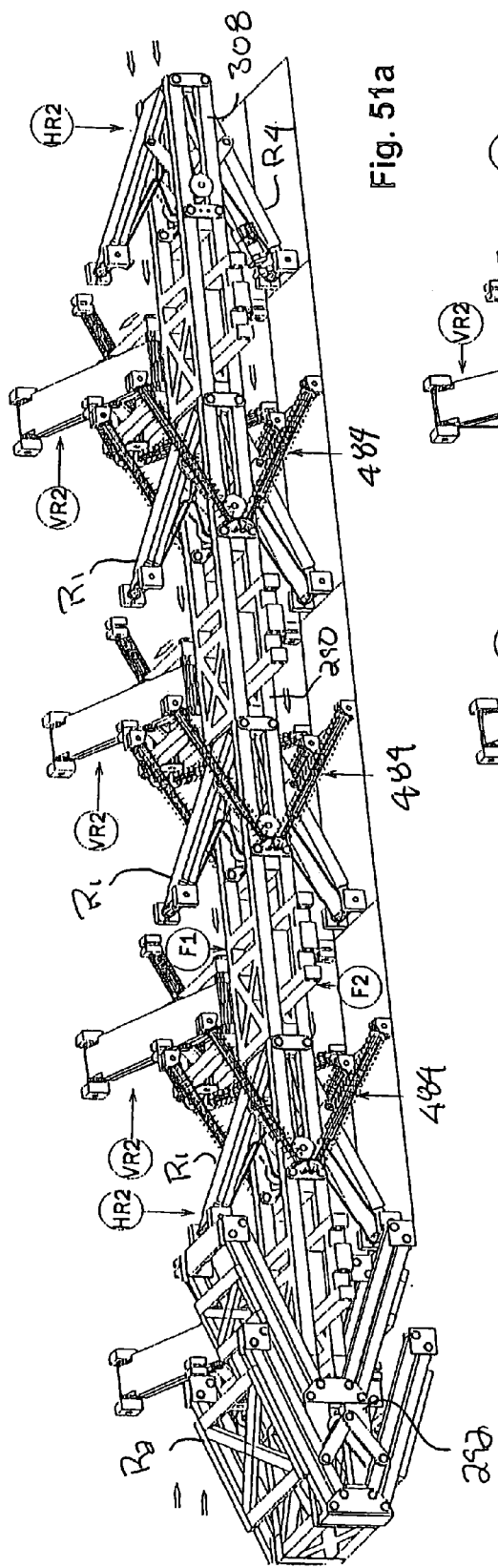
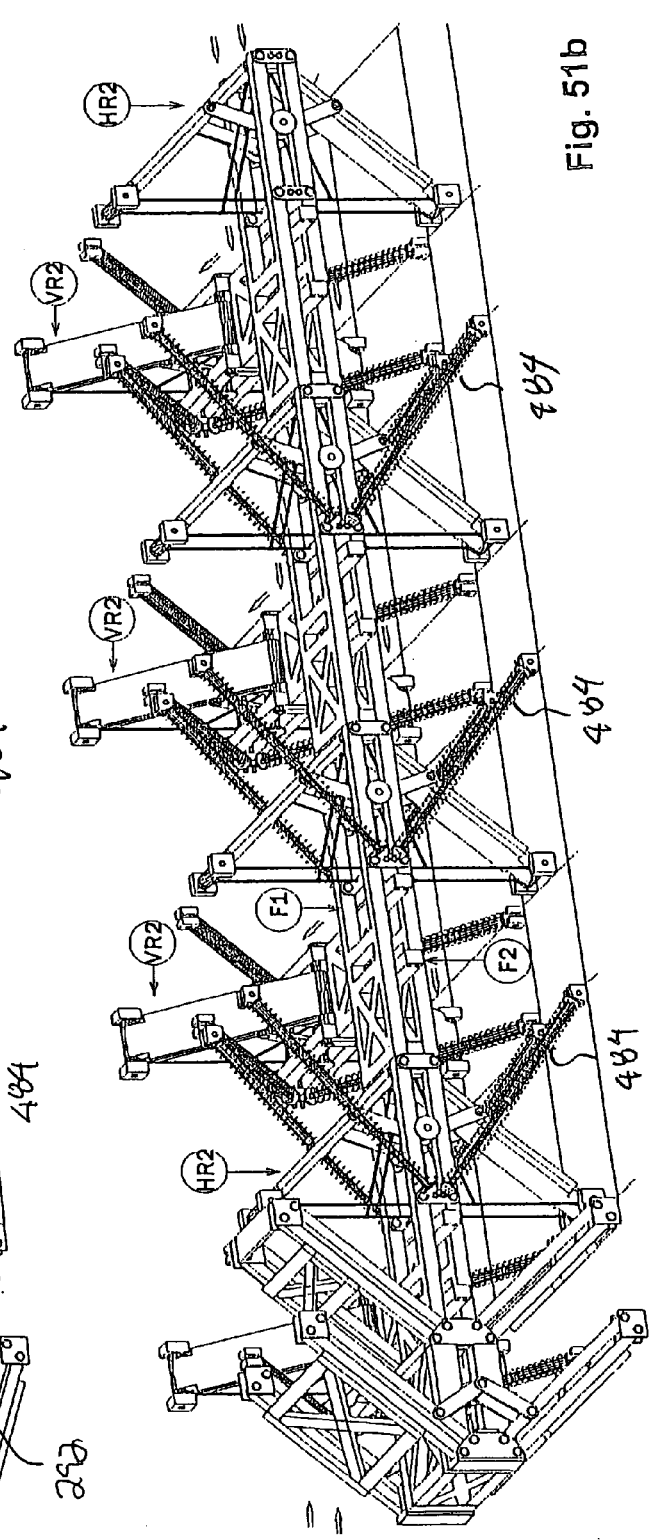
Fig. 51a
Fig. 51b

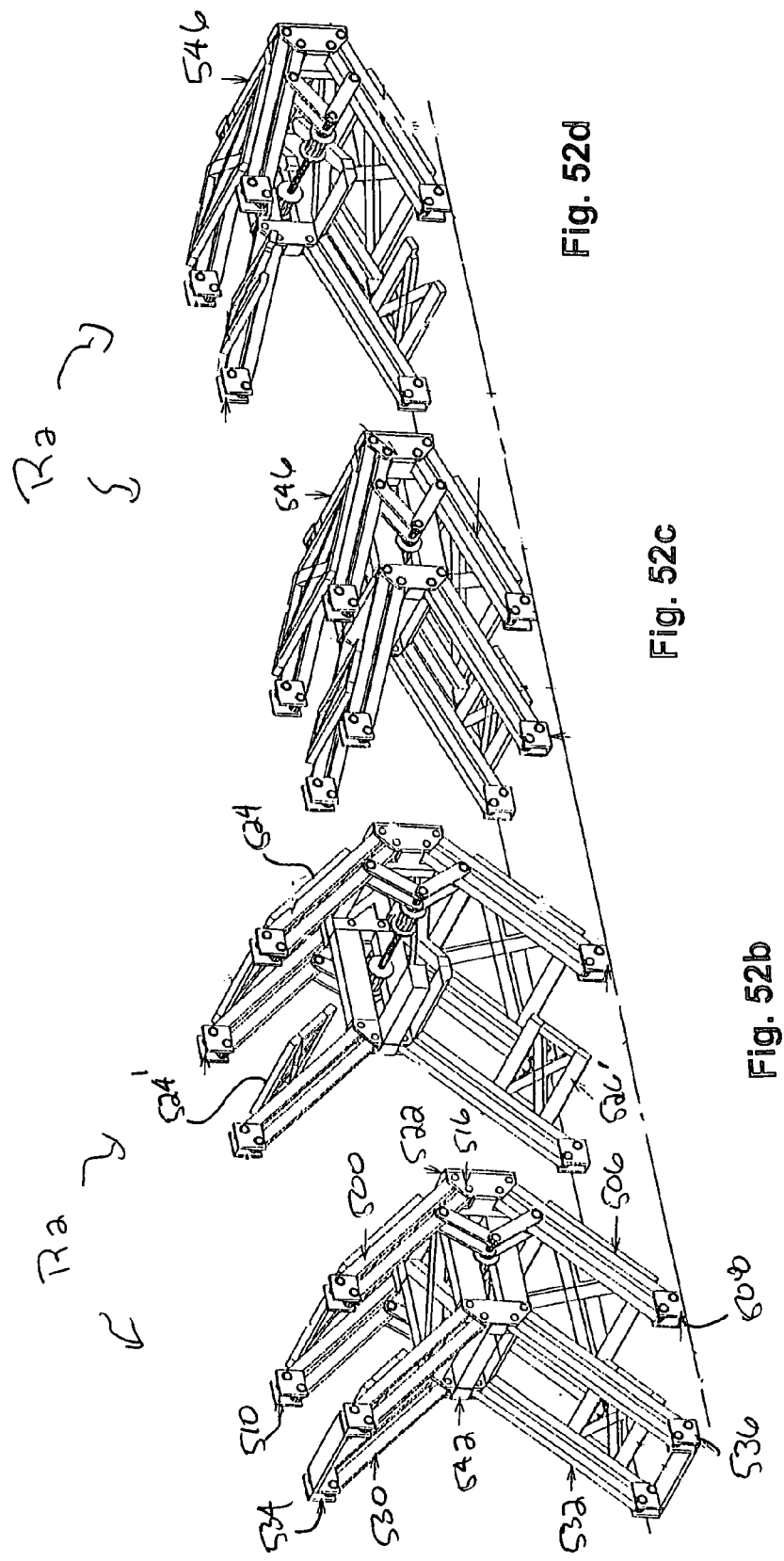

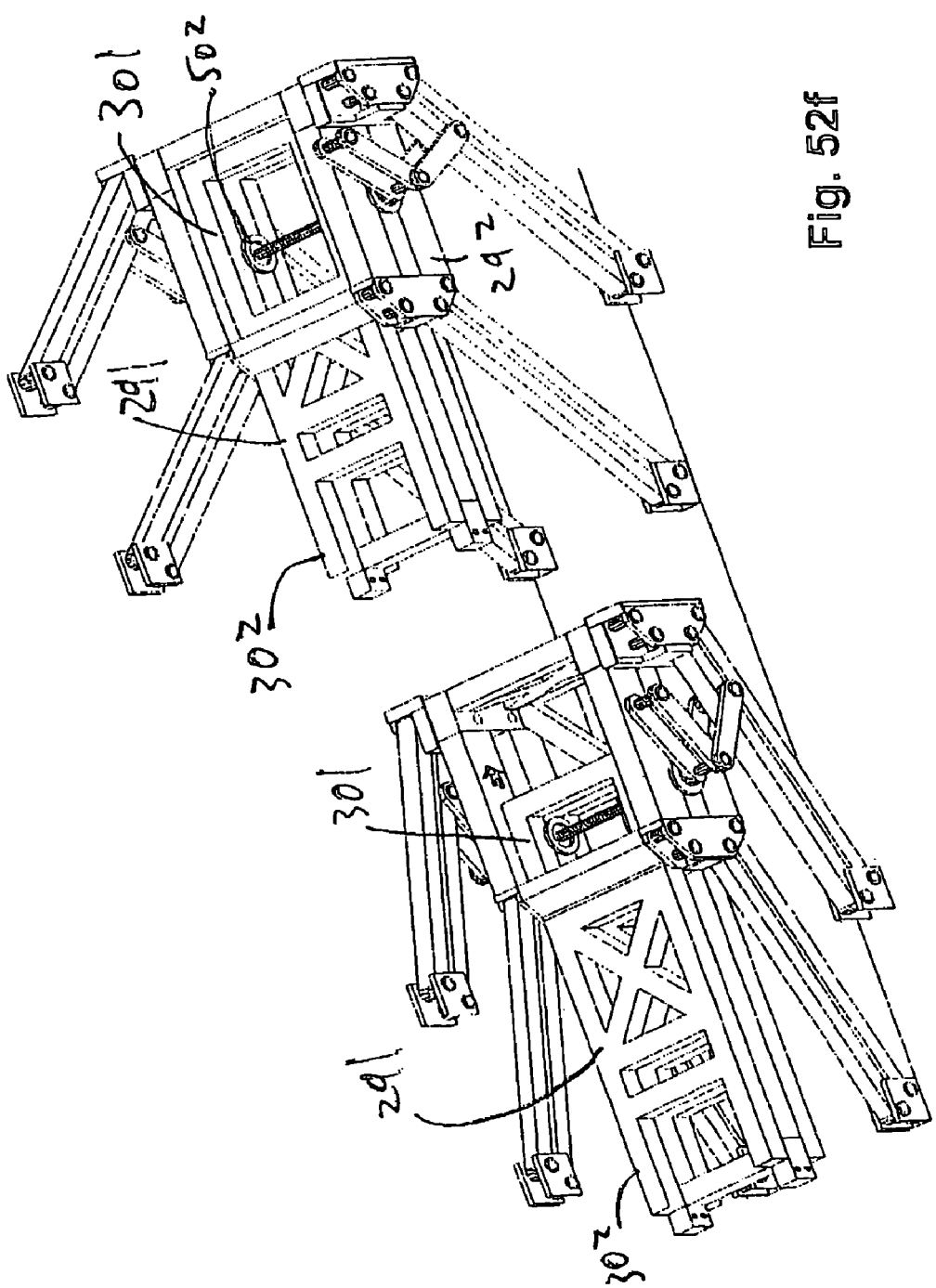

SOLAR POWER STATION

CROSS-REFERENCE TO RELATED APPLICATIONS

This application is a continuation-in-part of copending U.S. patent application Ser. No. 11/001,862 filed Dec. 2, 2004.

BACKGROUND OF THE INVENTION

This invention relates generally to solar power systems. More particularly, the present invention relates to solar power systems having a tracking system for accurately pointing a solar collector at the sun throughout the day.

Early solar power systems included solar tracking systems employing two independent drives to tilt the solar collector about two axes. The first, an elevation axis, allowed the collector to be tilted within an angular range of about ninety degrees between "looking at the horizon" and "looking straight up". The second, an azimuth axis, is required to allow the collector to track from east to west. The required range of angular rotation depends on the earth's latitude at which the solar collector is installed. For example, in the tropics the angular rotation needs more than 360 degrees.

These early solar power tracking systems generally used electric drives having high ratio gear reducers to turn the collector in the direction of the sun. Error in the gear reducers or linkage between the motor and collector, such as backlash and non-linearly, detracted from the accuracy. When high accuracy was required, the gear reducers were very expensive.

These conventional solar power systems occasionally suffered damage from high winds. Thus, it is known to place the solar collector in a wind stow position and avoid damage when winds exceed the design specifications. "Wind stow" is an attitude of the collector that presents the smallest "sail" area to the wind. Generally, a wind sensor was used trigger a command for the elevation actuator to point the collector straight up. The electric elevation actuators and high ratio speed reducers utilized by these systems were very slow to put the collector into wind stow, sometimes taking as long as forty-five minutes. If movement to the wind stow position was initiated at a low threshold value of the wind, to account for the long lead time, the efficiency of the solar power station was adversely affected. If efficiency was optimized by increasing the threshold value of wind required to initiate movement to the wind stow position, a rapidly increasing wind would cause damage to the solar collector.

U.S. Pat. No. 6,123,067 proposed a solar power system that had an exoskeleton structure secured to the rear surface of the solar collection device and that is pivotally secured about a horizontal axis to the front end of an azimuth platform assembly. A hydraulic elevation actuator is pivotally mounted in the azimuth platform assembly about a horizontal axis and the front end of its piston rod is pivotally connected to the rear surface of the solar collection device, allowing the solar collection device to be pivoted approximately 90 degrees between a vertical operating position and a horizontal storage position. Primary and a secondary azimuth hydraulic actuator are used to rotate the collection device for tracking the sun. It was believed that such a tracking system would require less time to move the solar collector to the wind stow position. However, the solar collector of such a solar power system can not be scaled up significantly.

SUMMARY OF THE INVENTION

Briefly stated, the invention in a preferred form is a method of operating a solar power station solar power station including a solar panel assembly having a plurality of towers, a substantially planar solar panel pivotally mounted to an upper end of each tower, and a control system. Each of the towers has multiple floors and is individually extendable from a bottom position to an extended position. The control system includes a computer, at least one earthquake sensor and at least one wind sensor. The computer has a main routine stored therein for operating the towers comprising a normal operation subroutine for selectively positioning the towers between the bottom position and the extended position, whereby the solar power panel is positioned for maximum solar collection. A monitor parameter subroutine continually monitors the earthquake and wind sensors. A withdraw towers subroutine initiates withdrawal of the towers to the bottom position when the earthquake sensor or the wind sensor sense a seismic event or a high wind force, respectively, that is likely to damage the solar power station. A recover from event subroutine returns control from the withdraw towers subroutine to the normal operation subroutine when the seismic event or high wind force is no longer likely to damage the solar power station.

If the computer check subroutine determines that the computer does not appear to be operating properly, the computer initiates an alarm or other signal and initiates computer diagnostics. If computer diagnostics verifies that the computer is not operating properly the computer is placed out of service, the control system is placed in manual control until the computer is repaired and an operator returns control of the control system to the main routine after the computer is repaired.

The monitor parameter subroutine displays the values of any wind or seismic force that is sensed, compares these value of any sensed wind or seismic force to a predetermined setpoint, and queries the computer check and maintenance check subroutines to verify that the computer is operating properly and that maintenance is not being performed if the sensed parameter exceeds the setpoint. If the computer is not operating properly or maintenance is being conducted, an alarm or other signal is initiated to alert personnel to manually initiate an appropriate action. If the computer is operating properly and maintenance is not being conducted, a verify parameter subroutine is initiated to determine the proximity of the sensed wind or seismic force.

If a seismic event has been sensed, the verify parameter subroutine locates the point of highest wave intensity and the epicenter, determines the distance from the solar power station to the point of highest wave intensity and the epicenter, queries the system computer and appropriate personnel to evaluate the intensity of the seismic force to determine the effect on the solar power station and prompts appropriate personnel to make a manual entry to initiate withdrawal of the towers if the evaluation of the seismic event indicates that the seismic force is likely to damage the solar power station. If a high wind force has been sensed, the verify parameter subroutine locates the source of the wind, determines the direction and intensity of the wind force, prompts appropriate personnel to contact a weather bureau to confirm the direction and intensity of the wind force, queries the system computer and appropriate personnel to evaluate the effect of the wind force on the solar power station and prompts appropriate personnel to make a manual entry to initiate withdrawal of the towers if the evaluation of the wind force indicates that the wind force is likely to damage the solar power station.

If the proximity of the wind or seismic force cannot be determined, the verify parameter subroutine compares the measured value of the parameter to the setpoint and exits to a recover from event subroutine if the measured value is less than the setpoint or attempts to determine the proximity of the wind or seismic force and evaluates the effect of the wind or seismic force if the measured value is greater than the setpoint and prompts appropriate personnel to make a manual entry to initiate withdrawal of the towers if the evaluation of the wind or seismic force indicates that the wind force is likely to damage the solar power station.

The withdraw towers subroutine initiates an alarm, stops all normal operation of the control system, determines the position of each floor of each tower with respect to a withdrawn position of the floor and initiates withdrawal of each floor that is not in the withdrawn position. The withdraw towers subroutine also verifies that all of the floors have withdrawn, initiates an alarm if any non-withdrawn floors are detected and prompts appropriate personnel to manually withdraw non-withdrawn floors that are detected. The withdraw towers subroutine further verifies that all of the floors have withdrawn to a level position, initiates an alarm if any non-level floors are detected and prompts appropriate personnel to manually level the non-level floors. The withdraw towers subroutine further locks the floors of each tower in the withdrawn position, verifies that all of the floors are locked, initiates an alarm if any unlocked floors are detected and prompts appropriate personnel to manually lock the unlocked floors.

The recover from event subroutine determines the proximity of the seismic event or high wind source, evaluates whether the seismic event or high wind source is sufficiently far away to preclude damage to the solar power station and exits the recover from event subroutine and initiates the verify parameter subroutine if the seismic event or high wind source is not sufficiently far away to preclude damage to the solar power station, compares a measured value of the seismic event or high wind force to the predetermined setpoint and exits the recover from event subroutine to the verify parameter subroutine if the measured value is greater than the setpoint. If the parameter source is sufficiently far away to preclude damage to the solar power station and the measured value is less than the setpoint, all of the floors of each tower are unlocked. After floors of each tower are unlocked, the recover from event subroutine also verifies that all of the floors are unlocked, initiates an alarm if any locked floors are detected and prompts appropriate personnel to manually unlock the locked floors. If the normal operation program is not running, initiates a normal operation program to position the solar power panel and determines how the solar power panel should be positioned to maximize solar collection.

BRIEF DESCRIPTION OF THE DRAWINGS

The present invention may be better understood and its numerous objects and advantages will become apparent to those skilled in the art by reference to the accompanying drawings in which:

FIG. 7 is an enlarged bottom view of the support box and the support shaft of FIG. 6;

FIG. 8 is an enlarged perspective view of the support box and the support shaft of FIG. 6;

FIG. 18 is a cross-section view taken along line XVIII—XVIII of FIG. 17;

FIG. 19 is a cross-section view taken along line XIX-XIX of FIG. 17;

FIGS. 27a, 27b and 27c are simplified side views, partly in cross-section of the main bearing structure of the first or second tower, with the main bearing structure unexposed to an external horizontal force (FIG. 27a), with the main bearing structure exposed to an external horizontal force from the right (FIG. 27b), and with the main bearing structure exposed to an external horizontal force from the left (FIG. 27c);

FIGS. 34a–34d are enlarged views of one of the intersections of group HR2 and group VR2 of one of the upper floors of FIG. 28, showing the HR2 and VR2 groups withdrawn (FIGS. 34a and 34c) and extended (FIGS. 34b and 34d);

FIGS. 35a to 35c are enlarged views of a robot R1, showing the robot R1 in the extended position (FIG. 35a), showing the robot R1 in the extended position, with one of the horizontal roller frames and corresponding pair of jacks removed (FIG. 35b), showing the robot R1 in the retracted position (FIG. 35c), and showing the robot R1 in the retracted position, with one of the horizontal roller frames and corresponding pair of jacks removed (FIG. 35d);

FIGS. 36a to 36c are enlarged views of a robot R4, showing the robot R4 in the extended position (FIG. 36a), showing the robot R4 in the extended position, with one of the horizontal roller frames and corresponding pair of jacks removed (FIG. 36b), showing the robot R4 in the retracted position (FIG. 36c), and showing the robot R4 in the retracted position, with one of the horizontal roller frames and corresponding pair of jacks removed (FIG. 36d);

FIGS. 37a to 37c are enlarged views of a robot R3, showing the robot R3 in the extended position (FIG. 37a), showing the robot R3 in the extended position, with one of the horizontal roller frames and corresponding pair of jacks removed (FIG. 37b), showing the robot R3 in the retracted position (FIG. 37c), and showing the robot R3 in the retracted position, with one of the horizontal roller frames and corresponding pair of jacks removed (FIG. 37d);

FIG. 40 is an enlarged exploded view of the lock set of the Robot R1/Robot R5 of FIG. 39;

FIG. 41 is an enlarged exploded view of the cable reel of the Robot R1/Robot R5 of FIG. 39;

FIG. 42 is an enlarged view of the cable lock of FIG. 41;

FIG. 43 is an enlarged view of the cable fastener of FIG. 39;

FIG. 51a and 51b are enlarged views of one of the intersections of group HR2 and group VR2 of the ground floor of FIG. 28, showing the HR2 and VR2 groups withdrawn (FIG. 51a) and extended (FIG. 51b);

FIGS. 52a to 52f are enlarged views of a robot R2, showing the robot R2 in the extended position (FIG. 52a), showing the robot R2 in the extended position, with one of the horizontal roller frames and one upper clipper and one lower clipper of the second pair of clipper assemblies removed (FIG. 52b), showing the robot R2 in the retracted position (FIG. 52c), showing the robot R2 in the retracted position, with one of the horizontal roller frames and one upper clipper and one lower clipper of the second pair of clipper assemblies removed (FIG. 52d), showing the robot R2 in the retracted position, with the upper transverse frame removed (FIG. 52e), and showing the robot R2 in the extended position, with the upper transverse frame removed (FIG. 52f);

DETAILED DESCRIPTION OF THE PREFERRED EMBODIMENT

With reference to the drawings wherein like numerals represent like parts throughout the several figures, a solar power station in accordance with the present invention is generally designated by the numeral 10. The solar power station 10 includes three, substantially identical, dynamic steel truss towers 12, 14, 16 supporting a solar panel assembly 18. Supports 20 at the ground floor stabilize and support each of the towers 12, 14, 16. It should be appreciated that the solar panel assembly 18 is positioned to optimize collection of sunlight and that the operating description provided below is for illustration purposes only. The operation of the towers 12, 14, 16 for orienting the solar panel assembly 18 depends on the topography, latitude and longitude of the installation site.

Figure 1:
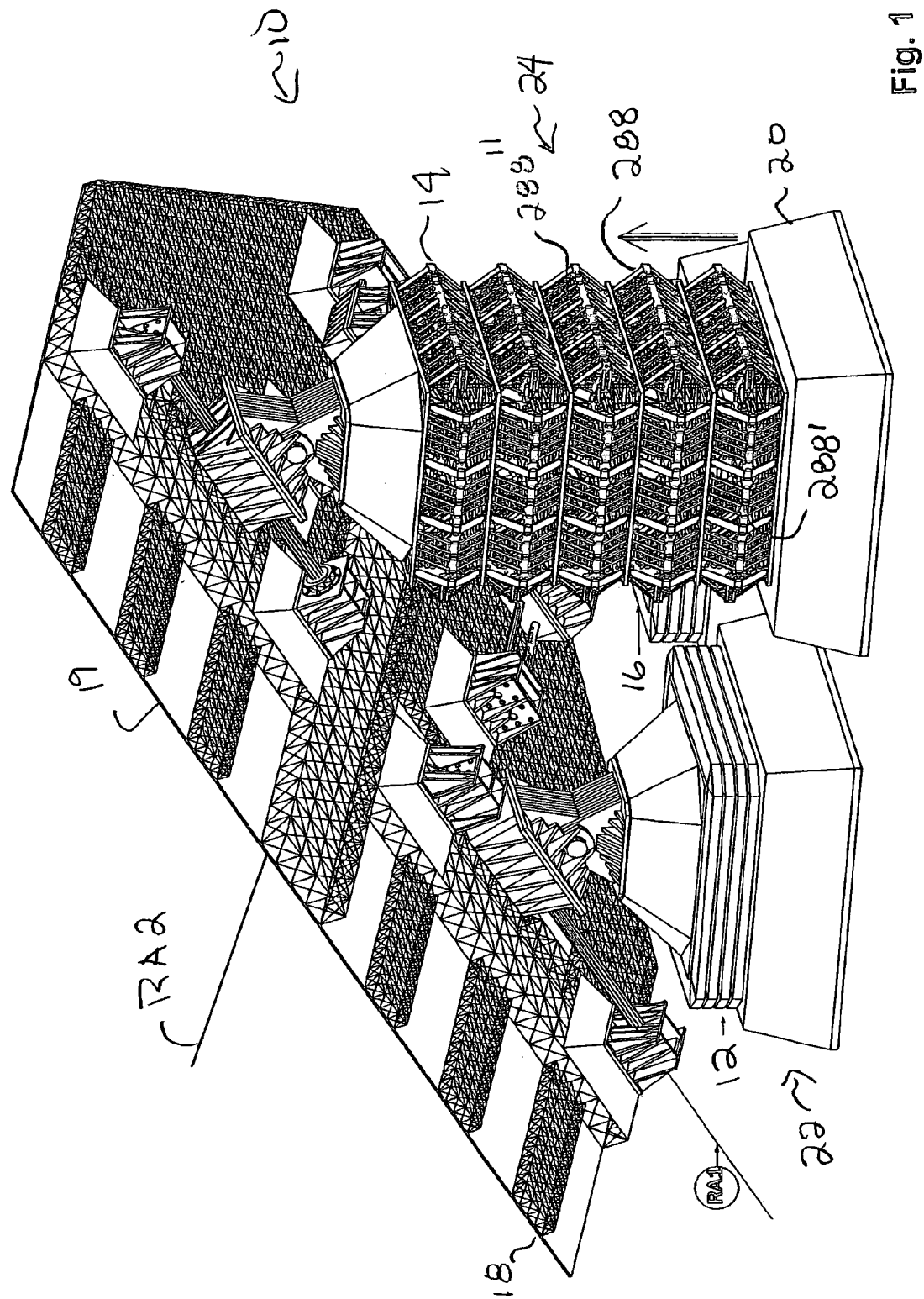
FIG. 1 is a rear perspective view of a solar power station system in accordance with the invention, showing the system positioned for capturing sunlight at sunrise.
Figure 2:
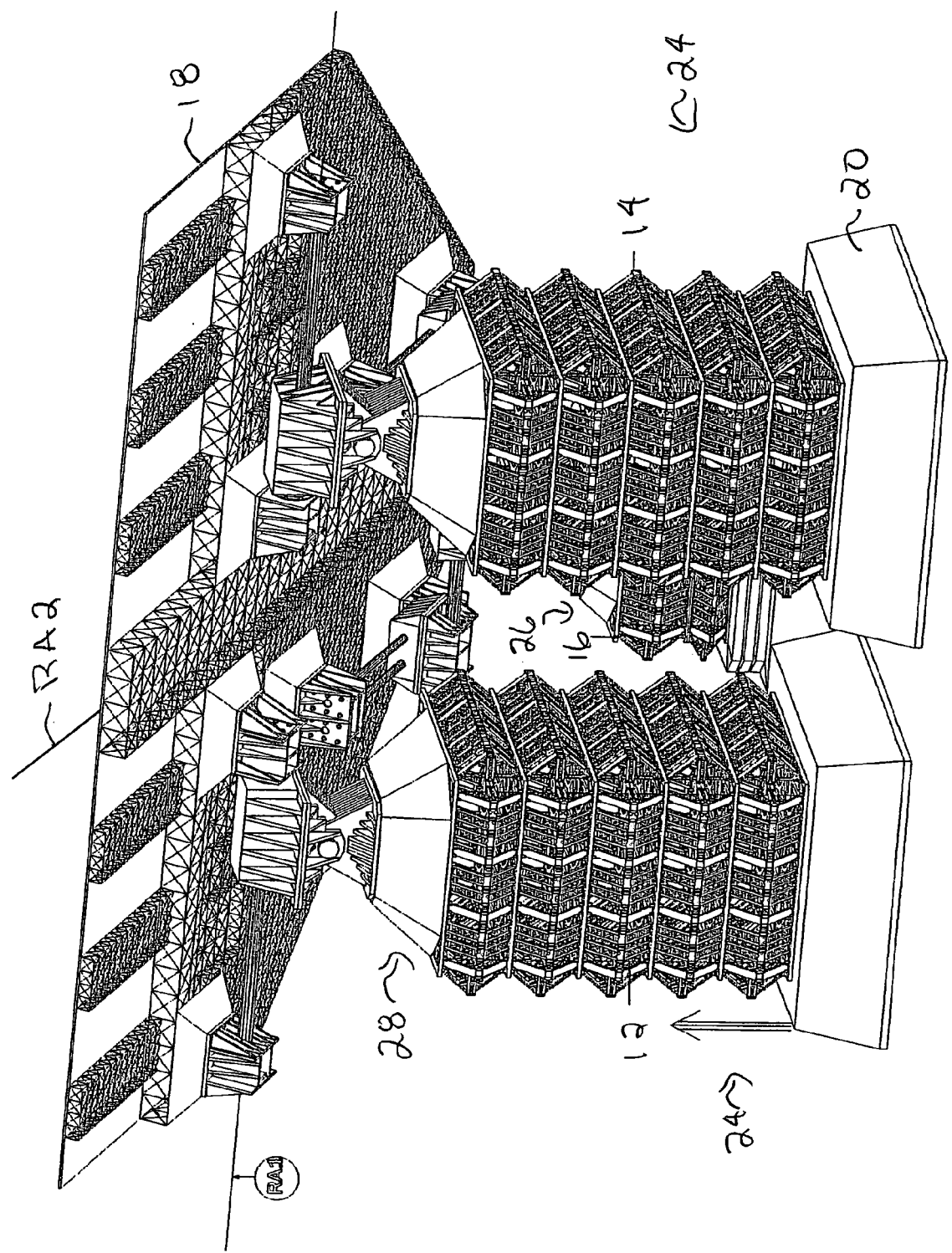
FIG. 2 is a rear perspective view of the solar power station system of FIG. 1, showing the system positioned for capturing sunlight at noon.
Figure 3:
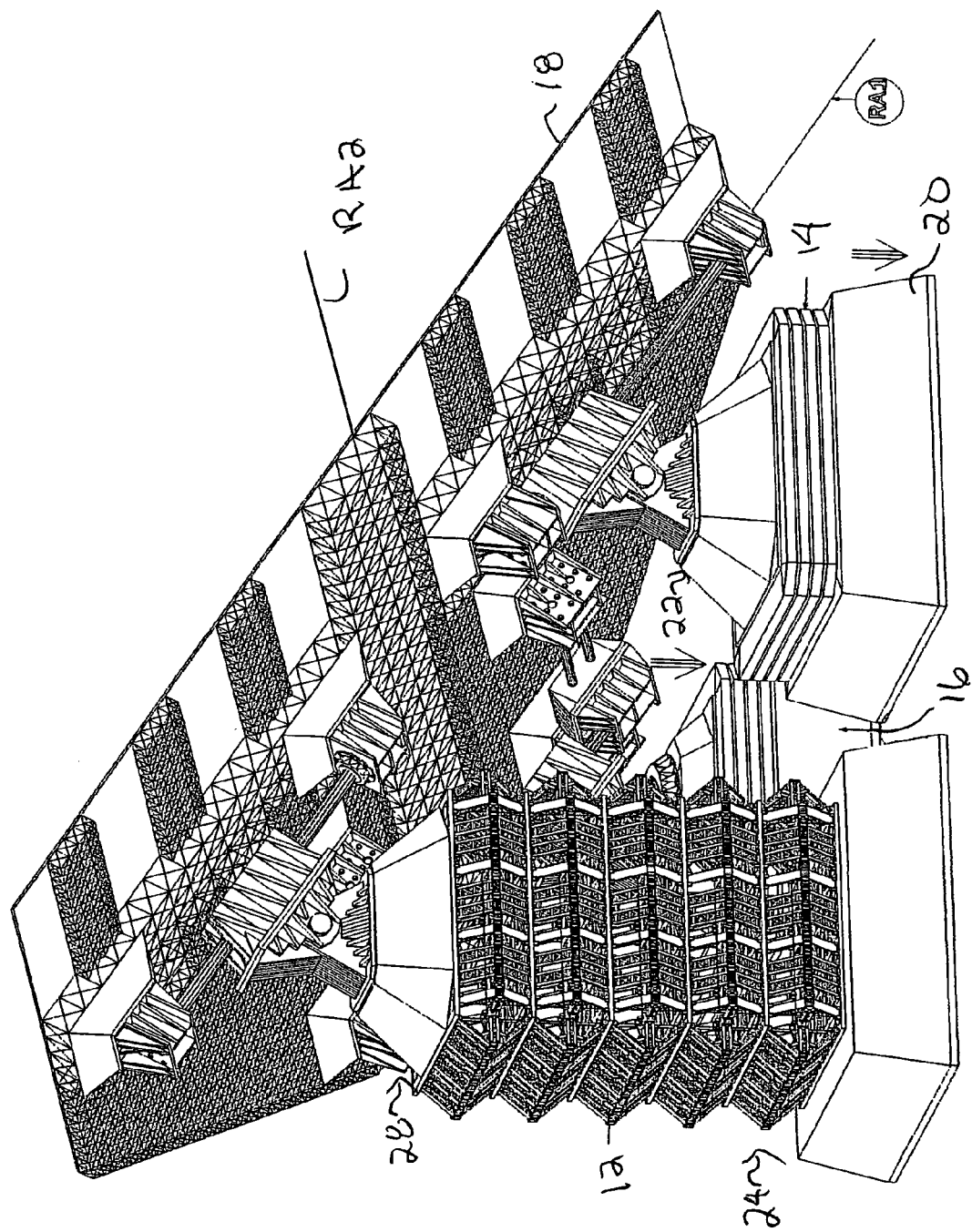
FIG. 3 is a rear perspective view of the solar power station system of FIG. 1, showing the system positioned for capturing sunlight at sundown.

The solar power station 10 shown in FIGS. 1–3 is installed such that the planar solar panel 19 of the solar panel assembly 18 of FIG. 1 is positioned to receive sun light at sunrise, the solar panel assembly 18 of FIG. 2 is positioned to receive sun light at noon, and the solar panel assembly 18 of FIG. 3 is positioned to receive sun light at sundown. To optimize collection of the solar power, the solar panel assembly 18 is positioned perpendicular (or as close as possible) to the direction of the sunlight. To properly position the solar panel assembly 18 at dawn, the first and third towers 12, 16 are at a bottom position 22 and the second tower 14 is at a fully extended position 24. As the sun rises to the noontime position, the first and third towers 12, 16 are extended from the bottom position 22. The first tower 12 is extended at a greater rate than the third tower 16, causing the solar panel assembly 18 to rotate about the longitudinal and lateral axes RA1 and RA2. When the sun is at the noontime position, the first tower 12 has been extended to the fully extended position 24, the third tower 16 has been extended to an intermediate position 26 (between the bottom position 22 and the fully extended position 24), and the second tower 14 has been held fixed in the fully extended position 24. As the sun falls to sundown, the second and third towers 14, 16 are withdrawn from the fully extended position 24 and the intermediate position 26, respectively. The second tower 14 is withdrawn at a greater rate than the third tower 16, causing the solar panel assembly 18 to further rotate about axis RA1 and RA2. At sundown, the second and third towers 14, 16 have been withdrawn to the bottom position 22 and the first tower 12 has been held fixed in the fully extended position 24.

Figure 4:
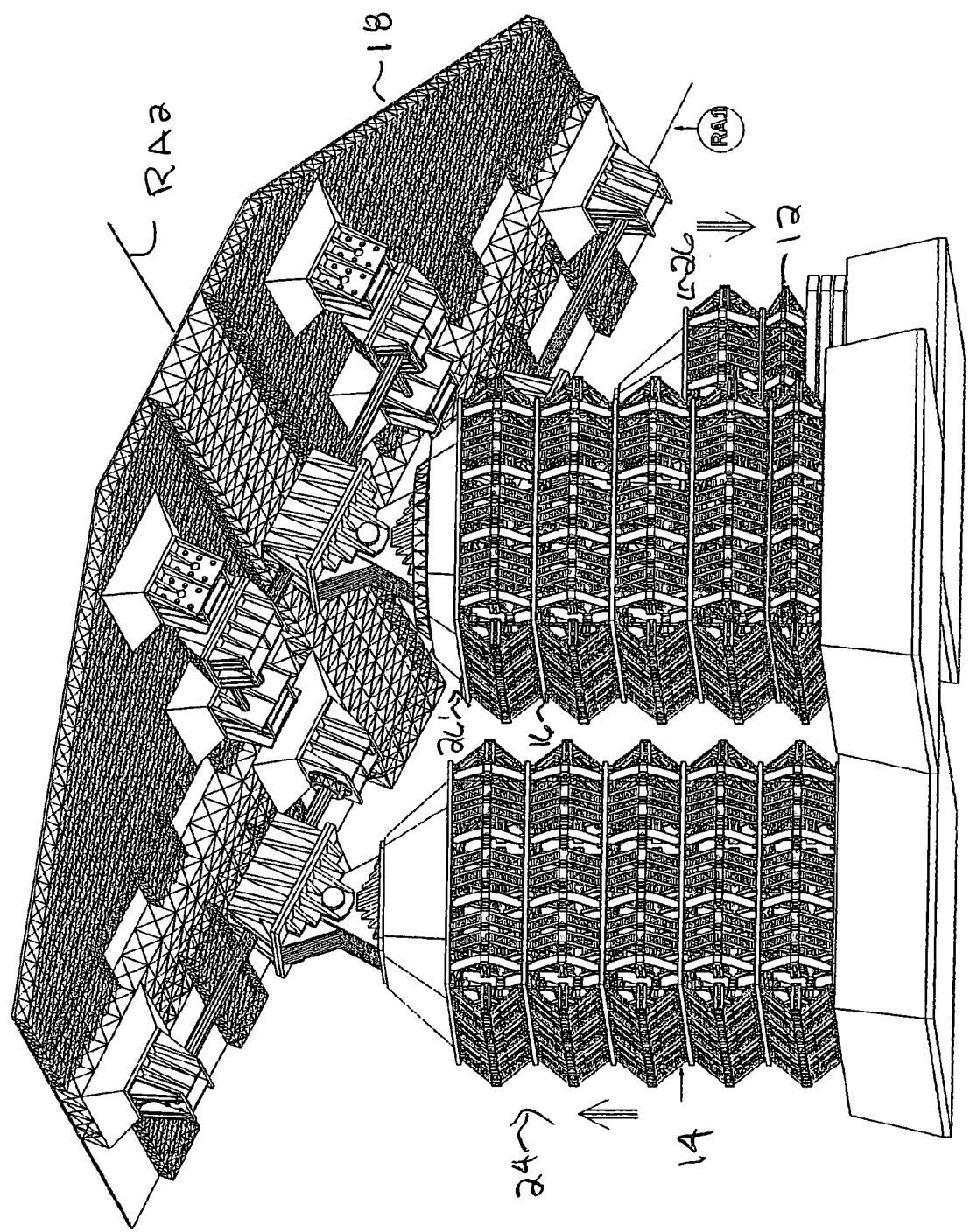
FIG. 4 is a front perspective view of the solar power station system of FIG. 1, showing the system being positioned in a first direction of rotation.
Figure 5:
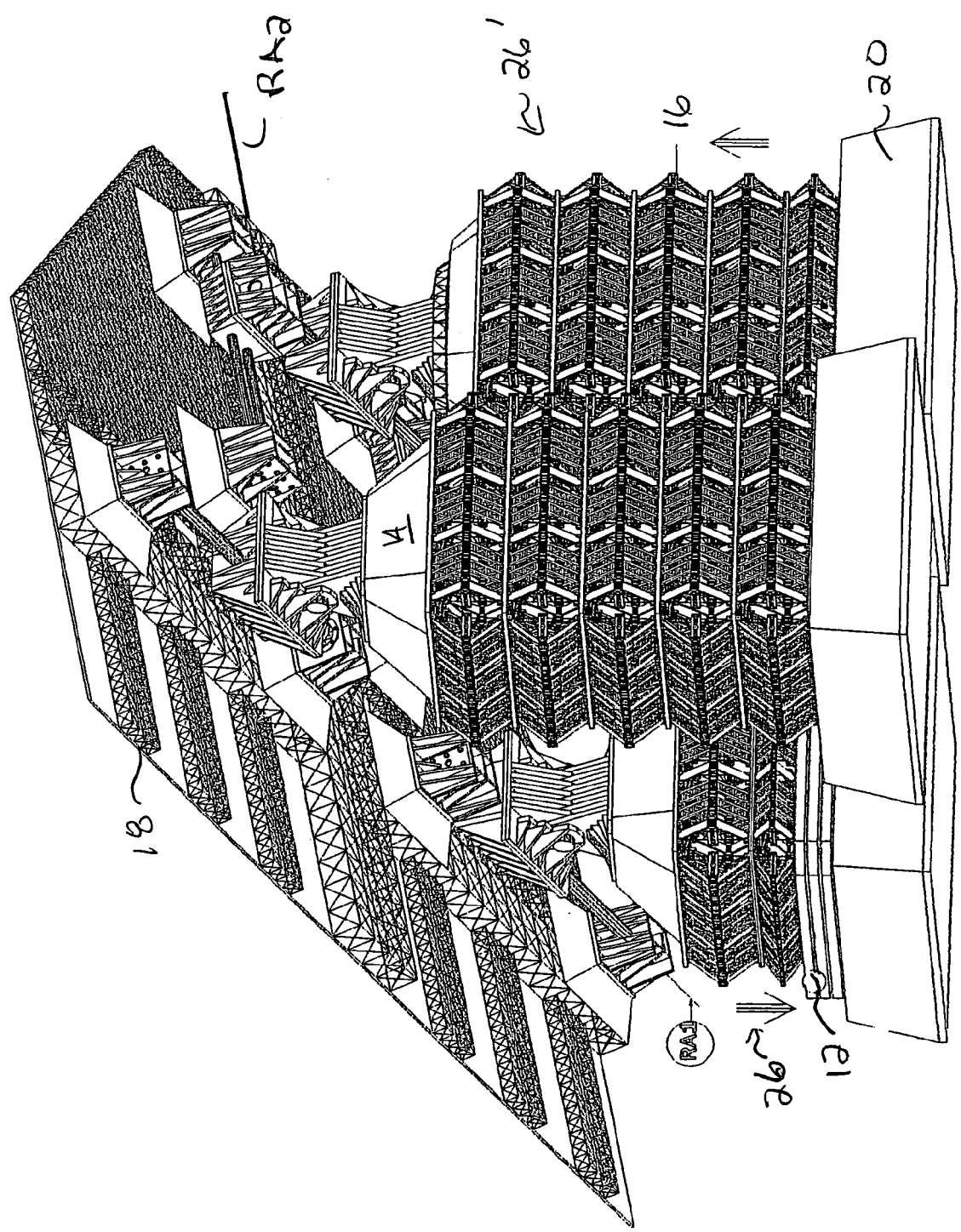
FIG. 5 is a side perspective view of the solar power station system of FIG. 4.
Figure 6:
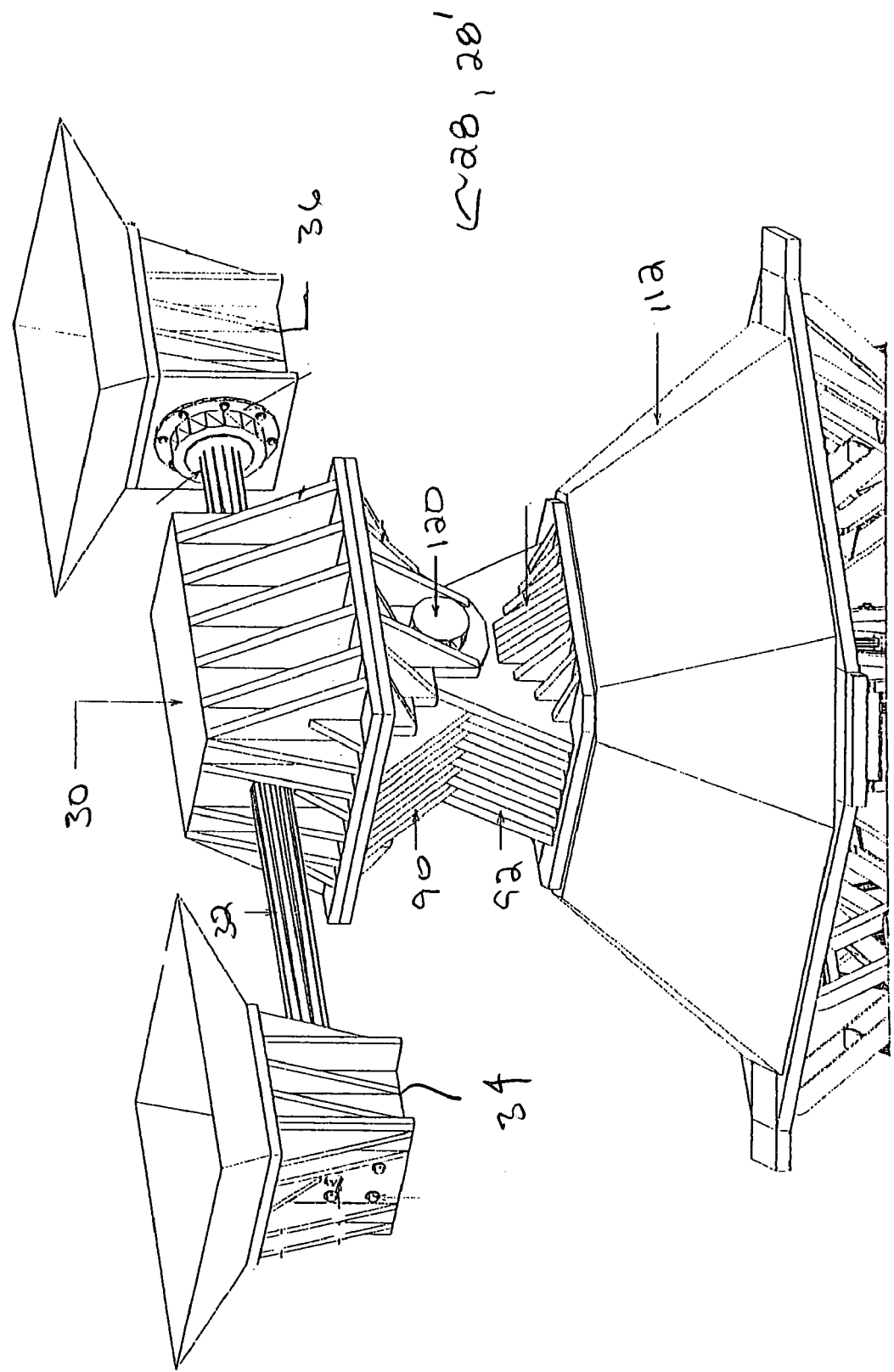
FIG. 6 is an enlarged perspective view of the support box, the support shaft, and the slide bearing box of the first or second towers of FIG. 1.
Figure 9:
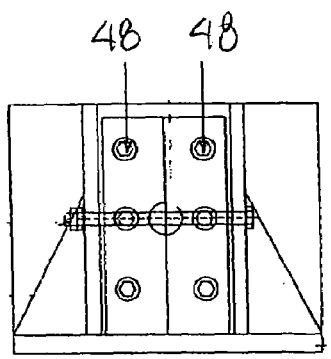
FIG. 9 is a cross-section view taken along line IX—IX of FIG. 7.

FIGS. 4 and 5 illustrate operation of the towers 12, 14, 16 to orient the solar panel assembly 18 substantially opposite to the solar panel assembly 18 shown in FIGS. 1–3 for a site location where the light path to the solar power station 10 is opposite to that shown in FIGS. 1–3. In FIGS. 4 and 5, the second tower 14 is positioned at the fully extended position 24, the first tower 12 is positioned at a first intermediate position 26 (proximate to the bottom position), and the third tower 16 is positioned at a second intermediate position 26' (proximate to the fully extended position). FIGS. 1–5 also illustrate the range of motion that may be required to optimize exposure of the solar panel assembly 18 of a solar power station 10 installed on a moveable object, for example a ship.

The main bearing structures 28, 28' of the first and second towers 12, 14 are best illustrated by referring FIGS. 6–15. Each of the bearing structures 28, 28' includes a slide bearing box 30, a support shaft 32 extending through the slide bearing box 30, and first and second support boxes 34, 36 mounted at either end of the support shaft 32. The support shaft 32 is a solid steel shaft. The first and second end portions 38, 40 of the support shaft 32 are pinned within receptacles 42 of the first and second support boxes 34, 36 by steel bars 44. A steel plate 46 is removably mounted in each support box by bolts and nuts 48 to further limit axial movement of the support shaft 32 within the receptacle 42. A steel frame 50 is fixedly mounted to a base plate 52, preferably by welds.

Figure 10:
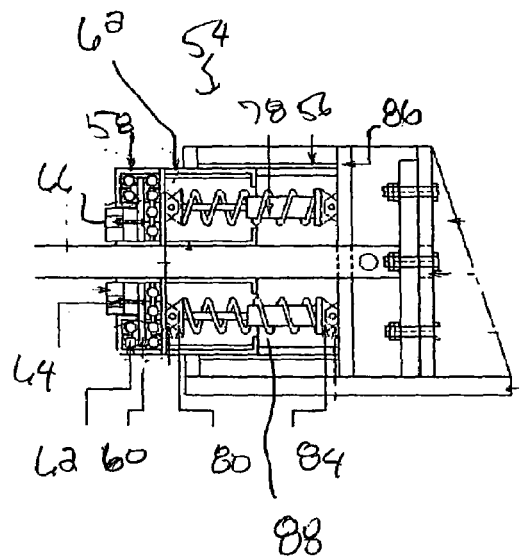
FIG. 10 is a cross-section view taken along line X—X of FIG. 7.
Figure 11:
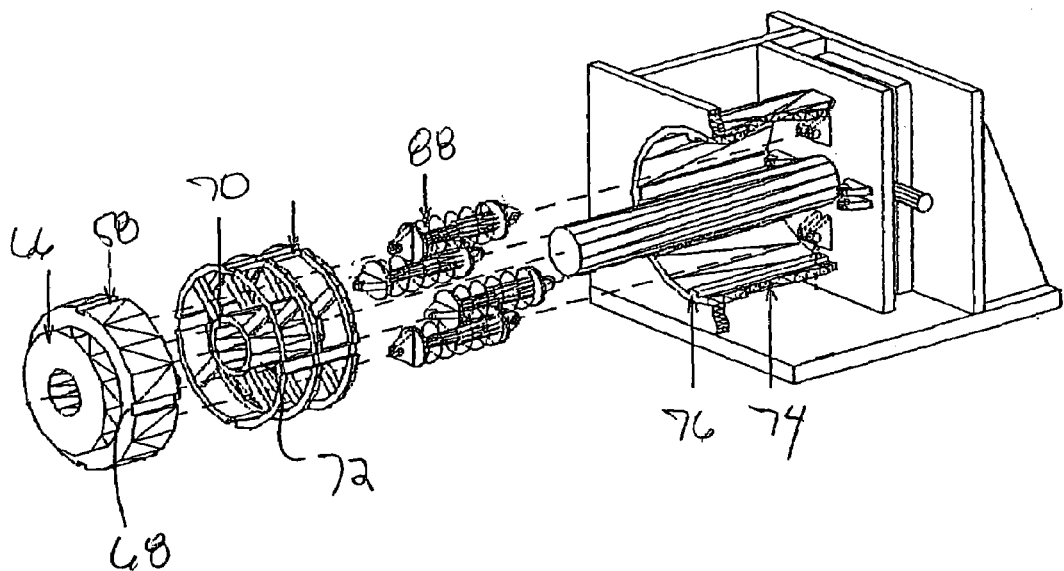
FIG. 11 is an exploded view of the piston shock absorber of FIG. 10.
Figure 13:
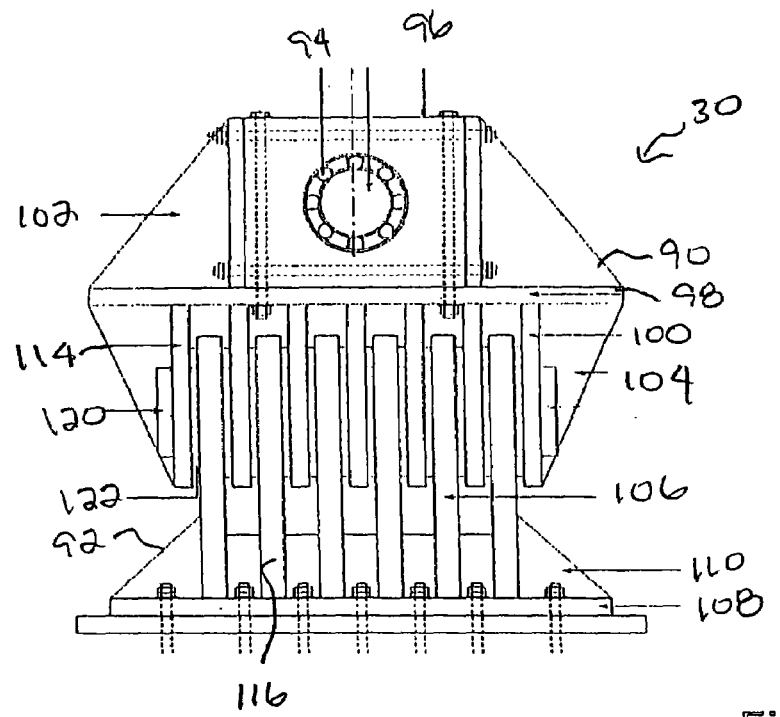
FIG. 13 is a cross-section view taken along line XIII—XIII of FIG. 12.
Figure 12:
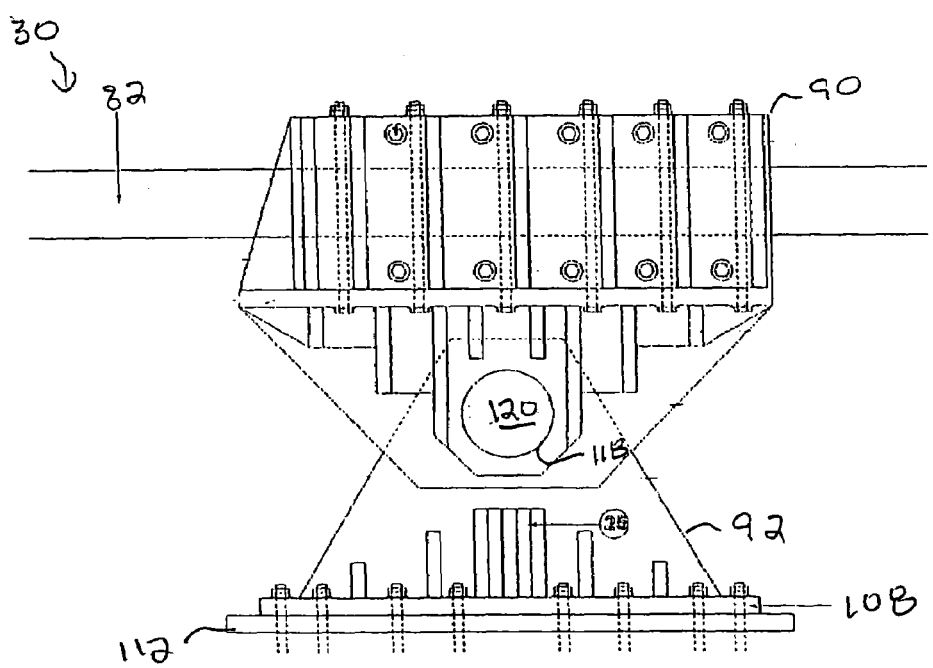
FIG. 12 is an enlarged front view of the slide bearing box of FIG. 6.
Figure 15:
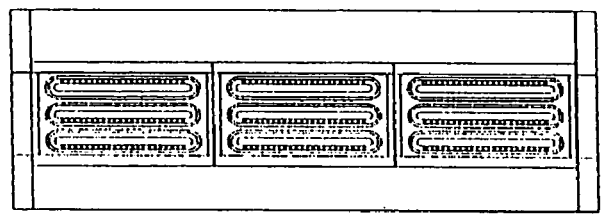
FIG. 15 is an enlarged cross-section view taken along line XV—XV of FIG. 13.

The second support box 36 has a shock absorber 54 disposed within an inner chamber 56 (FIGS. 10 and 11). The shock absorber 54 includes a compression bracket 58 at the front of the shock absorber structure. The compression bracket 58 may include a circular, turnable, steel plate 60 sandwiched between two layers of compression bearing 62. A recessed bolt and nut 64 mounts a plastic compression cushion 66 to the steel plate 60. Four recessed channels 68 are equidistantly disposed around the periphery of the compression bracket 58. A piston ring 70 welded to the end of compression bracket 58 has four recessed channels corresponding to the compression bracket channels 68. The piston ring 70 includes an axial cylinder 72 through which the support shaft 32 passes. The piston ring 70 and compression bracket 58 are reciprocable within a cylinder block 74. The inner surface of the cylinder block 74 has at least one, axially extending rib 76 that is received within one of the compression bracket channels 68 and piston ring channels to prevent the piston ring 70 and compression bracket 58 from rotating within the cylinder block 74. Four shock absorbers 78 are radially spaced within the cylinder block 74. One end of each shock absorber 78 is mounted to a strut 80, extending from the end face of compression bracket 58, by a pin 82 and the other end of each shock absorber 78 is mounted to a strut 84, extending from the support box base plate 86, by a pin 82. Each shock absorber 78 includes a heavy duty spring 88.

With reference to FIGS. 12–15, the slide bearing box 30 includes an upper bearing assembly 90 and a lower mounting assembly 92. The bearing assembly 90 includes a slide bearing 94 having a circular shape complimentary to that of the support shaft 32. The slide bearing 94 is mounted within a box assembly 96 that is mounted to a base plate 98 by bolts and nuts. An upper bearing plate structure 100 extends downwardly from the base plate 98. An upper structural frame 102 welded to the box assembly 96 and the base plate 98 and a lower structural frame 104 welded to the upper bearing plate structure 100 and the base plate 98 provide additional structural integrity.

The mounting assembly 92 includes a lower bearing plate structure 106 that extends upwardly from a base plate 108, with a support frame 110 welded to the lower bearing plate structure 106 and the base plate 108 providing additional structural integrity. The base plate 108 is mounted to a truss platform 112 by bolts and nuts.

Figure 14:
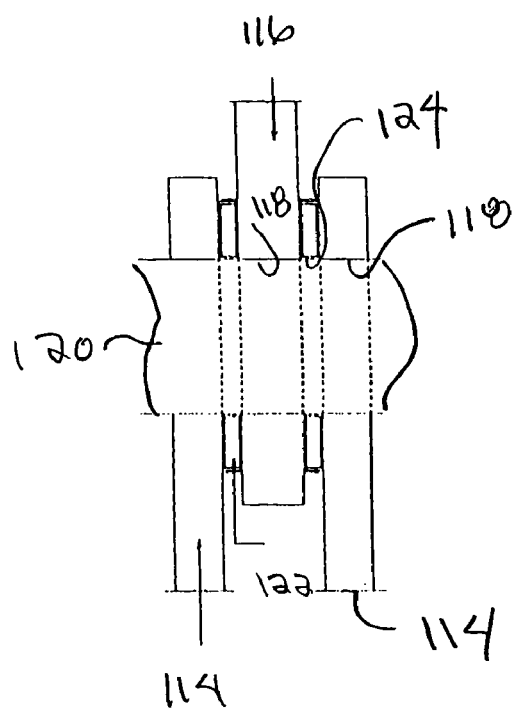
FIG. 14 is an enlarged cross-section view of the turnable compression bearing of FIG. 13.

The upper and lower bearing plate structures 100, 106 each include multiple bearing plates 114, 116, with each of the bearing plates 114, 116 having a bearing surround opening 118 extending therethrough. The bearing plates 116 of the lower bearing plate structure 106 are disposed between bearing plates 114 of the upper bearing plate structure 100 such that the bearing plate openings 118 are aligned. A solid, cylindrical shaft 120 passes through openings 118 in each of the bearing plates 114, 116 to connect the bearing assembly 90 to the mounting assembly 92 (FIG. 14). A compression bearing 122 is positioned between each plate 114, 116 of the upper and lower bearing plate structures 100, 106, with the shaft 120 extending through apertures 124 in each of the compression bearings 122.

The main bearing structures 126 of the third tower 16 are best illustrated by referring FIGS. 16–23. The bearing structure 126 includes a main slide bearing box 128, a main support shaft 130 extending through the main slide bearing box 128, a secondary slide bearing box 132 mounted at each end of the main support shaft 130, two secondary support shafts 134 extending through each of the secondary slide bearing boxes 132, and support boxes 136 mounted at either end of the secondary support shafts 134. The two secondary slide bearing boxes 132 are substantially identical, the four secondary support shafts 134 are substantially identical, and all of the support boxes 136 are substantially identical. All of the support shafts 130, 134 are solid steel shafts.

Figures 17, 28:
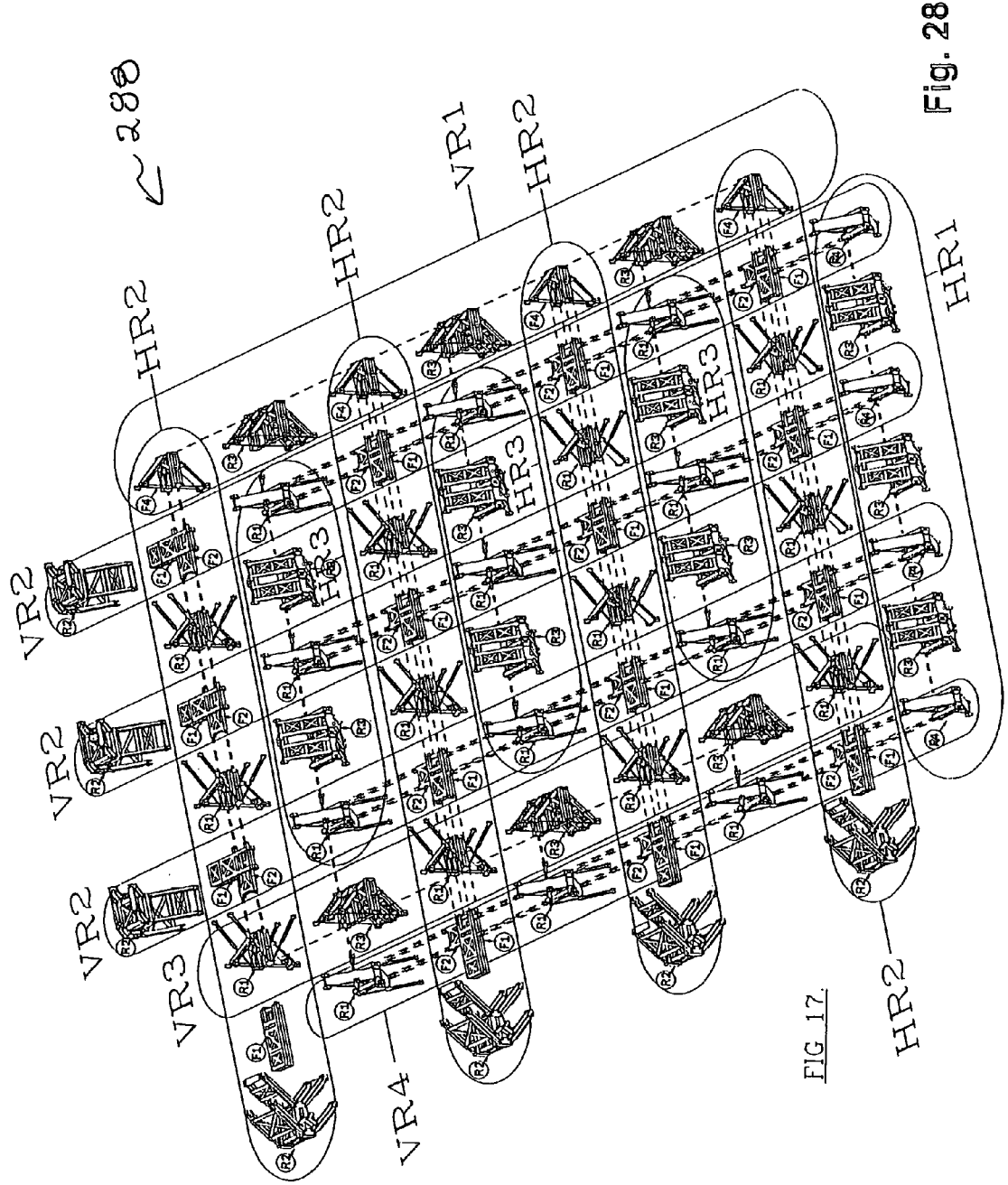
FIG. 17 is an enlarged bottom view of the support box of FIG. 16.
FIG. 28 is a simplified perspective view of the robots of a typical tower floor.

With reference to FIGS. 17–19, the first and second end portions 138, 140 of each secondary support shafts 134 are pinned within receptacles 142 of the support boxes 136 by steel bars 144. A steel plate 146 is removably mounted in each support box 136 by bolts and nuts to further limit axial movement of the secondary support shafts 134 within the receptacle 142. A steel frame 148 is fixedly mounted to a base plate 150, preferably by welds.

Figure 16:
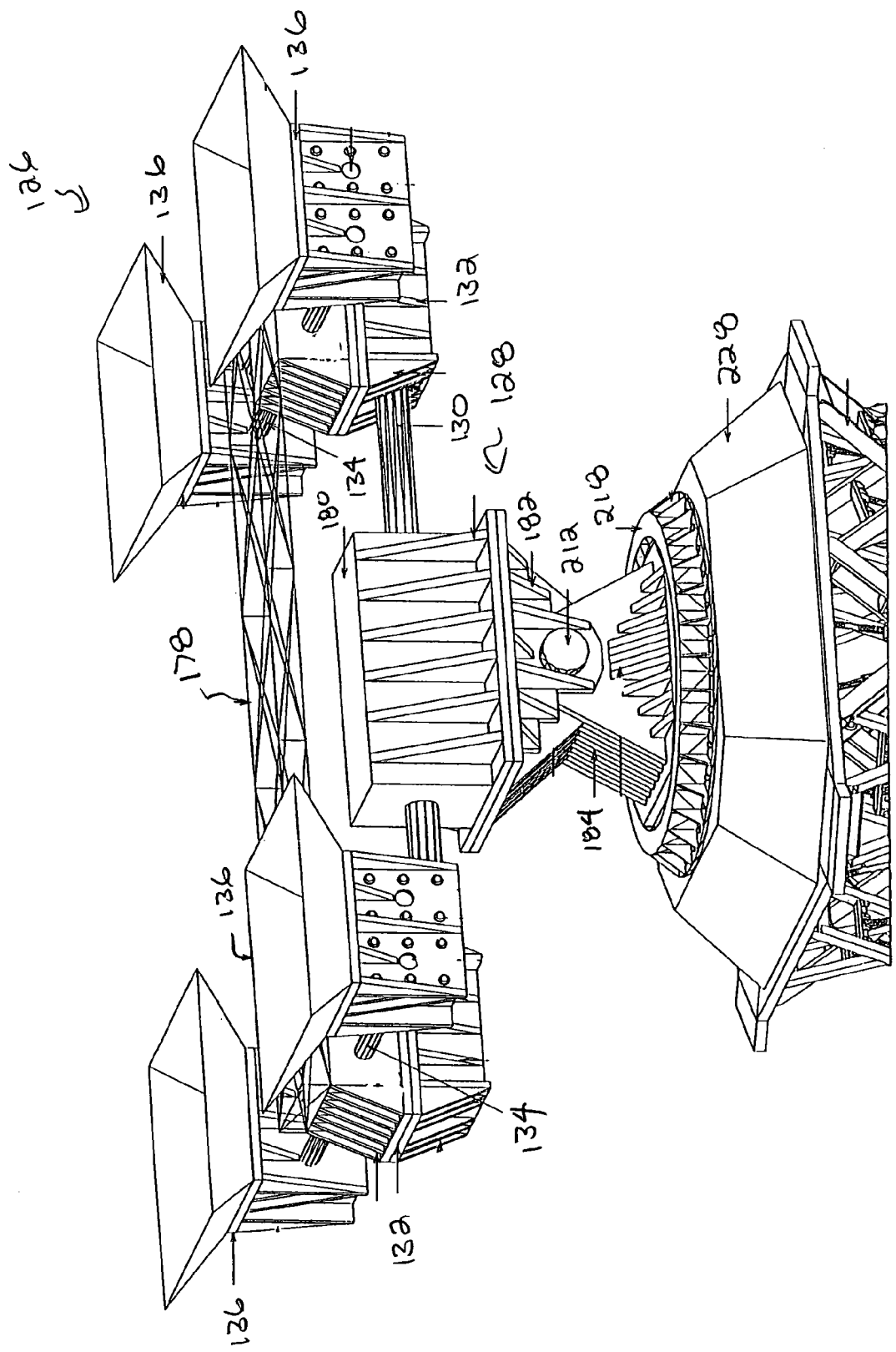
FIG. 16 is an enlarged perspective view of the main slide bearing box, the main support shaft, the secondary slide bearing boxes, the secondary support shafts, and the support boxes of the third tower of FIG. 1.
Figure 20:
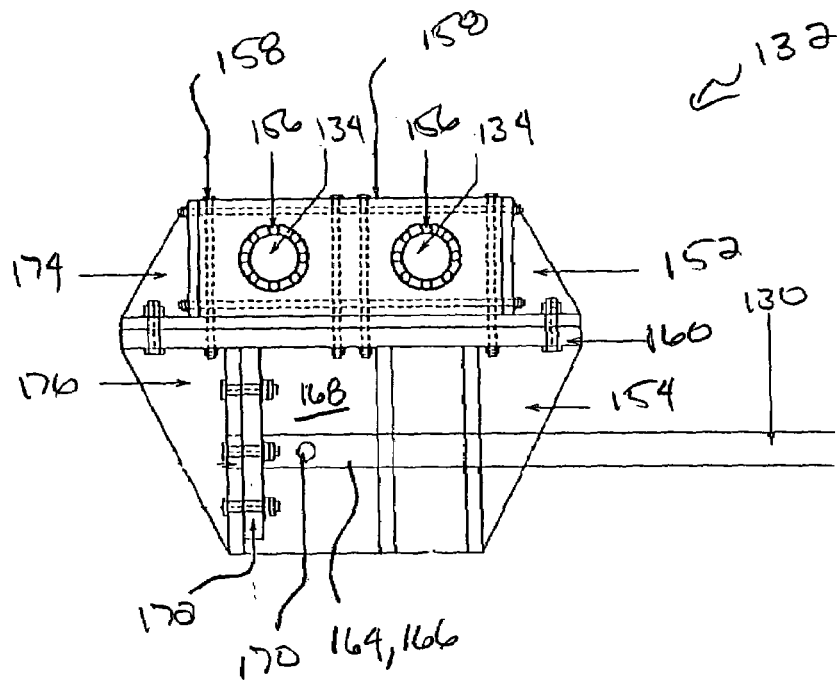
FIG. 20 is an enlarged front view of one of the secondary slide bearing boxes of FIG. 16.
Figure 21:
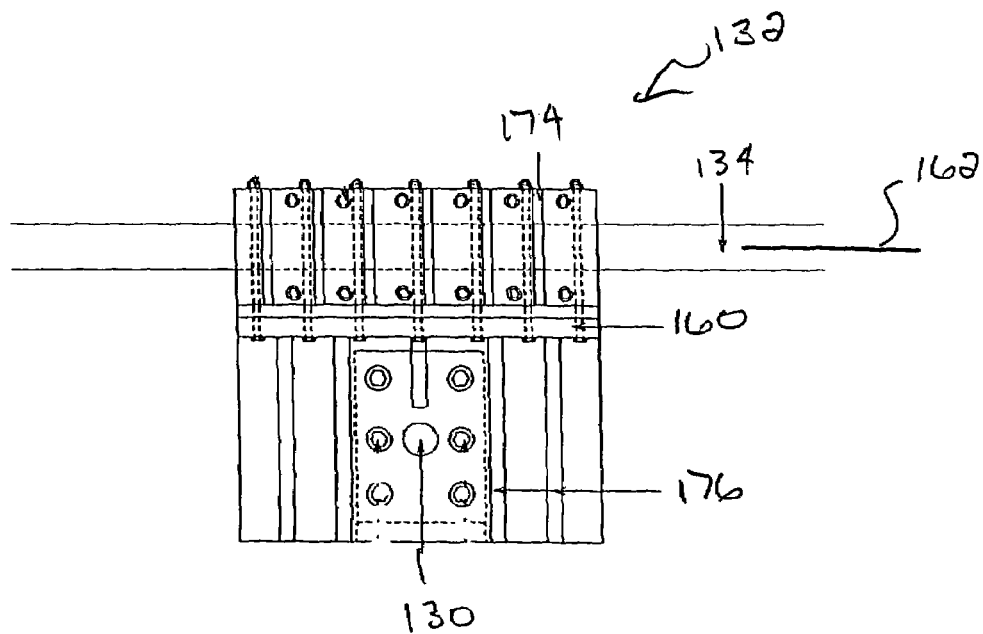
FIG. 21 is a side view of the secondary slide bearing boxes of FIG. 20.

With reference to FIGS. 20–21, the secondary slide bearing box 132 includes an upper bearing assembly 152 and a lower support assembly 154. The bearing assembly 152 includes two slide bearings 156 having a circular shape complimentary to that of the secondary support shafts 134. The slide bearings 156 are each mounted within a box assembly 158, mounted to a base plate 160 by bolts and nuts, such that the axes 162 of the slide bearings 156 are parallel. The first and second end portions 164, 166 of the main support shaft 130 are each pinned within a receptacles 168 of the support assembly 154 of one of the secondary slide bearing boxes 132 by a steel bar 170. A steel plate 172 is removably mounted in each support assembly 154 by bolts and nuts to further limit axial movement of the main support shaft 130 within the receptacle 168. An upper structural frame 174 welded to the box assemblies 158 and the base plate 160 and a lower structural frame 176 welded to the support assembly 154 and the base plate 160 provide additional structural integrity. A 3-dimensional steel truss is mounted to the top of each bearing assembly 152 to connect the two secondary slide bearing boxes 132 (FIG. 16).

Figure 22:
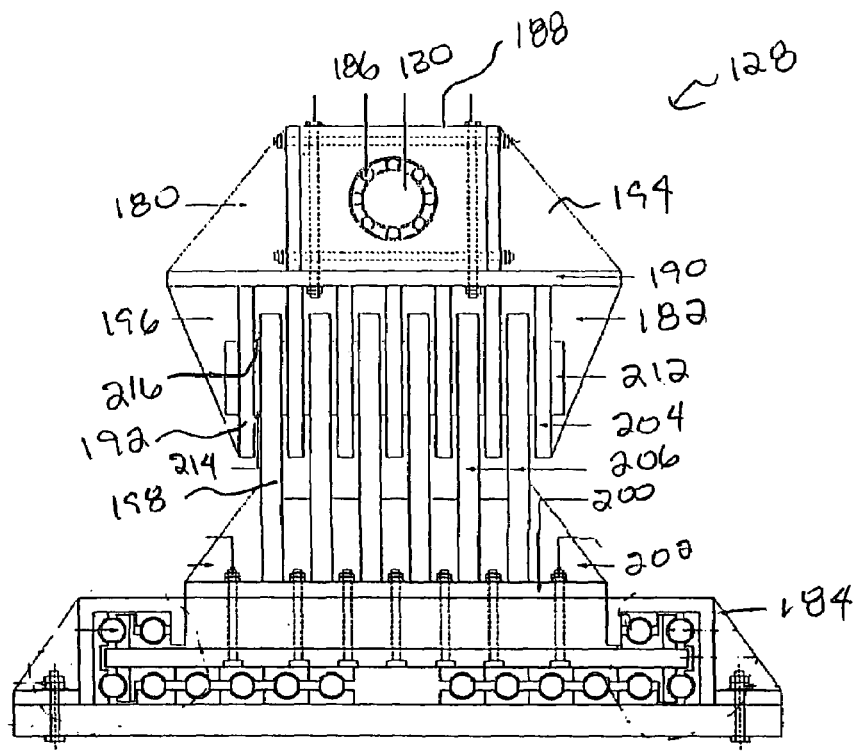
FIG. 22 is an enlarged side view of the main slide bearing box of FIG. 16.
Figure 23:
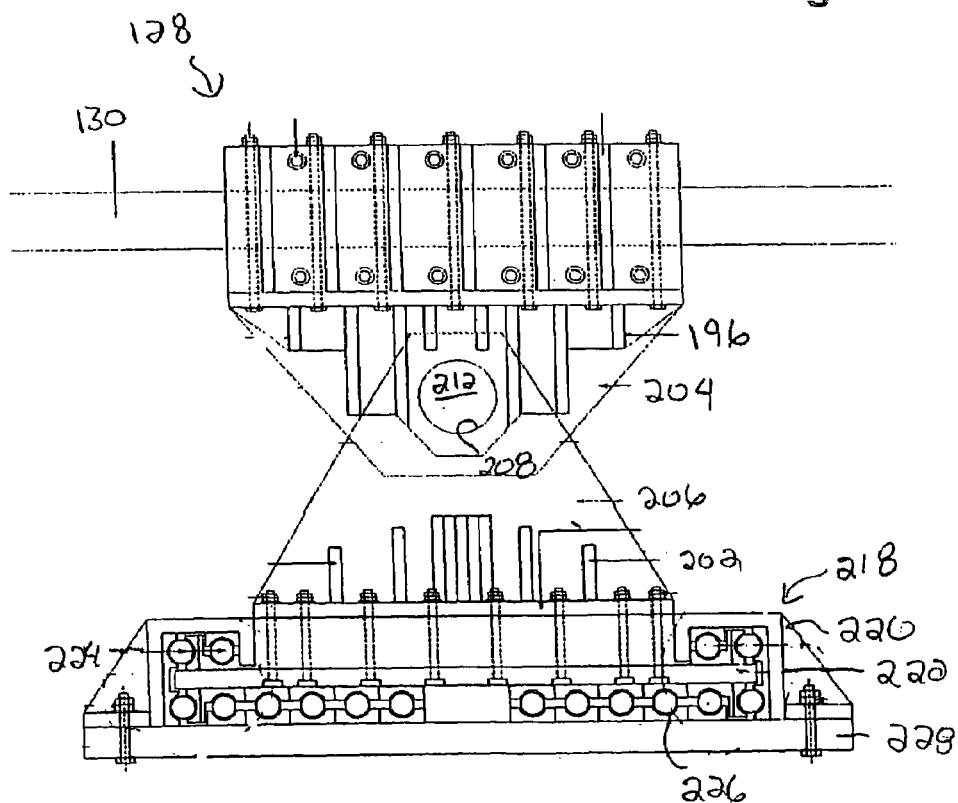
FIG. 23 is a front view of the main slide bearing box of FIG. 22.

With reference to FIGS. 22–23, the main slide bearing box 128 includes an upper bearing assembly 180, a lower mounting assembly 182, and a base assembly 184. The bearing assembly 180 includes a slide bearing 186 having a circular shape complimentary to that of the main support shaft 130. The slide bearing 186 is mounted within a box assembly 188 that is mounted to a base plate 190 by bolts and nuts. An upper bearing plate structure 192 extends downwardly from the base plate 190. An upper structural frame 194 welded to the box assembly 188 and the base plate 190 and a lower structural frame 196 welded to the upper bearing plate structure 192 and the base plate 190 provide additional structural integrity. The mounting assembly 182 includes a lower bearing plate structure 198 that extends upwardly from a base plate 200, with a support frame 202 welded to the lower bearing plate structure 198 and the base plate 200 providing additional structural integrity. The base assembly 180 of the third tower 16 also includes a rotatable compressor bracket.

The upper and lower bearing plate structures 192, 198 each include multiple bearing plates 204, 206, with each of the bearing plates 204, 206 having a bearing surround opening 208, extending therethrough. The bearing plates 206 of the lower bearing plate structure 198 are disposed between bearing plates 204 of the upper bearing plate structure 192 such that the bearing plate openings 208 are aligned. A solid, cylindrical shaft 212 passes through openings 208 in each of the bearing plates 204, 206 to connect the bearing assembly 180 to the mounting assembly 182. A compression bearing 214 is positioned between each plate 204, 206 of the upper and lower bearing plate structures 192, 198, with the shaft 212 extending through apertures 216 in each of the compression bearings 214.

The base assembly 184 includes a rotatable compression bracket 218 mounted within a steel support frame 220. The compression bracket 218 includes a steel plate 222 disposed between upper and lower compression bearings 224, 226. The steel plate 222 is mounted to the base plate 200 of the mounting assembly 182 by recessed bolts and nuts. The support frame 220 is mounted to a truss platform 228 by bolts and nuts.

Figure 24:
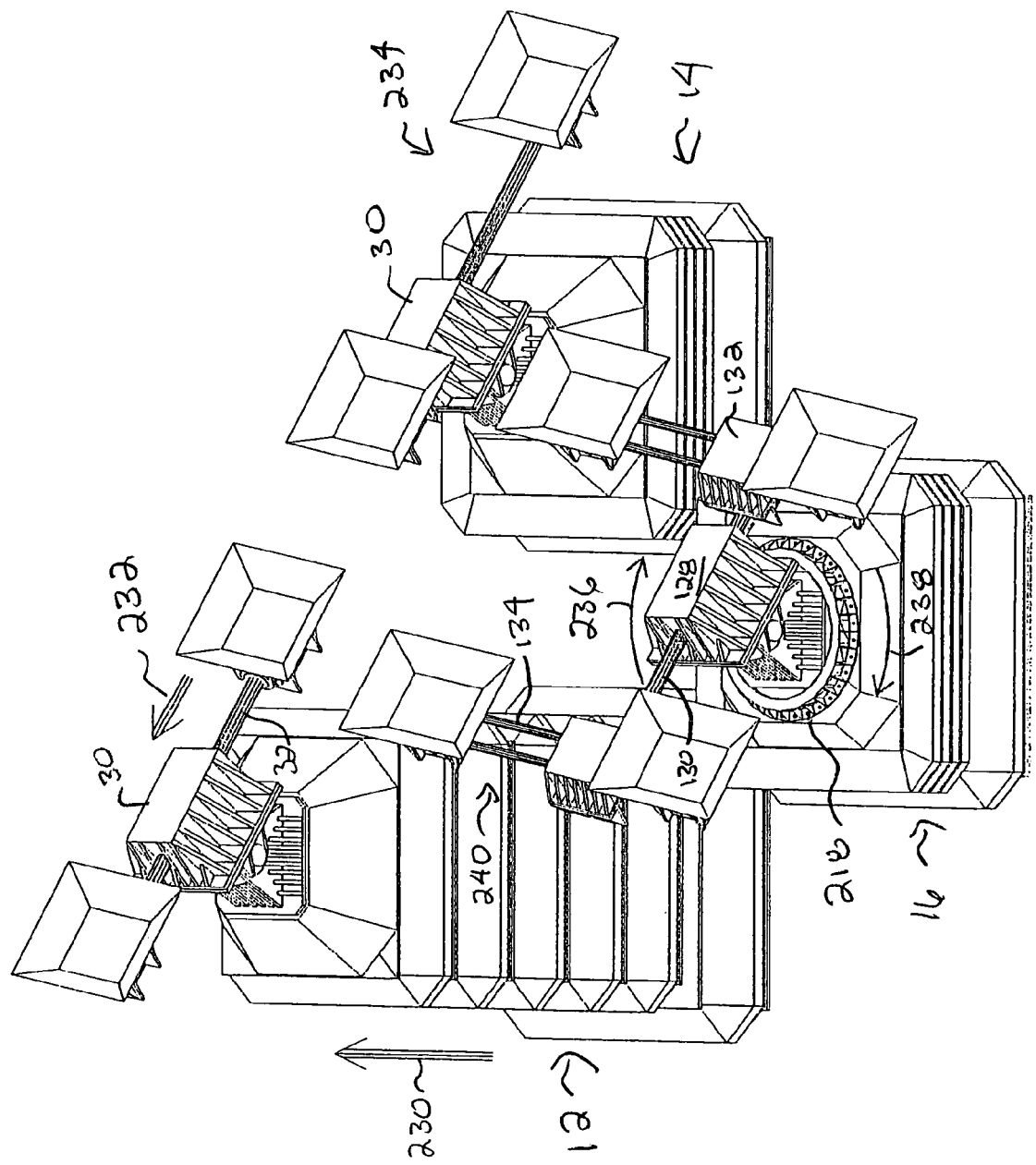
FIG. 24 is a top view of the solar power station of FIG. 1, with the solar panel assembly removed.
Figure 25:
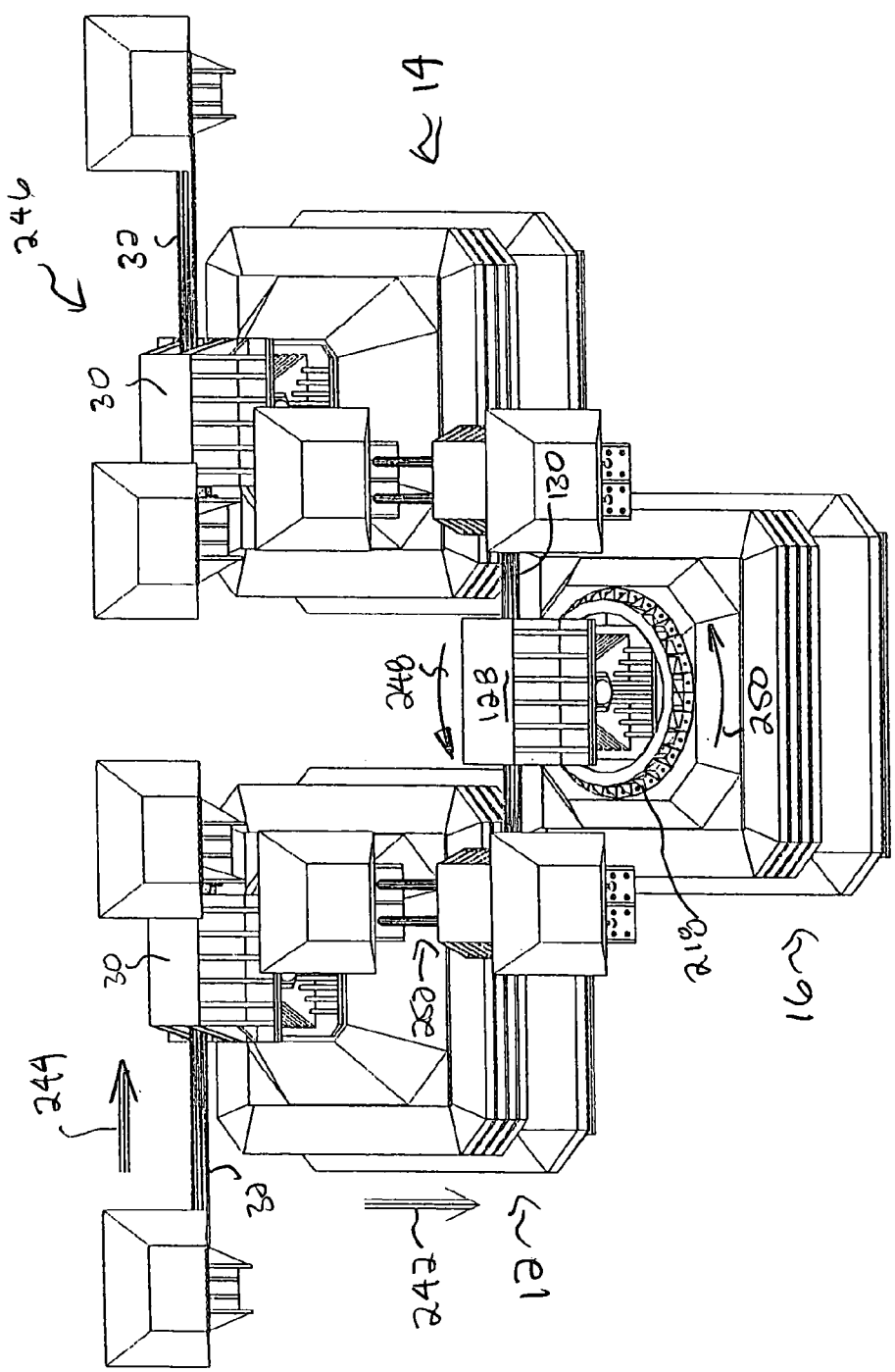
FIG. 25 is a top view of the solar power station of FIG. 2, with the solar panel assembly removed.
Figure 26:
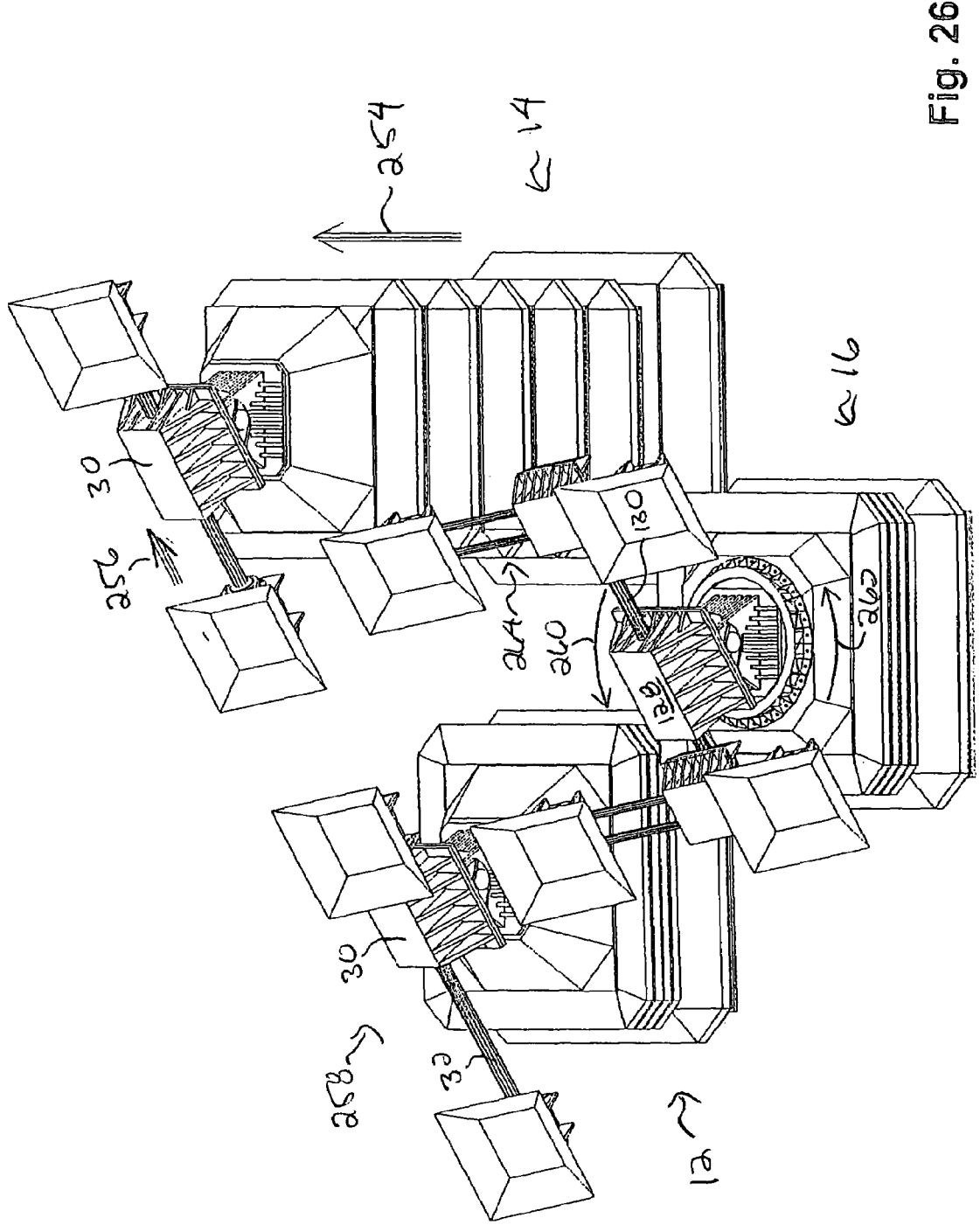
FIG. 26 is a top view of the solar power station of FIG. 3, with the solar panel assembly removed.

FIGS. 24–26 also show the subject solar power station 10 as the solar panel assembly 18 is being positioned to receive sun light at sunrise (FIG. 24), the solar panel assembly 18 is being positioned to receive sun light at noon (FIG. 25), and the solar panel assembly 18 is being positioned to receive sun light at sundown (FIG. 26). In FIG. 24, the first tower 12 is being extended 230 from the bottom position, as the second and third towers are held at the bottom position. The sliding bearing 94 of the first tower 12 moves 232 within the slide bearing box 30 from the right to left (with reference to the Figures), until the first tower 12 is fully extended. The sliding bearing 94 of the second tower 14 is maintained 234 at a rest position. The main slide bearing box upper bearing assembly 180 of the third tower 16 rotates clockwise 236 about the main slide bearing box shaft 212, the compression bracket 218 rotates clockwise 238, and the secondary support shafts 134 move 240 within the secondary slide bearing boxes 132 to compensate for the movement of the first tower 12 relative to the second and third towers 14, 16.

In FIG. 25, the first tower 12 is retracted to the bottom position, as the second and third towers 14, 16 are held at the bottom position. The sliding bearing 94 of the first tower 12 further moves 244 within the slide bearing box 30 from left to right, until the first tower 12 is fully retracted. The sliding bearing 94 of the second tower 14 is maintained 246 at the rest position. The main slide bearing box upper bearing assembly 180 of the third tower 16 rotates counter-clockwise 248 about the main slide bearing box shaft 212, the compression bracket 218 rotates counter-clockwise 250, and the secondary support shafts 134 move 252 within the secondary slide bearing boxes 132 to compensate for the movement of the first tower 12 relative to the second and third towers 14, 16.

In FIG. 26, the second tower 14 is extended 254 from the bottom position, as the first and third towers 12, 16 are held at the bottom position. The sliding bearing 94 of the second tower 14 moves 256 within the slide bearing box 30 from left to right, until the second tower 14 is fully extended. The sliding bearing 94 of the first tower 12 is maintained 258 at the rest position. The main slide bearing box upper bearing assembly 180 of the third tower 16 rotates counter-clockwise 260 about the main slide bearing box shaft 212, the compression bracket 218 rotates counter-clockwise 262, and the secondary support shafts 134 move 264 within the secondary slide bearing boxes 132 to compensate for the movement of the second tower 14 relative to the first and third towers 12, 16.

As explained in greater detail below, in the event that an earthquake senor 266 (FIG. 53) detects ground vibration above a predetermined level, or a wind sensor 267 detects a wind force above a predetermined level, the hydraulic jack control 268 will withdraw all oil so that the three towers 12, 14, 16 are withdrawn to the bottom position, as shown in FIG. 25. This minimizes the moment arm of the towers 12, 14, 16, reducing the oscillation effect on the solar power station 10. The shock absorbers 54 of the first and second towers 12, 14 also absorb the horizontal component of vibration produced by external force such as wind and earthquake.

As shown in FIG. 27a, the shock absorbers 54 of the second support boxes 36 of the first and second towers 12, 14 maintain the second support boxes 36 at a nominal contact distance 270 from the side of the associated slide bearing box 30 when the main bearing structures 28, 28' are not exposed to an external horizontal force.

When the main bearing structures 28, 28' are exposed to an external horizontal force 272 from the right (as shown in FIG. 27b), the force 272 moves 274 the first and second support boxes 34, 36 and the support shaft 32 of both main bearing structures 28, 28' to the left. The spring 88 of the shock absorber 54 of the second support box 36 of main bearing structure 28 of the first tower 12 is compressed and the spring 88 of the shock absorber 54 of the second support box 34 of main bearing structure 28' of the second tower 14 is extended, absorbing the force 272. At the point where force 272 and the compression force of the spring 88 of main bearing structure 28 and the tension force of the spring 88 of main bearing structure 28' are at equilibrium, the second support box 36 of the first tower 12 is at a minimum contact distance 276 from the side of the associated slide bearing box 30 and the second support box 36 of the second tower 14 is at a maximum contact distance 278 from the side of the associated slide bearing box 30. When the force 272 is removed, the compression force of the spring 88 of main bearing structure 28 and the tension force of the spring 88 of main bearing structure 28' return the first and second support boxes 34, 36 and the support shaft 32 of both main bearing structures 28, 28' to the positions shown in FIG. 27a.

Figure 27C:
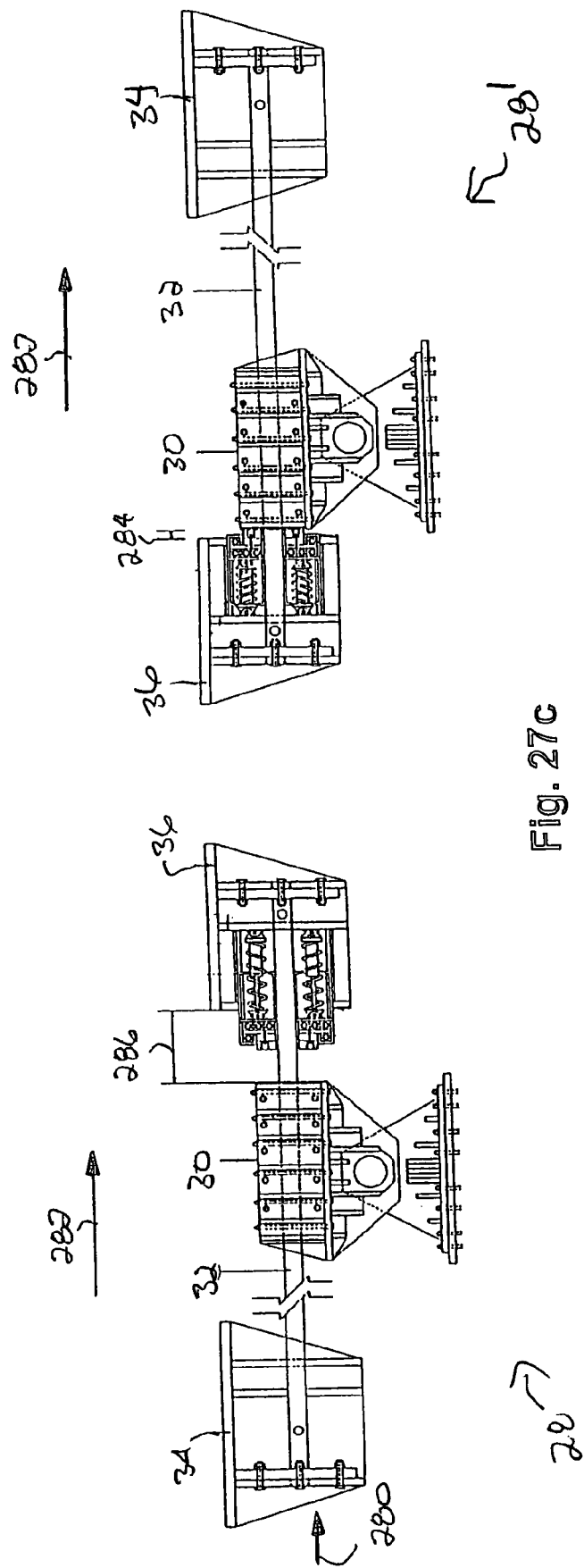

Similarly, when main bearing structures 28, 28' are exposed to an external horizontal force 280 from the left (as shown in FIG. 27c), the force 280 moves 282 the first and second support boxes 34, 36 and the support shaft 32 of both main bearing structures 28, 28' to the right. The spring 88 of the shock absorber 54 of the second support box 36 of main bearing structure 28' of the second tower 14 is compressed and the spring 88 of the shock absorber 54 of the second support box 36 of main bearing structure 28 of the first tower 12 is extended, absorbing the force 280. At the point where force 280 and the compression force of the spring 88 of main bearing structure 28' and the tension force of the spring 88 of main bearing structure 28 are at equilibrium, the second support box 36 of the second tower 14 is at a minimum contact distance 284 from the side of the associated slide bearing box 30 and the second support box 36 of the first tower 12 is at a maximum contact distance 286 from the side of the associated slide bearing box 30. When the force 280 is removed, the compression force of the spring 88 of main bearing structure 28' and the tension force of the spring 88 of main bearing structure 28 return the first and second support boxes 34, 36 and the support shaft 32 of both main bearing structures 28, 28' to the positions shown in FIG. 27a.

Each of the towers 12, 14, 16 includes multiple, vertically stacked floors 288 (FIG. 28). Each floor 288 includes an arrangement of robots R1, R2, R3, R4 and a connecting framework of push and pull steel frames F1, F2. More specifically, the robots R1, R2, R3, R4 and steel frames F1 F2 are organized in groups, HR1, HR2, HR3, VR1, VR2, VR3, VR4, with the associated robots and steel frames of each group being connected together. The robots R1, R2, R3, R4 of each intermediate floor 288 are connected to associated robots in each floor 288, 288'' above it and each floor 288, 288' below it. Groups HR1 and VR1 are identical, each including three R3 robots and four R4 robots. The HR2 and VR2 groups are almost identical, each including three R1 robots, one R2 robot, and one R4 robot. HR2 also includes four double deck steel frames F1, while VR2 also includes three single deck steel frames F2 and one double deck steel frame F1. The HR3 group includes three R1 robots and two R3 robots. The VR3 group includes four R1 robots and three R3 robots. The VR4 group includes three R1 robots and one R4 robot. For the ground floor 288', the R1 robots are vibration hydraulic jacks with springs, while for all of the other floors 288, the R1 robots are hydraulic jacks.

With reference to FIGS. 45 to 49, the ground floor 288' includes an outer, space frame ring 596 which is designed to resist lateral force exerted on the towers 12, 14, 16 by strong wind or earthquakes, and thereby prevent tension, bearing and torsion forces from pulling the robot groups HR1, HR2, HR3, VR1, VR2, VR3, VR4 out of the space frame ring 596.

The space frame ring 596 comprises a framework including supporting members 598, first bracing members 600, vertical members 602, second bracing members 604, first gusset plates 606, horizontal members 608, second gusset plates 610, and bracket 612 that are fastened together by bolts and nuts. The footing of supporting members 598 and the footing of vertical members 602 are fastened to a base member 614 which is in turn fastened to the foundation 616, preferably by nuts and bolts. A solid rod or pole 618 extends vertically upward from a foot fixed within a bottom flange 620 mounted to the base member 614, through a lower spring 622, an upper flange 624 having a lower flange half 626 and an upper flange half 628, an upper plate 630 clamped between the lower and upper flange halves (626, 628), an upper spring 632, to a head fixed within an opening in the bracket 612. The top end of the upper spring 632 engages the lower surface of the bracket 612 and the bottom end of the upper spring 632 engages the top surface of the upper flange half 628. The top end of the lower spring 622 engages the lower surface of the lower flange half 626 and the bottom end of the lower spring 632 engages the top surface of the bottom flange 620. In the event of a strong wind or earthquake, the upper plate 630 can move vertically upward and downward along the pole 618 such that the upper and lower springs 632 622 absorb the shock energy generated by lateral forces exerted on the tower by the wind or the earthquake.

Figure 48:
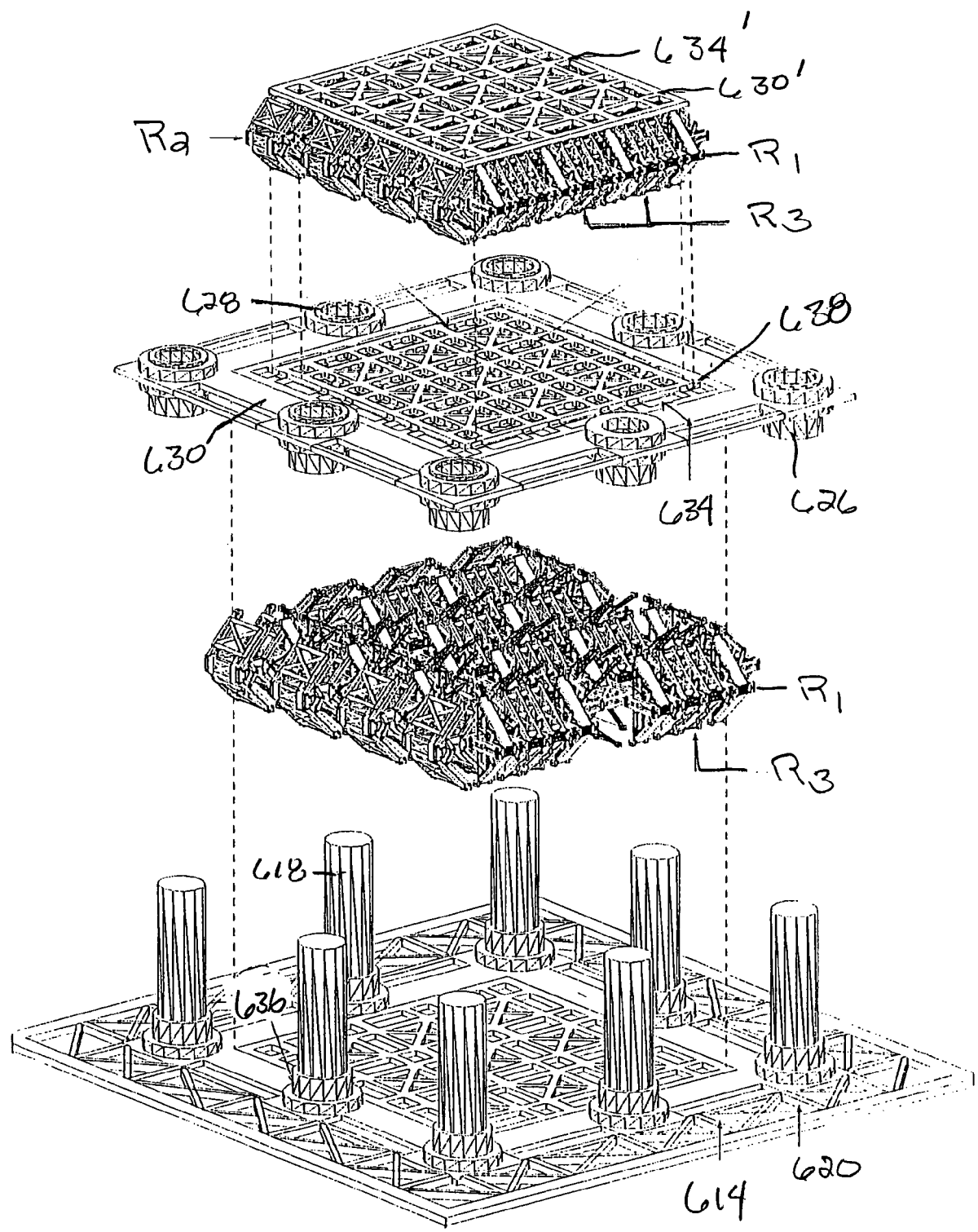
FIG. 48 is an exploded view of the first two floors of one of the towers.
Figure 49:
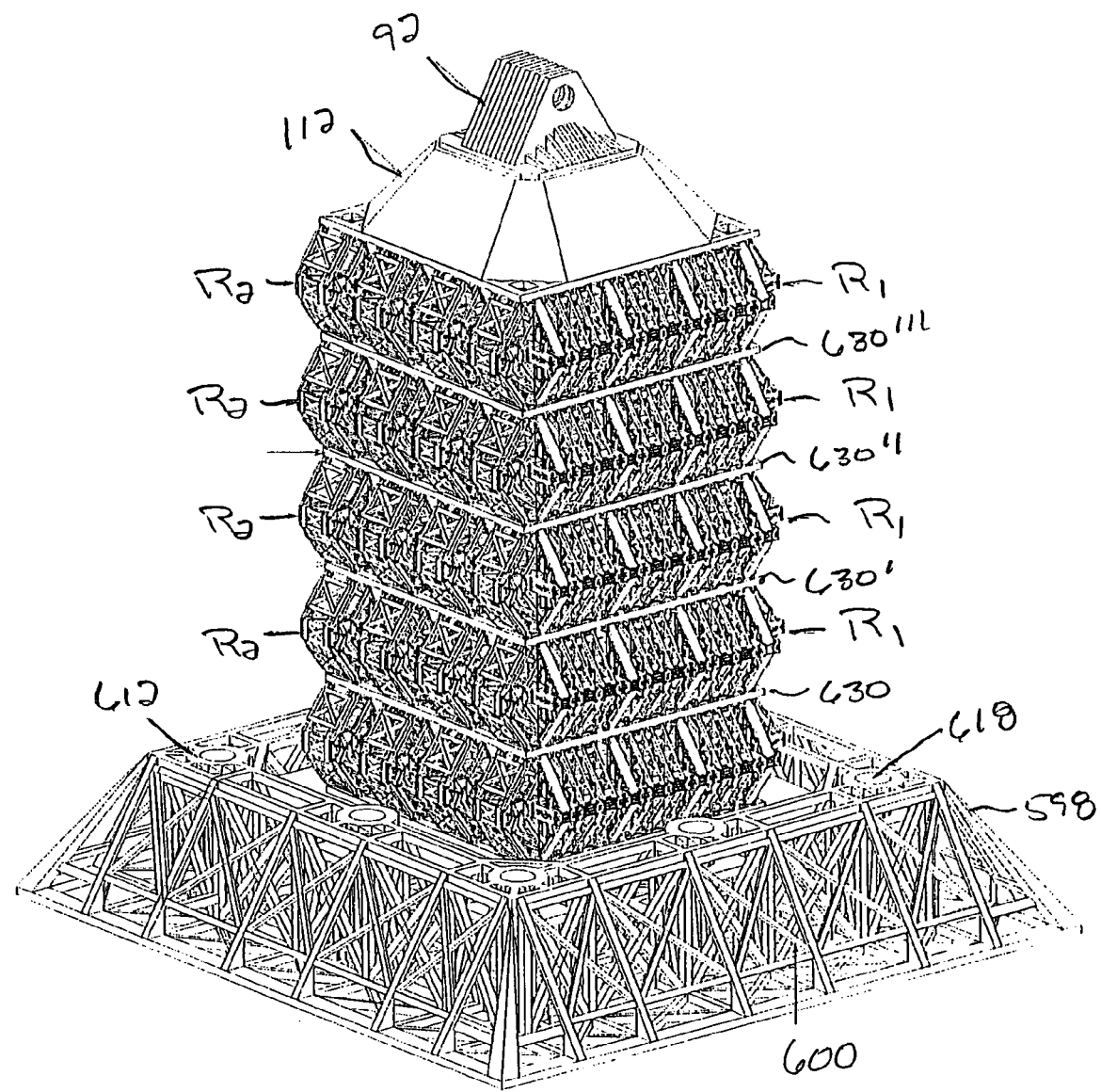
FIG. 49 is a perspective view of one of the towers.

FIGS. 48 and 49 illustrate the ground floor 288' and a typical floor connection. The ground floor base member 614 is connected to the tie beam members 634 of the upper plate 630 by the ground floor pole 618, which is mounted to the piling or foundation 616 and extends through the upper flange 624 mounted to the upper plate 630. The ground floor robot groups HR1, HR2, HR3, VR1, VR2, VR3, VR4 are mounted to the tie beam members 636 of the ground floor base member 614 and to the tie beam members 634 of upper plate 630 of the ground floor 288'. The tie beam members 634 are mounted to the upper plate 630 by gusset plates and by bolts and nuts or welds. The connections for the upper floors 288 are the same as described above for the ground floor 288', where the upper plate 630 of each lower floor acts as the base member of each subsequent floor. For example, the robot groups HR1, HR2, HR3, VR1, VR2, VR3, VR4 of the second floor are mounted to the tie beam members 634 of the upper plate 630 of the ground floor 288' and to the tie beam members 634' of the upper plate 630' of the second floor.

Figure 29:
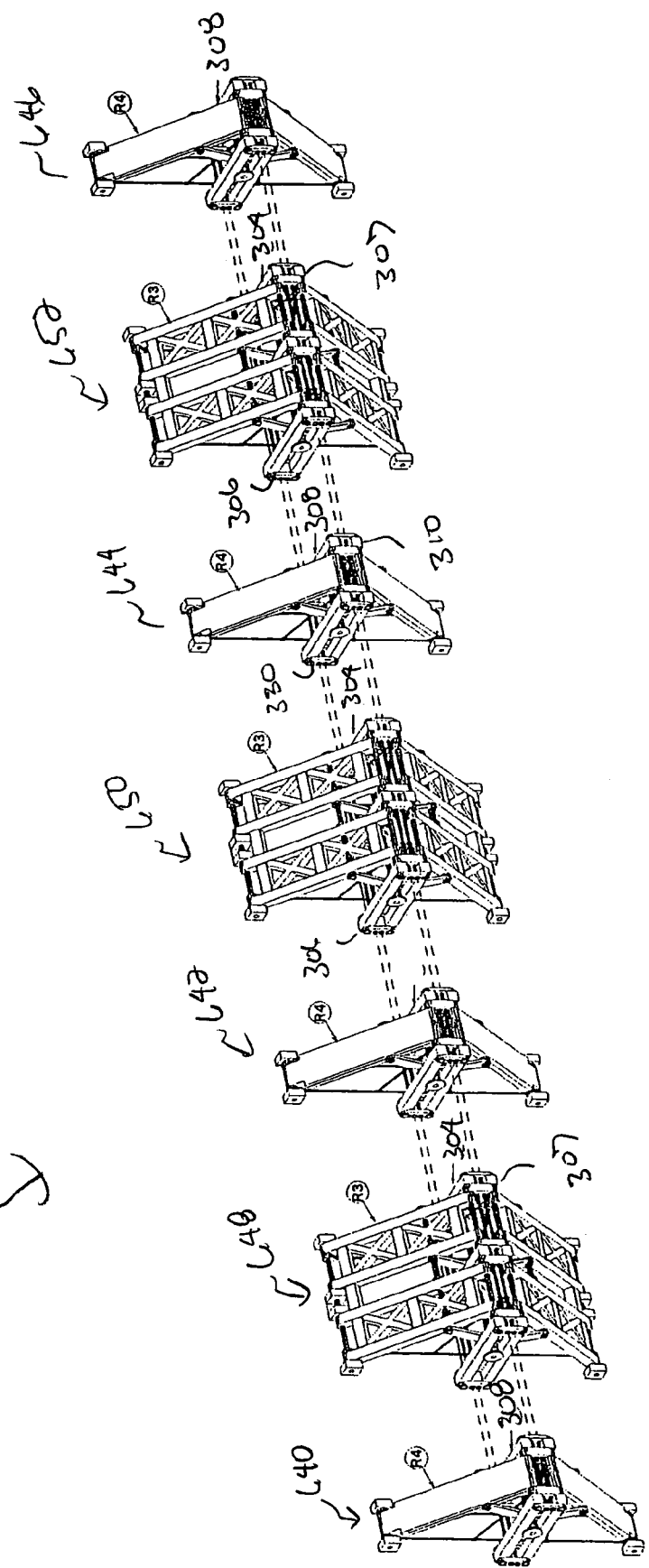
FIG. 29 is an enlarged view of the HR1 and VR1 groups of FIG. 28.
Figure 30:
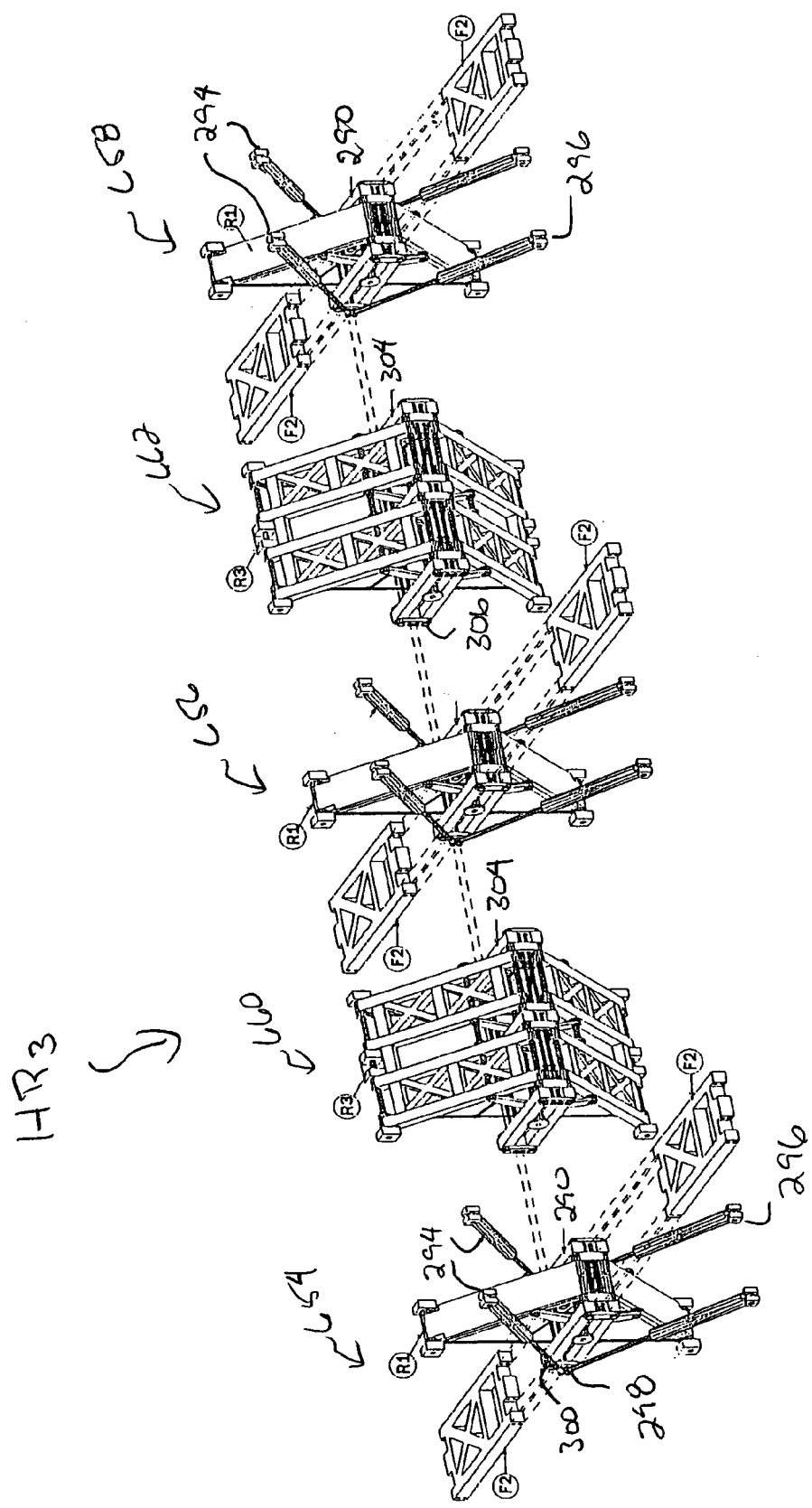
FIG. 30 is an enlarged view of the HR3 group of FIG. 28.
Figure 31:
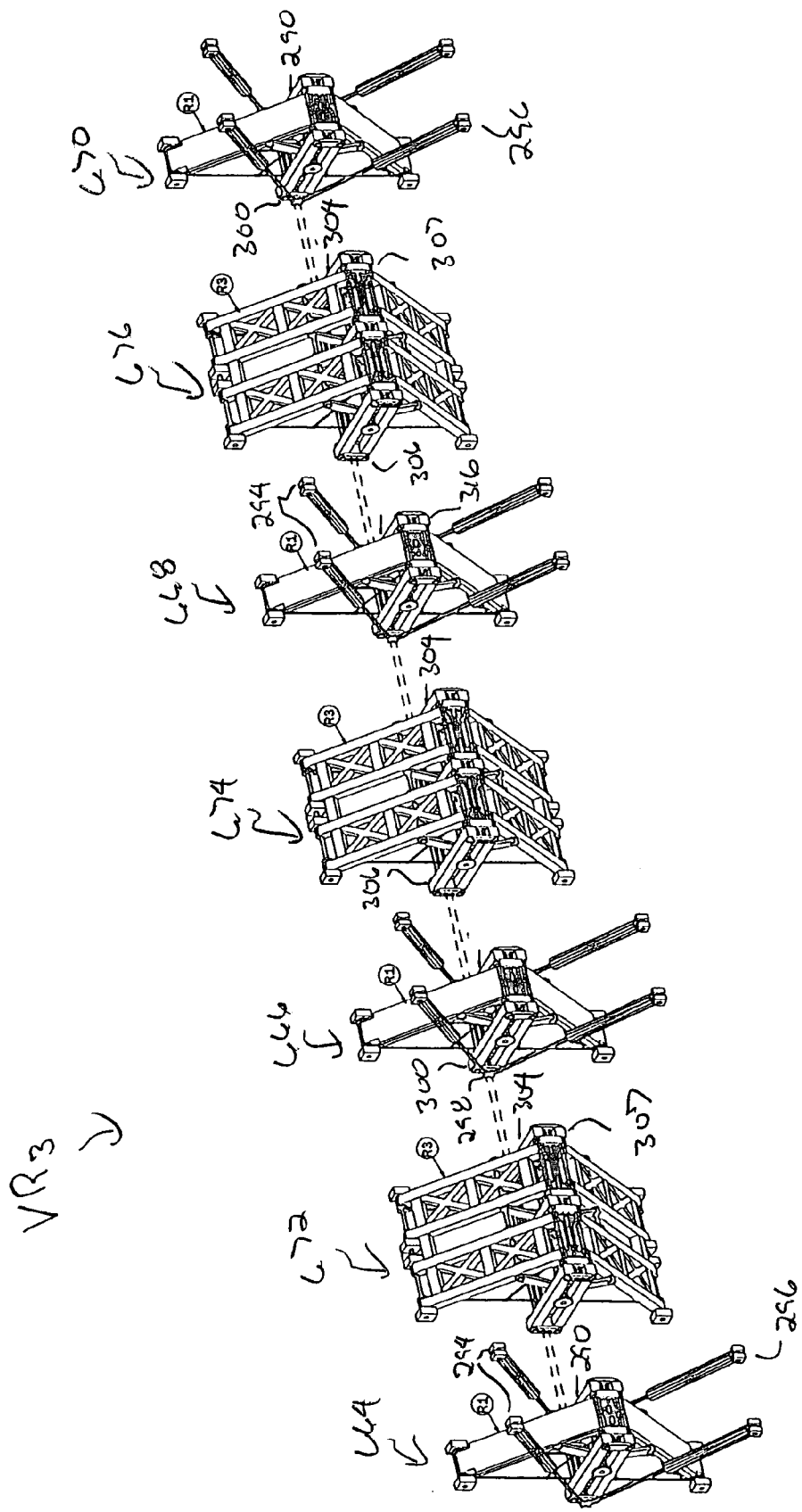
FIG. 31 is an enlarged view of the VR3 group of FIG. 28.
Figure 32:
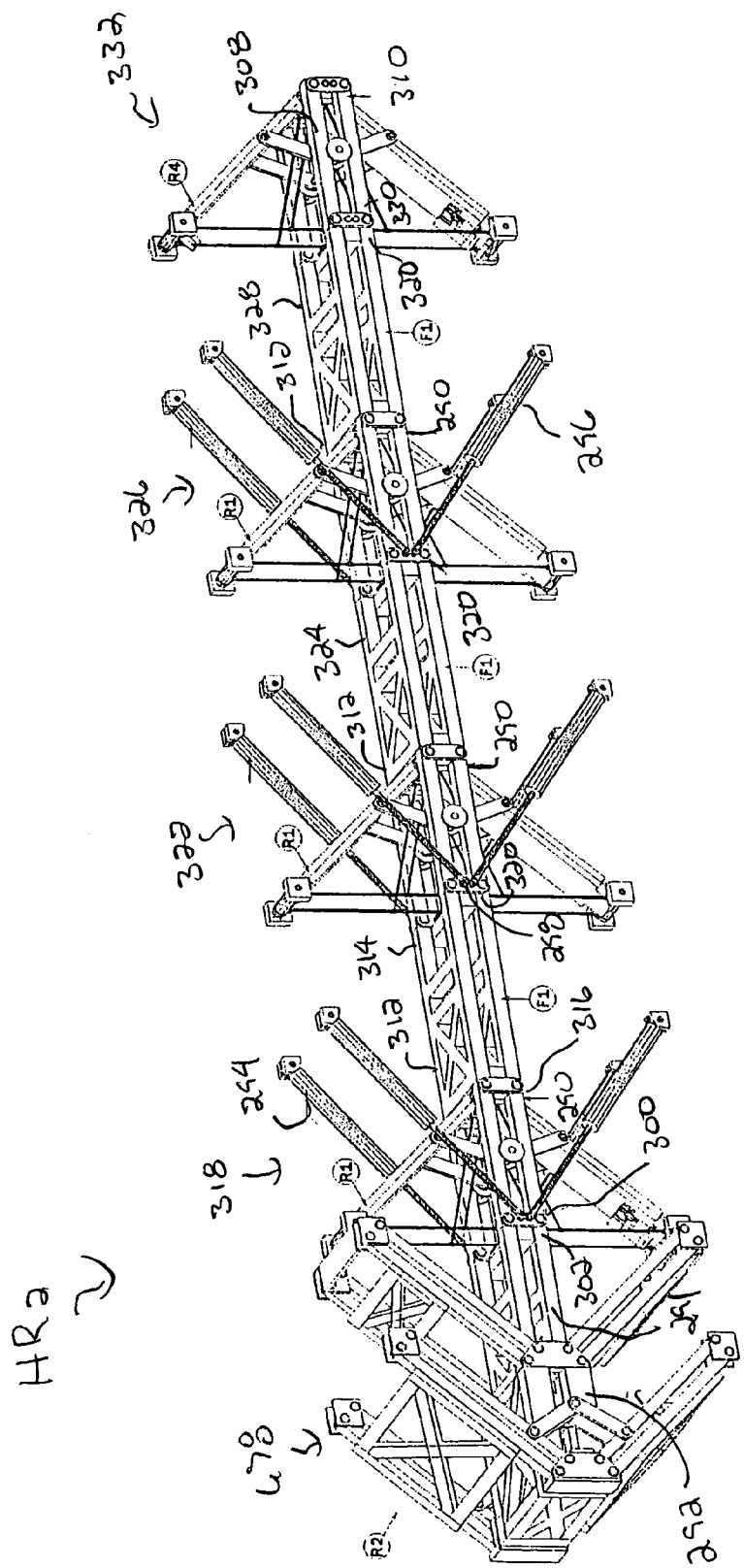
FIG. 32 is an enlarged view of the HR2 group of FIG. 28.
Figure 33:
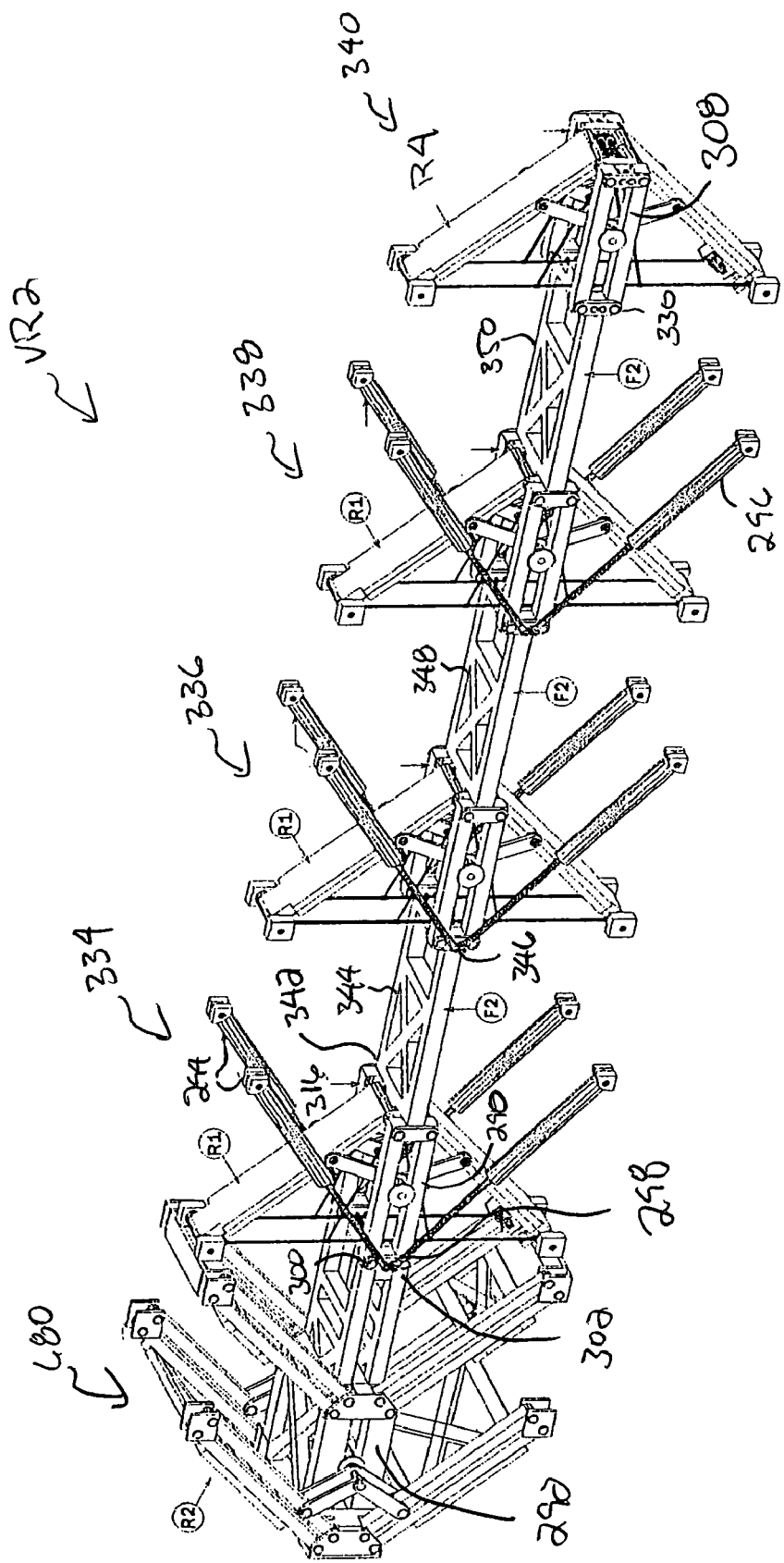
FIG. 33 is an enlarged view of the VR2 group of FIG. 28.
Figures 38A, 38B, 38C, 38D:
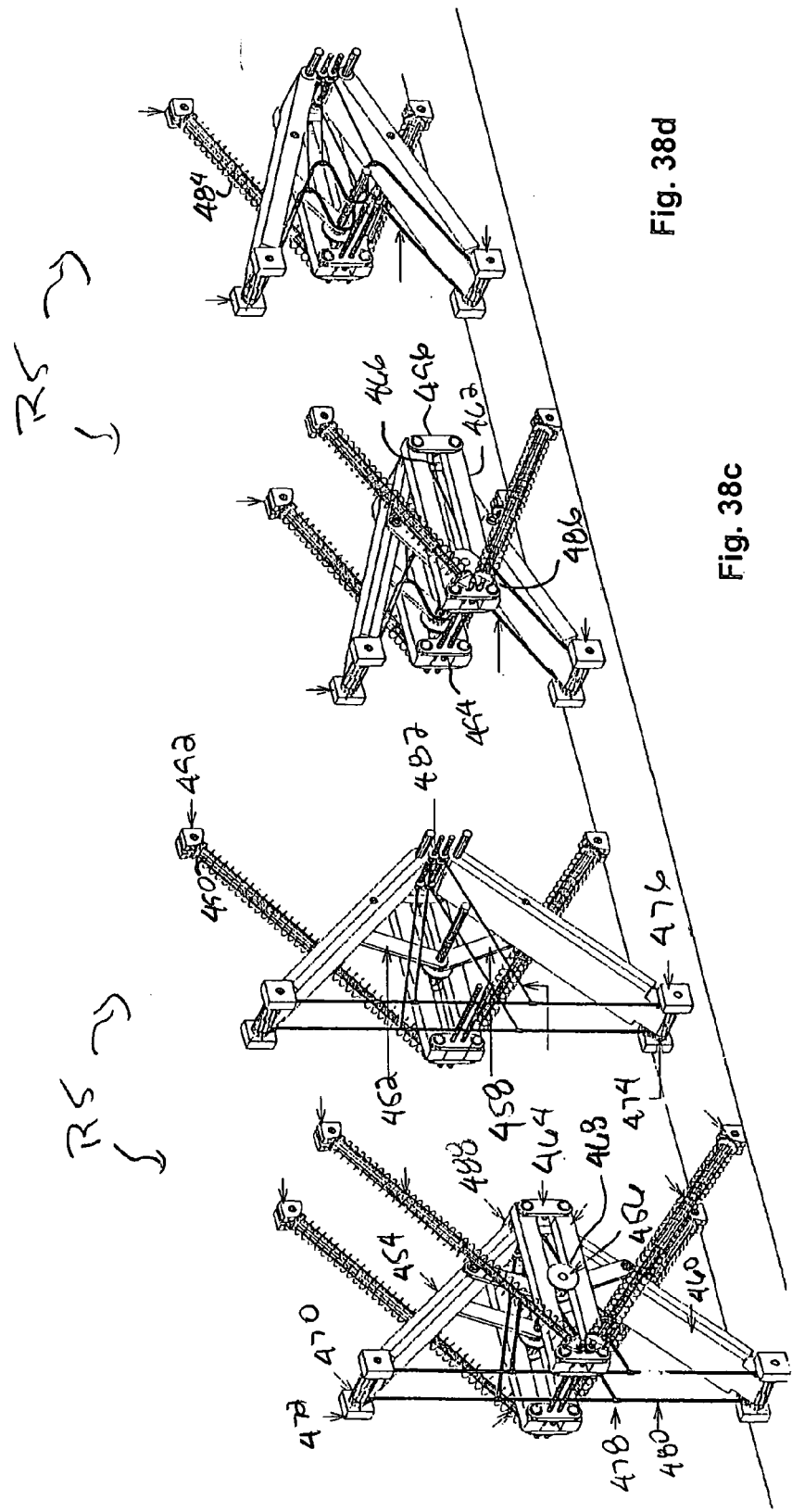
FIGS. 38a to 38c are enlarged views of a robot R5, showing the robot R5 in the extended position (FIG. 38a), showing the robot R5 in the extended position, with one of the horizontal roller frames and corresponding pair of jacks removed (FIG. 38b), showing the robot R5 in the retracted position (FIG. 38c), and showing the robot R5 in the retracted position, with one of the horizontal roller frames and corresponding pair of jacks removed (FIG. 38d)
Figure 39:
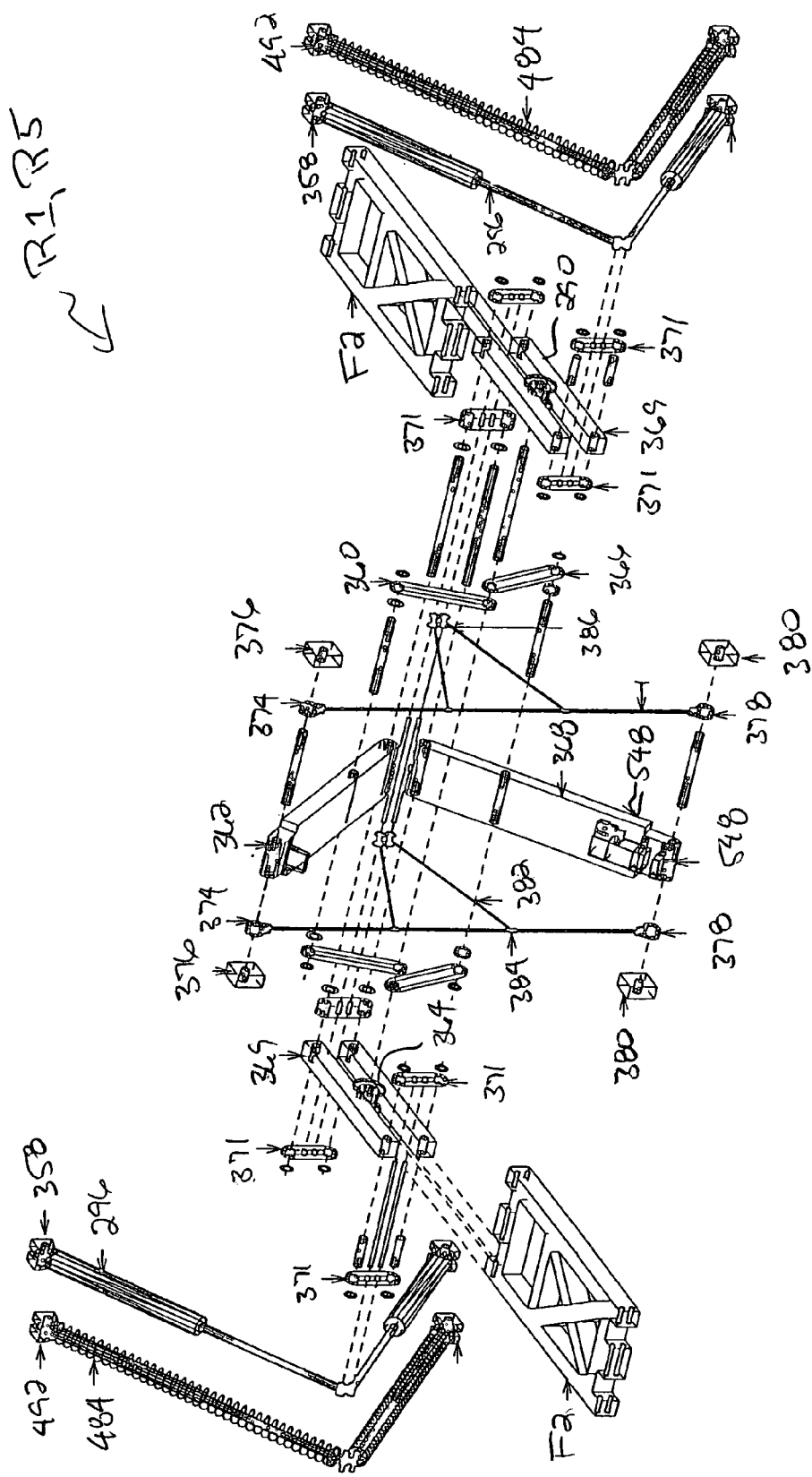
FIG. 39 is an exploded view of a Robot R1/Robot R5.
Figure 50:
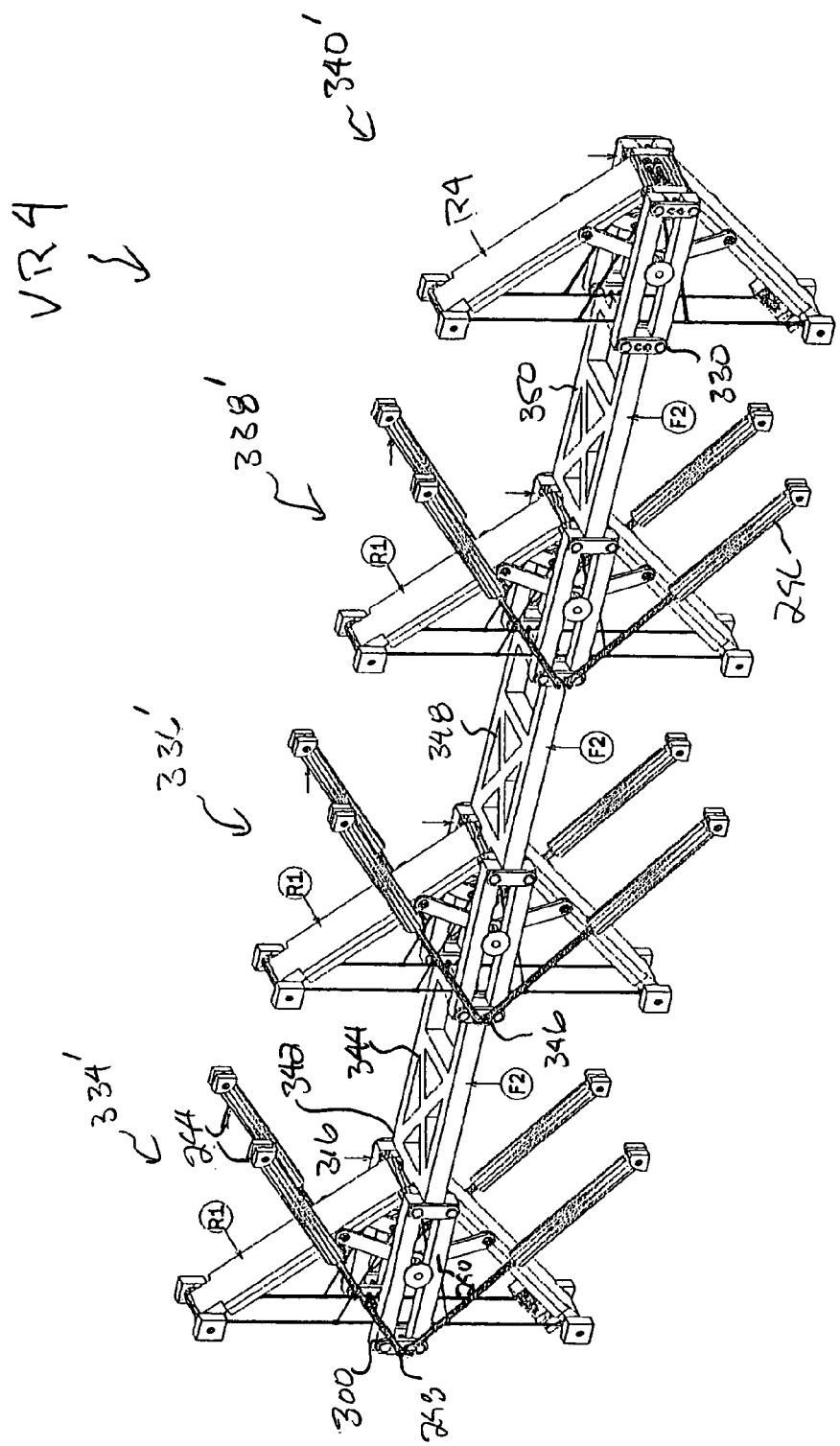
FIG. 50 is an enlarged view of the VR4 group of FIG. 28.

FIG. 29 is an enlarged view of the HR1 and VR1 groups of FIG. 28. Each HR1 and VR1 group includes four R4 robots 640, 642, 644, 646 and three R3 robots 648, 650, 652. FIG. 30 is an enlarged view of the HR3 group of FIG. 28. Each HR3 group includes three R1 robots 654, 656, 658 and two R3 robots 660, 662. FIG. 31 is an enlarged view of the VR3 group of FIG. 28. Each VR3 group includes four R1 robots 664, 666, 668, 670 and three R3 robots 672, 674, 676. FIG. 32 is an enlarged view of the HR2 group of FIG. 28. Each HR2 group includes three R1 robots 318, 322, 326, one R4 robot 332, and one R2 robot 678. FIG. 33 is an enlarged view of the VR2 group of FIG. 28. Each VR2 group includes three R1 robots 334, 336, 338, one R4 robot 340, and one R2 robot 680. FIG. 50 is an enlarged view of the VR4 group of FIG. 28. Each VR4 group includes three R1 robots 334', 336', 338' and one R4 robot 340'.

The R1, R2, R3, and R4 robots all have a horizontal roller frame 290, 292, 304, 308 on each side of the robot. The R1 robots also have a pair of hydraulic jacks 294 is mounted to each of the horizontal roller frames 290. More specifically, a first end 298 of both hydraulic jacks 296 of each pair 294 is mounted to the first end 300 of the respective horizontal roller frame 290.

For the HR1 and VR1 groups (FIG. 29), the R3 robots are disposed between the R4 robots, with the first ends 306 of the horizontal roller frames 304 of the R3 robots being connected to the first ends 310 of the horizontal roller frames 308 of the adjacent R4 robots.

For the HR3 group (FIG. 30), the R3 robots are disposed between the R1 robots, with the first ends 306 of the horizontal roller frames 304 of the R3 robots being connected to the first ends 300 of the horizontal roller frames 290 of the adjacent R1 robots, and a pair of hydraulic jacks 294 being disposed between the R1 robot and the R3 robot.

For the VR3 group (FIG. 31), the R3 robots are disposed between the R1 robots, with the first ends 306 of the horizontal roller frames 304 of the R3 robots being connected to the first ends 300 of the horizontal roller frames 290 of the adjacent R1 robots, and a pair of hydraulic jacks 294 being disposed between the R1 robot and the R3 robot.

For the HR2 group (FIG. 32), the three R1 robots 318, 322, 326 are adjacent, one R4 robot 332 is disposed at one end of the group of R1 robots, and one R2 robot 678 mounted to R1 robot 318. The first ends 302 of the extended double deck steel frame segments 291 of the horizontal roller frames 292 of the R2 robot are connected to the first ends 300 of the horizontal roller frames 290 of R1 robot 318. A first end 312 of a first double deck steel frame F1 314 is connected to the second end 316 of the horizontal roller frames 290 of the first R1 robot 318 and the second end 320 of the first steel frame F1 314 is connected to the first end 300 of the horizontal roller frames 290 of the second R1 robot 322. Similarly, the first end 312 of the second steel frame F1 324 is connected to the second end 316 of the horizontal roller frames 290 of the second R1 robot 322, the second end 320 of the second steel frame F1 324 is connected to the first end 300 of the horizontal roller frames 290 of the third R1 robot 326, the first end 312 of the third steel frame F1 328 is connected to the second end 316 of the horizontal roller frames 290 of the third R1 robot 326, and the second end 320 of the third steel frame F1 328 is connected to the second end 330 of the horizontal roller frames 308 of the R4 robot 332.

The VR2 group (FIG. 33) and VR4 group (FIG. 50) are very similar, each of the groups having three adjacent R1 robots 334, 336, 338, 334', 336', 338' and one R4 robot 340, 340' that is disposed at one end of the group of R1 robots. A first end 342 of a first single deck steel frame F2 344 is connected to the second end 316 of the horizontal roller frames 290 of the first R1 robot 334, 334' and the second end 346 of the first steel frame F2 344 is connected to the first end 300 of the horizontal roller frames 290 of the second R1 robot 336, 336'. Similarly, the first end 342 of the second steel frame F2 348 is connected to the second end 316 of the horizontal roller frames 290 of the second R1 robot 336, 336', the second end 346 of the second steel frame F2 348 is connected to the first end 300 of the horizontal roller frames 290 of the third R1 robot 338, 338', the first end 342 of the third steel frame F2 350 is connected to the second end 316 of the horizontal roller frames 290 of the third R1 robot 338, 338', and the second end 346 of the third steel frame F2 350 is connected to the second end 330 of the horizontal roller frames 308 of the R4 robot 340, 340'. The VR2 group (FIG. 33) also has one R2 robot 680 disposed at the second end of the group of R1 robots, with the first ends 302 of the extended double deck steel frame segments 291 of the horizontal roller frames 292 of the R2 robot being connected to the first ends 300 of the horizontal roller frames 290 of R1 robot 334.

As shown in FIGS. 34a–34d, the single deck steel frames F2 of the VR2 groups passes through the gap 351 formed by the steel members 352 of the double deck steel frames F1 of the HR2 groups. In FIGS. 34b and 34d, hydraulic fluid has been pumped into the hydraulic jacks 296 of the HR1, HR2, HR3, VR1, VR2, VR3 and VR4 groups, pushing the second ends 354 of the hydraulic jacks 296 away from each other and thereby pushing the floors away from each other. This causes the towers to extend from the bottom position 22. As the second ends 354 of the hydraulic jacks 296 are pushed away from each other, the horizontal roller frames 290, 308 move 356 from right to left direction, the VR1, VR3 and HR2 groups producing movement in the X direction and the HR1, HR3, VR4 and VR2 groups producing movement in the Y direction (FIG. 1). In FIGS. 34a and 34c, hydraulic fluid has been released from the hydraulic jacks 296 of the HR1, HR2, HR3, VR1, VR2, VR3 and VR4 groups, allowing the weight of the floor to push the second ends 354 of the hydraulic jacks 296 towards each other, causing the towers to retract to the bottom position 22.

With reference to FIGS. 51a and 51b, the arrangement of the VR2 and HR2 groups of the ground floor 288' is the same as described above, except that the hydraulic jacks of robots R1 are replaced with a vibration hydraulic jack with spring 484. The ground floor 288' has a special function. When a great wind force or earthquake occurs, the ground floor hydraulic jacks with springs 484 will absorb the energy. If the vibration force exceeds the absorption capacity of the hydraulic jacks with springs 484 at their rest supporting stage, the vibration force will push the robot groups in HR2 and VR2 down from top to bottom level, the horizontal roller frames 292, 290, 308 move from left to right. Finally the R1 robot transfers the energy force through the push and pull frame F1 and F2 to the adjacent R1 robots and into the R2 robot. The HR2 group transfers the x-direction force to the end of group, at the same time the VR2 group transfers the y-direction force to the end of group. The floor will be pushed down uniformly to the same level at the same time until the hydraulic jacks with springs 484 of the HR2 and VR2 groups absorb all the energy. When the vibration force is removed, the hydraulic jacks with springs 484 will push the HR2 and VR2 groups back to original position.

FIGS. 35–43 are external and internal views of robots R1, R3, R4 and R5 showing the relationship of the robot components as they move from the bottom position to the extended position. Movement of the robots R1, R3, R4 and R5 is controlled by the hydraulic jacks. For robots R1, each hydraulic jack 296 has a first end 298 connected to a shaft extending through the side of horizontal roller frame 290 and a second end 354 having a base 358. For robots R5, each vibration hydraulic jack with spring 484 has a first end 486 connected to a shaft extending through the side of horizontal roller frame 488 and a second end 490 having a base 492.

An upper arm 360, 388, 420, 452 has a first end connected to an upper clipper 362, 390, 422, 454 and the second end connected to a roller 364, 392, 424, 456 and a lower arm 366, 394, 426, 458 has a first end connected to a lower clipper 368, 396, 428, 460 and a second end connected to the roller 364, 392, 424, 456. Each horizontal roller frame 290, 308, 304, 488 includes two frame members 369, 398, 430, 462 that are mounted together at each end by a pair of mounting members 371, 400, 432, 464. The roller 364, 392, 424, 456 extends through a slot 370, 402, 434, 466 formed between the two frame members 369, 398, 430, 462 and is locked therein by a washer 372, 404, 436, 468 mounted to the roller 364, 392, 424, 456.

When the robots are extended, the upper clipper 362, 390, 422, 454 is pushed upward and lower clipper 368, 396, 428, 460 is pushed downward, and the upper arm 360, 388, 420, 452 and lower arm 366, 394, 426, 458 urge roller 364, 392, 424, 456 away from the first end 300, 310, 306, 494 of the horizontal roller frame 290, 308, 304, 488 toward the second end 316, 330, 307, 496 of the horizontal roller frame 290, 308, 304, 488. An upper cable clevis 374, 406, 438, 470 is fixed on the shaft between the upper base 376, 408, 440, 472 and the upper clipper 362, 390, 422, 454 and a lower cable clevis 378, 410, 442, 474 is fixed on the shaft between the lower base 380, 412, 444, 476 and the lower clipper 368, 396, 428, 460. A first end of secondary cable 382, 414, 446, 478 is fastened to the main cable 384, 416, 448, 480 by a clip 385 (FIG. 43) and the second end is fastened to the retractable cable reel 386, 418, 450, 482.

When the robots retract, the upper clipper 362, 390, 422, 454 is pushed downward, the lower clipper 368, 396, 428, 460 is pushed upward, and the secondary cable 382, 414, 446, 478 is rolled onto the retractable cable roller 386, 418, 450, 482, pulling the secondary cables 382, 414, 446, 478 and the main cables 384, 416, 448, 480.

FIG. 40 shows a locking device 548 for locking the upper clipper 362 to the lower clipper 368. The locking device 548 includes a shaft 550 that is reciprocally moved by a hydraulic jack 552. The end of the hydraulic jack 552 is mounted to the shaft 550 by a pin 554 that passes through a pair of angles 556 and a slot in the jack shaft 558. The angles 556 are mounted to the shaft 550. The jack body 560 is mounted to the lower clipper 368 by a pin 562 that passes through plates 564, mounted to another pair of angles 566, and the jack body 560. The angles 566 are mounted to the guide 568. Three guides 568, 570, 572 are mounted to the lower clipper 368 and one guide 574 is mounted to the upper clipper 362 for guiding and receiving the shaft 550. The shaft 550 extends through the first and second guides 568, 570 in both the unlocked and locked positions. When Robot R1 and R4 are in the bottom position, the fourth guide 574 mounted to the upper clipper 362 aligns with the first, second and third guides 568, 570, 572 mounted to the lower clipper 368. At this time, the hydraulic jack 552 may be actuated to extend the jack shaft 558 and the shaft 550 through the fourth guide 574 and into the third guide 572, thereby locking the upper clipper 362 to the lower clipper 368. To extend Robot R1 and R4, the hydraulic jack 552 must again be actuated to withdraw the jack shaft 558 and the shaft 550 from the third and fourth guides 572, 574.

As shown in FIG. 41, the cable reel 386, 418, 450, 482, includes a pair of coil springs 576, 578. Each coil spring 576, 578 has a first end fixed to a wall of an internal cylinder 580 of recess wheel 582 by bolt and nut that pass through the recess wheel 582 and then fix to the shaft 584, the second end is fixed to the external cylinder 586 by bolt and nut. The internal and external cylinders 580, 586 are mounted to a center nut 588. The center nut 588 has a recess 590 having an opening 592 through which passes the secondary cable 382, 414, 446, 478. A lock 594 holds the secondary cable 382, 414, 446, 478.

Figure 44:
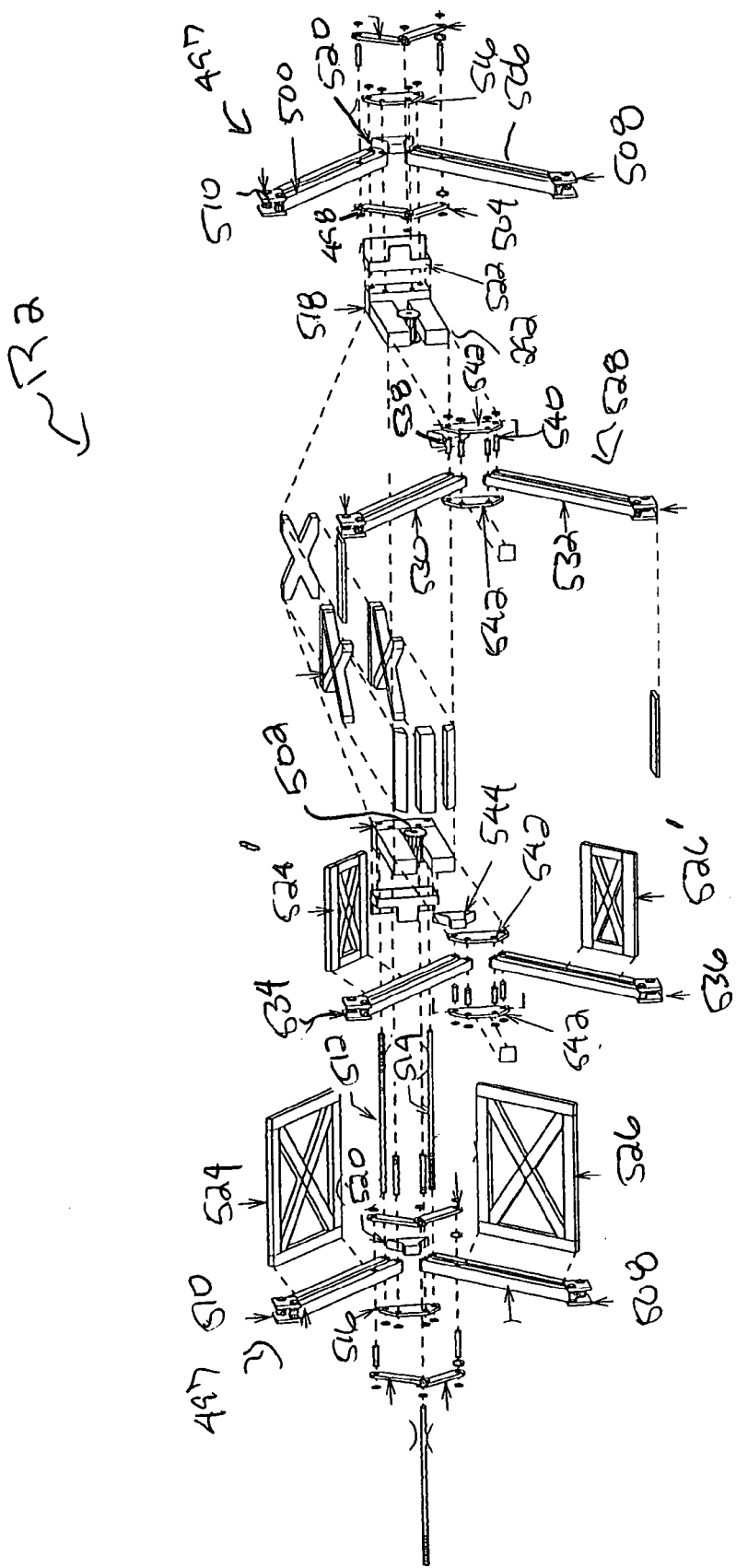
FIG. 44 is an exploded view of a Robot R2.
Figure 45:
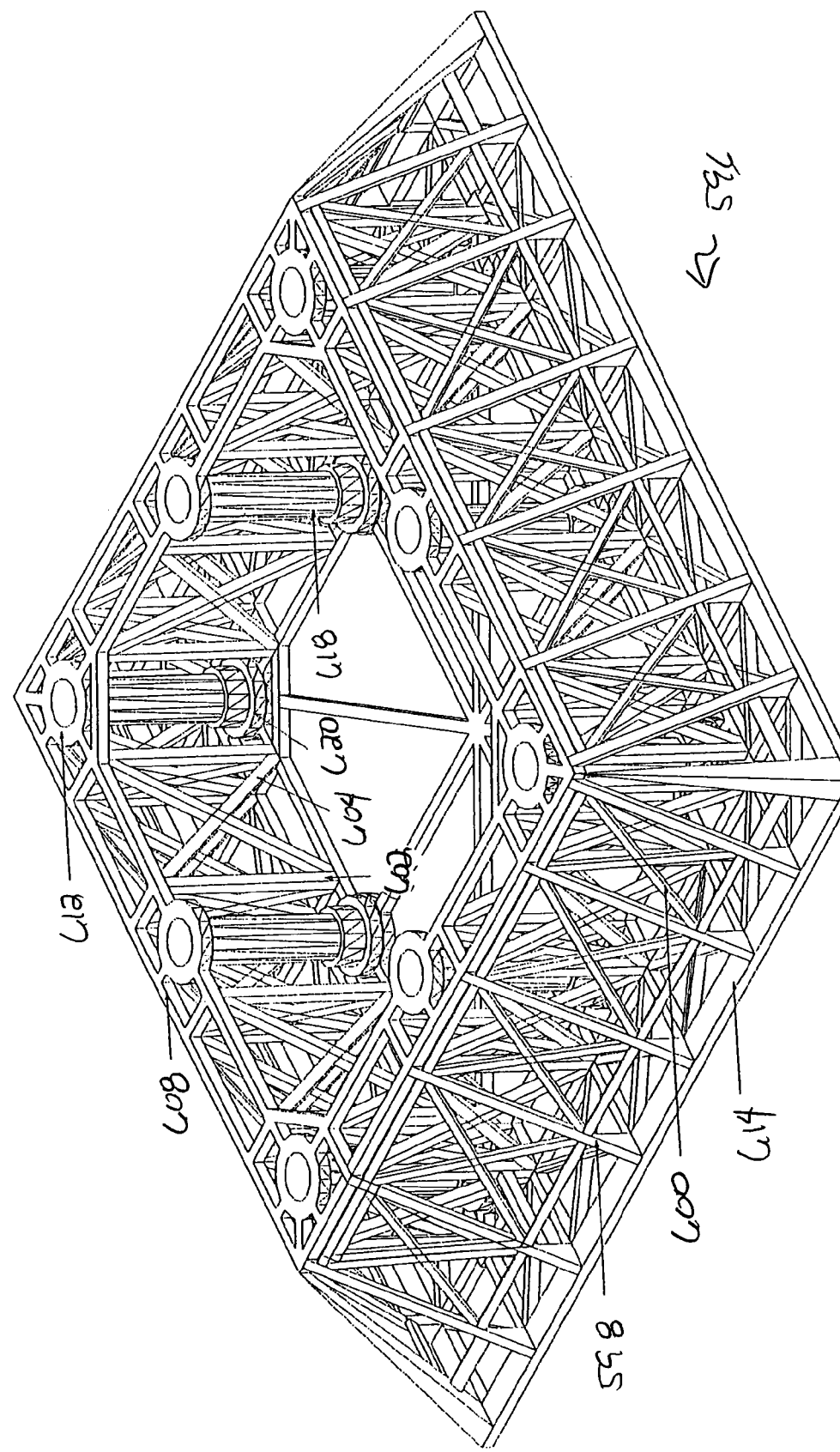
FIG. 45 is an enlarged perspective view of a space frame ring of one of the towers.
Figure 46:
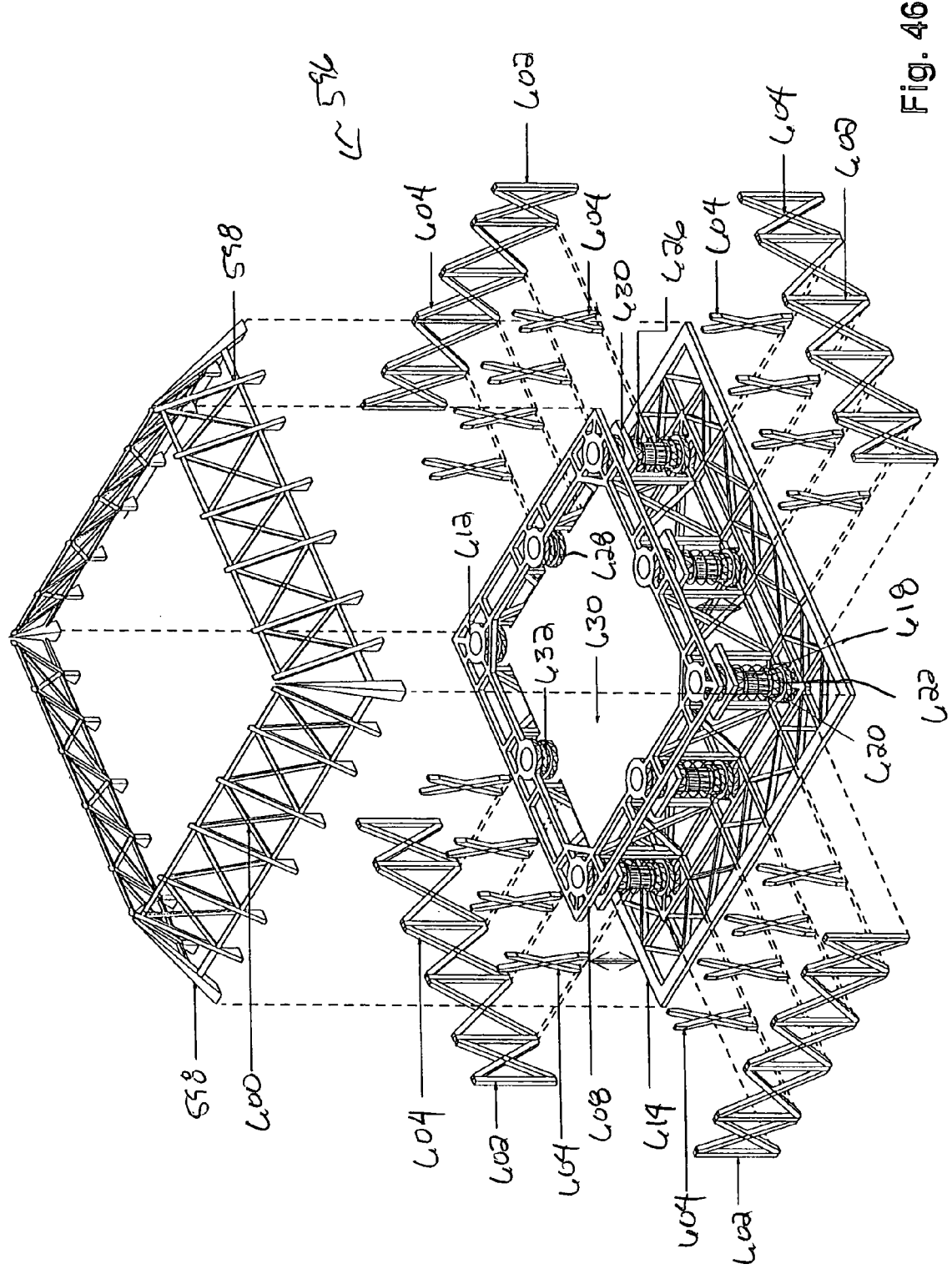
FIG. 46 is an exploded perspective view of the space frame ring of FIG. 45.
Figure 47:
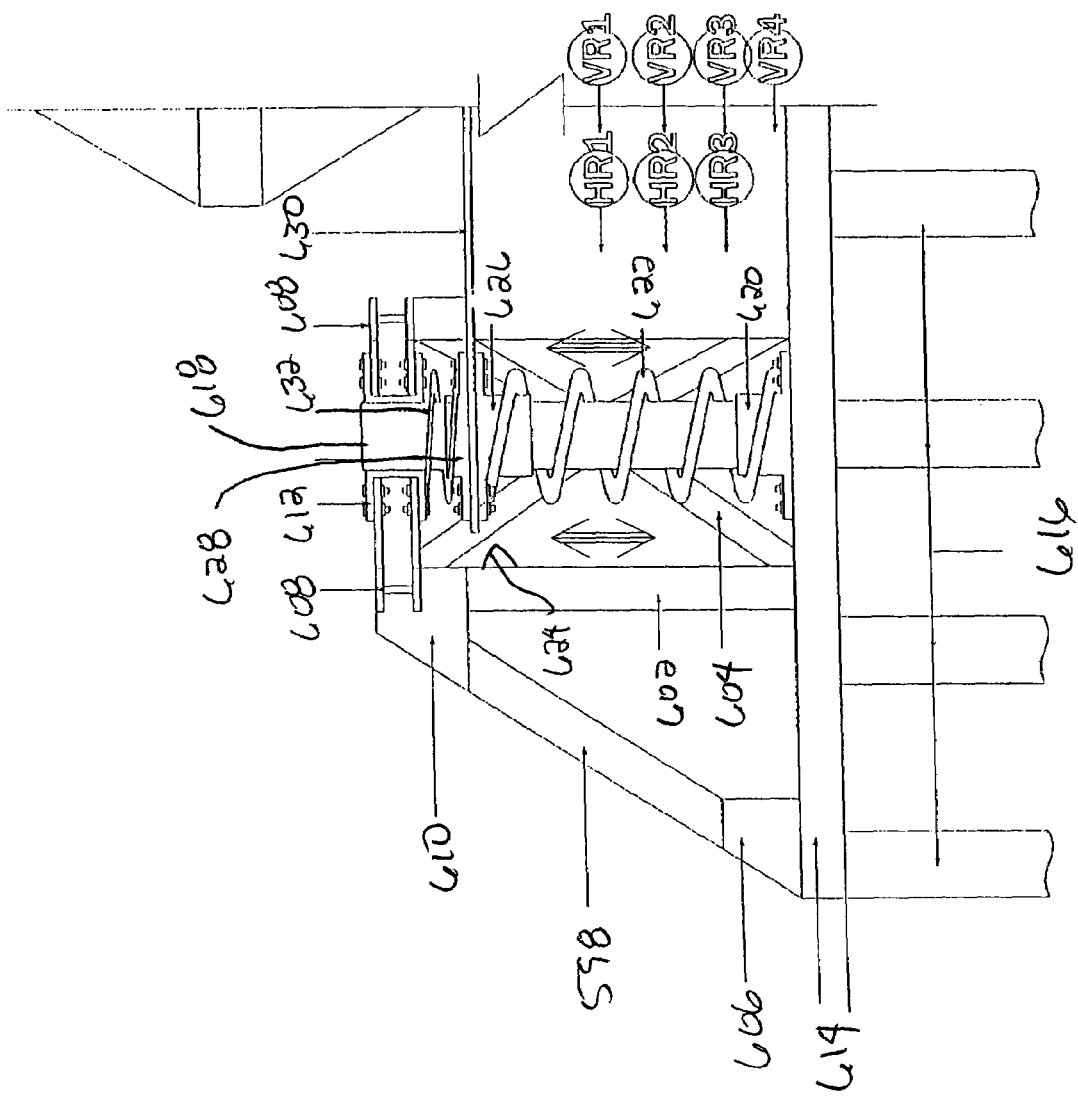
FIG. 47 is a sectional view of the space frame ring of FIG. 45.

FIGS. 44 and 52 are external and internal views of robot R2 showing the relationship of the robot components as they move from the bottom position to the extended position. Movement of the robots R2 is controlled by the hydraulic jacks of the robots R1.

Robot R2 comprises a first pair of clipper assemblies 497, each of the clipper assemblies 497 including an upper arm 498 having a first end connected to an upper clipper 500 and a second end connected to a roller 502, and a lower arm 504 having a first end connected to a lower clipper 506 and a second end connected to the roller 502. The roller extends through a slot formed in each horizontal roller frame 292. The second end 301 of the extended double deck frame F1 291 is connected to the roller 502. The first ends of the upper and lower clippers 500, 506 each have a base 508, 510 and the second ends of the upper and lower clippers 500, 506 are each connected to a shaft 512, 514 by a slot plate 516. Slot plate 516 is mounted to the second end 518 of horizontal roller frame 292 by fixed plate 520 and bracket frame 522 by bolts and nuts. The shafts 512, 514 are locked to the slot plate 516 by round disk lockers. The upper clipper 500 is fixed to an upper transverse frame 524 and the lower clipper 504 is fixed to a lower transverse frame 526.

Robot R2 also comprises a second pair of clipper assemblies 528, each of the clipper assemblies 528 including upper and lower clippers 530, 532. The first ends of the upper and lower clippers 530, 532 each have a base 534, 536 and the second ends of the upper and lower clippers 530, 532 are each connected to a shaft 538, 540 by a pair of slot plates 542. Slot plates 542 are mounted to the first end 302 of horizontal roller frame 292 by fixed plate 544 and by bolts and nuts. The shafts 538, 540 are locked to the slot plate 542 by round disk lockers. The upper clipper 530 is fixed to an upper transverse frame 524' and the lower clipper 532 is fixed to a lower transverse frame 526'.

When the robots are extended, the upper clippers 500, 530 are pulled upward and lower clippers 506, 532 are pulled downward, and the upper arm 498 and lower arm 504 urge roller 502 away from the first end 302 of the horizontal roller frame 292 toward the second end of the horizontal roller frame 292 (FIG. 52). When the extended double deck frame F1 291 engages the panel 546 connected to the horizontal roller 502, the robot R2 has reached its maximum extension and the floor is locked at the maximum height, preventing over extension of the robots.

Figure 53:
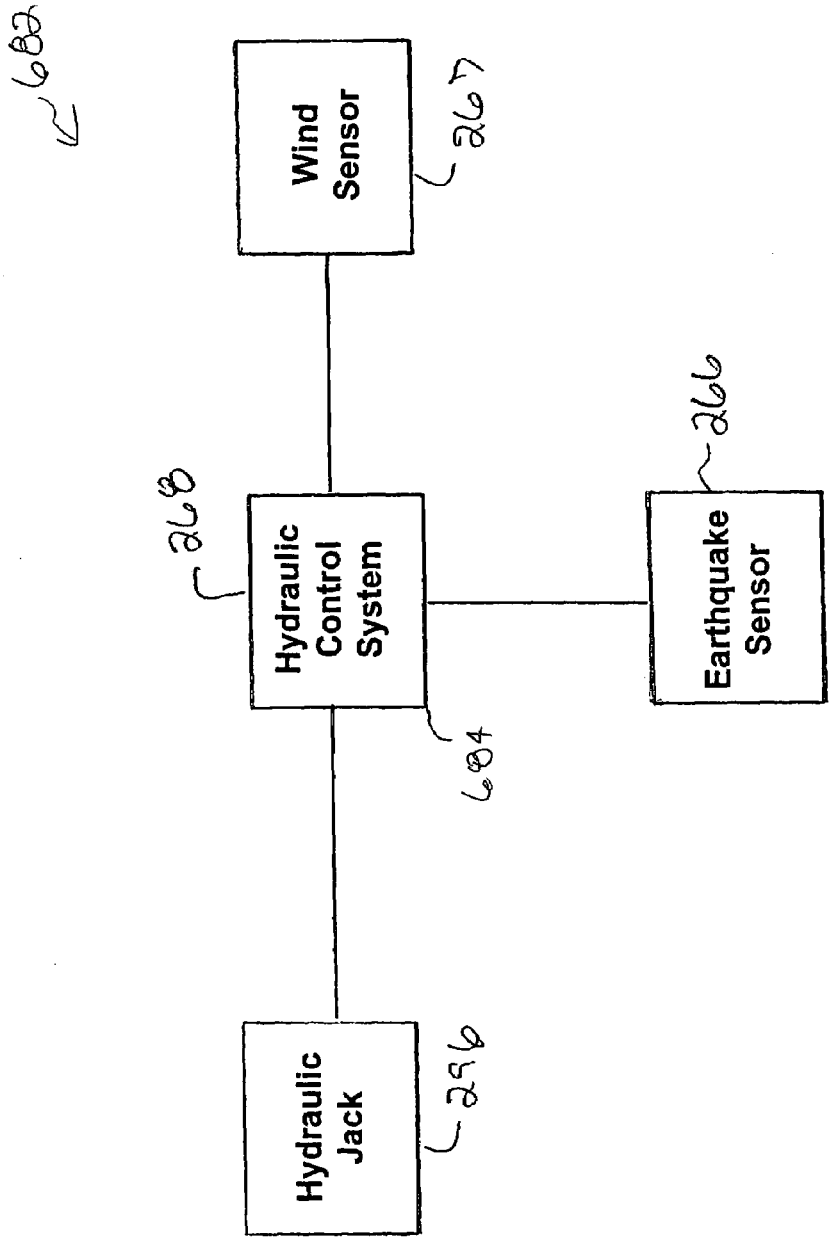
FIG. 53 is a functional block diagram of the solar power station control system.

With reference to FIG. 53, the solar power station control system 682 preferably includes at least one earthquake sensor 266 and at least one wind sensor 267. More preferably, the solar power station control system 682 includes a network of local and remote earthquake sensors 266 and wind sensors 267. In the preferred embodiment, the network of earthquake sensors 266 includes automated sensing stations equipped with instrument such as seismographs and tiltmeters. The sensing stations are distributed so as to record any seismic motion, creating a monitoring grid that can locate the longitude and latitude of the earthquake epicenter and the depth where the rupture originated. The network also records the point of highest wave intensity, which is generally centered around the fault and thus can be far away from the epicenter. The earthquake and wind sensors 266, 267 are connected to the control system computer 684 in a manner known in the art, e.g. hard-wire connection or radio connection.

Figure 54:
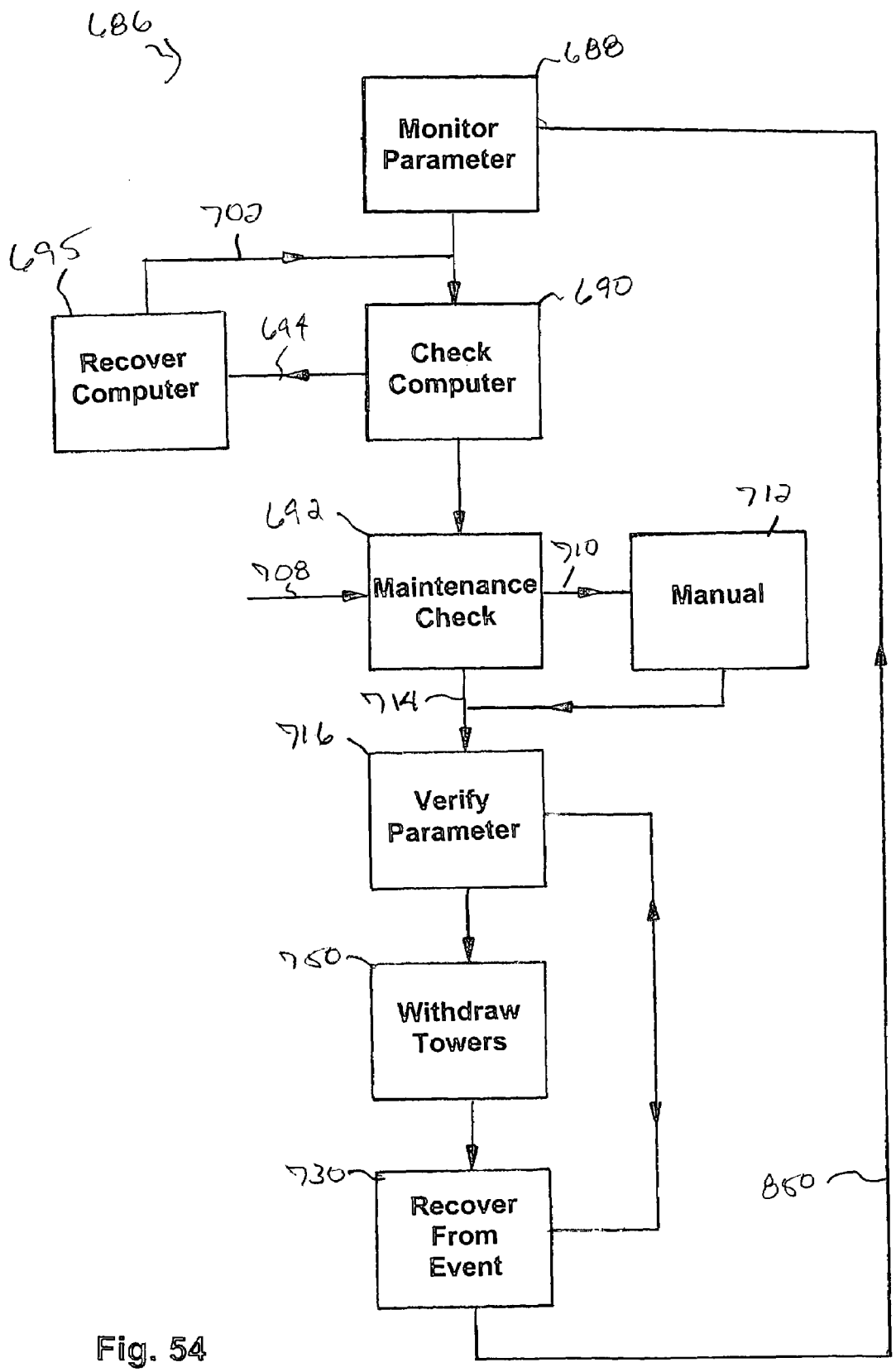
FIG. 54 is a flow diagram of the main routine for responding to an earthquake or high wind.

With reference to FIG. 54, three subroutines of the control system computer main routine 686 run concurrently. The monitor parameter subroutine 688 continually monitors the earthquake, wind sensors 266, 267 the computer check subroutine 690 continually monitors the performance of the control system computer 684, and if the maintenance work is start, maintenance check subroutine 692 continually monitors for maintenance being performed on the control system 682. If the hardware of the solar power station 10 suddenly fails, the maintenance check subroutine 692 blocks all computer subroutine control of the hydraulic jacks 296, blocking the system computer 684 supply electrical to the hydraulic pump until the maintenance work is finished and provides notice of scheduled maintenance that must be performed.

Figure 56:
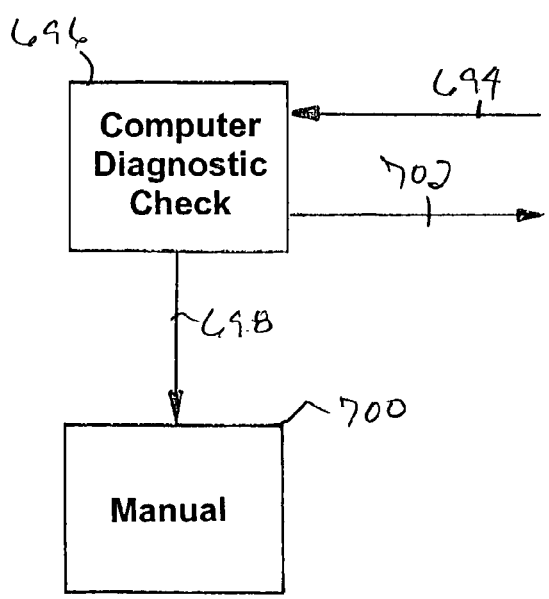
FIG. 56 is a flow diagram of the recover computer subroutine of FIG. 54.

If the computer check subroutine 690 determines that the control system computer 684 does not appear to be operating properly 694, recover computer subroutine 695 have alarm/signal is initiated 696 to alert the computer operator or other appropriate personnel to evaluate operation of the control system computer 684 (FIG. 56). If computer diagnostics determine that the control system computer 684 is not operating properly, the computer 684 is placed out of service and the control system is placed in manual control 700 and repairs to the control system computer are initiated. After the control system computer 684 is repaired, the computer operator returns control 702 of the control system 682 to the main routine 686.

Figure 55:
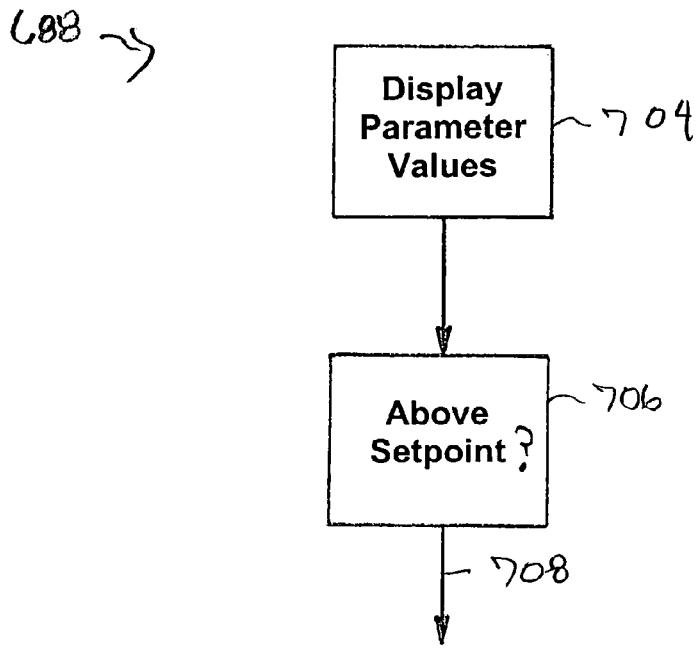
FIG. 55 is a flow diagram of the monitor parameter subroutine of FIG. 54.

With reference to FIG. 55, the monitor parameter subroutine 688 displays 704 the update values of any wind, seismic force or speed that is sensed (the sensed parameters) and compares 706 these values to predetermined setpoints. The setting of each setpoint depends on the structural loading capabilities of the towers. If Each setpoint is set sufficiently low to ensure that the control system 682 has sufficient time to withdraw the towers 12, 14, 16 before the force rises to a sufficient level to damage the solar power station 10. Conversely, each setpoint is set sufficiently high to prevent inadvertent withdrawal of the towers 12, 14, 16. If the sensed parameter exceeds the setpoint 708, the main routine queries the computer check 690 and maintenance check subroutines 692 of main routine 686 to verify that the control system computer 684 is operating properly and that maintenance is not being performed on the solar power station 10. If the control system 682 is in manual control due to the computer being out of service or maintenance operations, an alarm/signal is initiated by manual control subroutine 700 or 712 to alert the computer operator or other appropriate personnel to manually initiate the appropriate action. For example, if a seismic or high wind force event is occurring, the towers 12, 14, 16 are withdrawn manually with the emergency hydraulic pump. In another example, the emergency hydraulic pump may be used to lock the floors 288.

Figure 57:
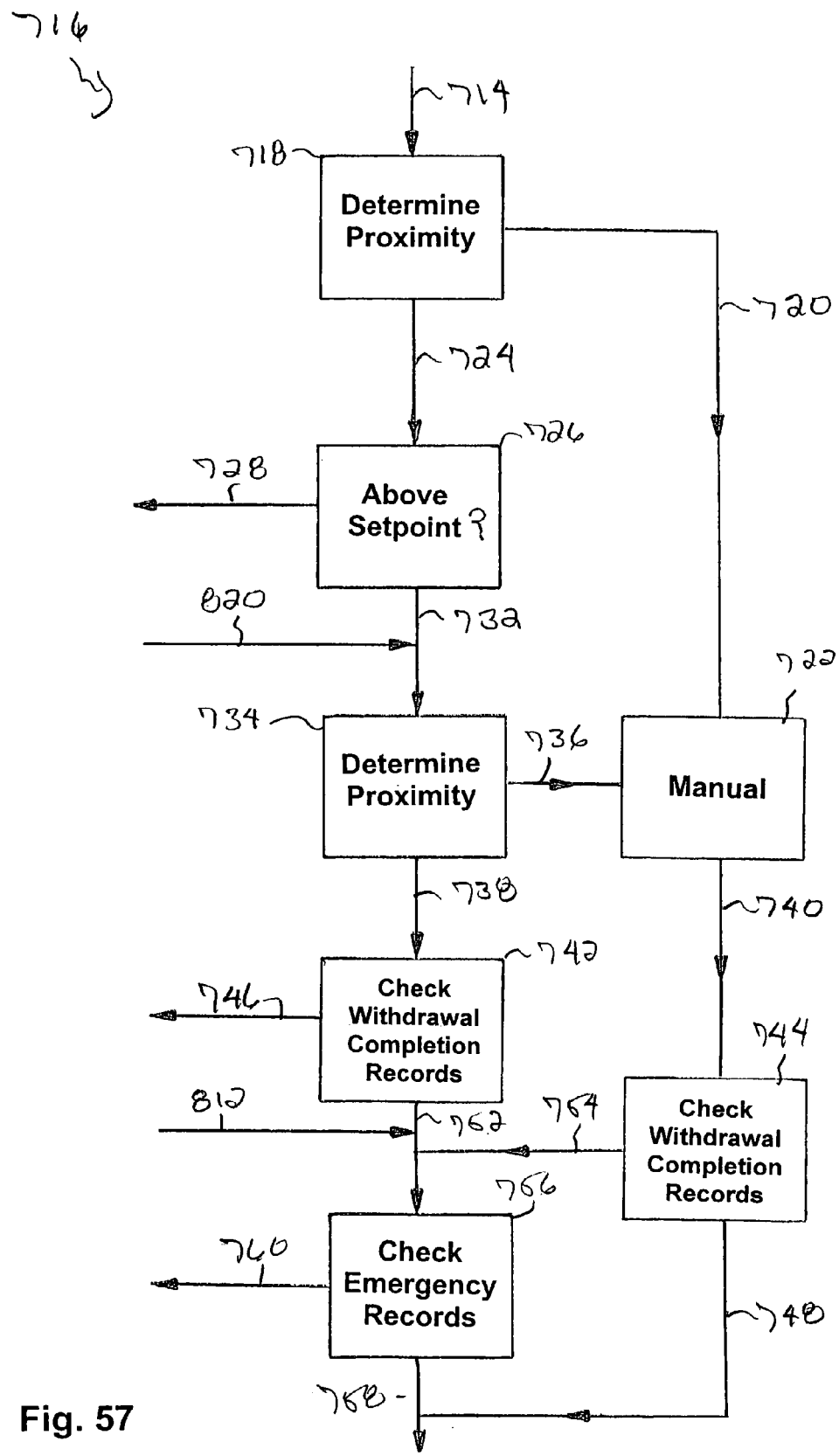
FIG. 57 is a flow diagram of the verify parameters subroutine of FIG. 54.

If the control system 682 is not in manual control 700 or 712, the main routine 686 initiates the verify parameter subroutine 716 (FIG. 57). The verify parameter subroutine 716 initially attempts to determine the proximity 718 of the parameter source and verify the intensity of the parameter. In the case of a seismic event, the point of highest wave intensity and the epicenter are located through the network or earthquake sensors 266 to determine their distance from the solar power station 10. The intensity of the seismic force is then evaluated by system computer 684 and appropriate personnel to determine the effect on the solar power station 10. In the case of a high wind force or hurricane, the source of the wind is located by radar to determine its distance from the solar power station 10. The weather bureau is queried to confirm the direction and intensity of the wind force. The system computer 684 and appropriate personnel evaluate the effect on the solar power station 10. If the evaluation of the parameter indicates that the seismic/wind force is likely to damage 720 the solar power station 10, a manual entry is made 722 into the emergency record to verify whether a fault or hurricane condition has been entered. If a fault has been entered, the control system turns on a green flashing light. If a hurricane has been entered, the control system turns on a red flashing light, to remind the appropriate personnel of the condition and of the necessity to check operation of the withdraw towers subroutine 750, and then initiates withdrawal of the towers 12, 14, 16.

If the proximity of the parameter cannot be determined 724, the verify parameter subroutine 716 then compares 726 the measured value of the each parameter source (seismic/wind force) to a setpoint. If the each source (seismic/wind force) measured value is less than the setpoint, the main routine 686 exits 728 the verify parameter subroutine 716 to the recover from event subroutine 730. If the measured value is greater than the setpoint 732, the verify parameter subroutine 716 again attempts to determine the proximity 734 of the parameter so that the source of the parameter may be inspected. If the proximity can be determined, and if the evaluation of the parameter indicates that the fault/hurricane is likely to damage the solar power station 736, a manual entry is made 722 into the emergency record, as described above.

If the proximity of the parameter cannot be determined 738, or if a manual entry is made 740 to initiate withdrawal of the towers 12, 14, 16, as described above, the verify parameter subroutine 716 then checks 742, 744 the withdraw completion records to verify that the towers have been withdrawn to reduce/minimize the moment arm affect of the towers and to avoid withdrawal of the towers again.

In the first case, if the withdraw completion records at 742 indicate that the towers have fully withdrawn, the main routine 686 exits 746 the verify parameter subroutine 716 to the recover from even subroutine 730. If the withdraw completion records at 742 indicate that the tower has not been completely withdrawn 752, the tower withdrawal continues. To avoid waste of time the emergency record is checked 756, if the parameter source still exists, the main routine 686 exits 760 the verify parameter subroutine 716 and initiates the recover from event subroutine 730. If the parameter source no longer exists, the main routine 686 exits 758 to the withdraw towers subroutine 750, initiating withdrawal of the towers 12, 14, 16.

In the second case, after the manual entry 722 the verify parameter subroutine 716 then checks 744 the withdraw completion records to verify that the towers have been withdrawn to reduce/minimize the moment arm affect of the towers and to avoid withdrawal of the towers again. If the withdraw completion records indicate that the tower has not been completely withdrawn, the main routine 686 exits 748 the verify parameter subroutine 716 and initiates the withdraw towers subroutine 750. If the withdrawal completion records indicate that withdrawal has been completed 754, then verify parameter subroutine 716 checks 756 the emergency records to determine parameter source assigned in the emergency record and evaluates whether the fault/hurricane still exists. If the parameter source still exists, the main routine 686 exits 760 the verify parameter subroutine 716 and initiates the recover from event subroutine 730. If there is no parameter source assigned in this emergency record, the fault/hurricane is not existing, the main routine 686 exit 758.

Figure 58A:
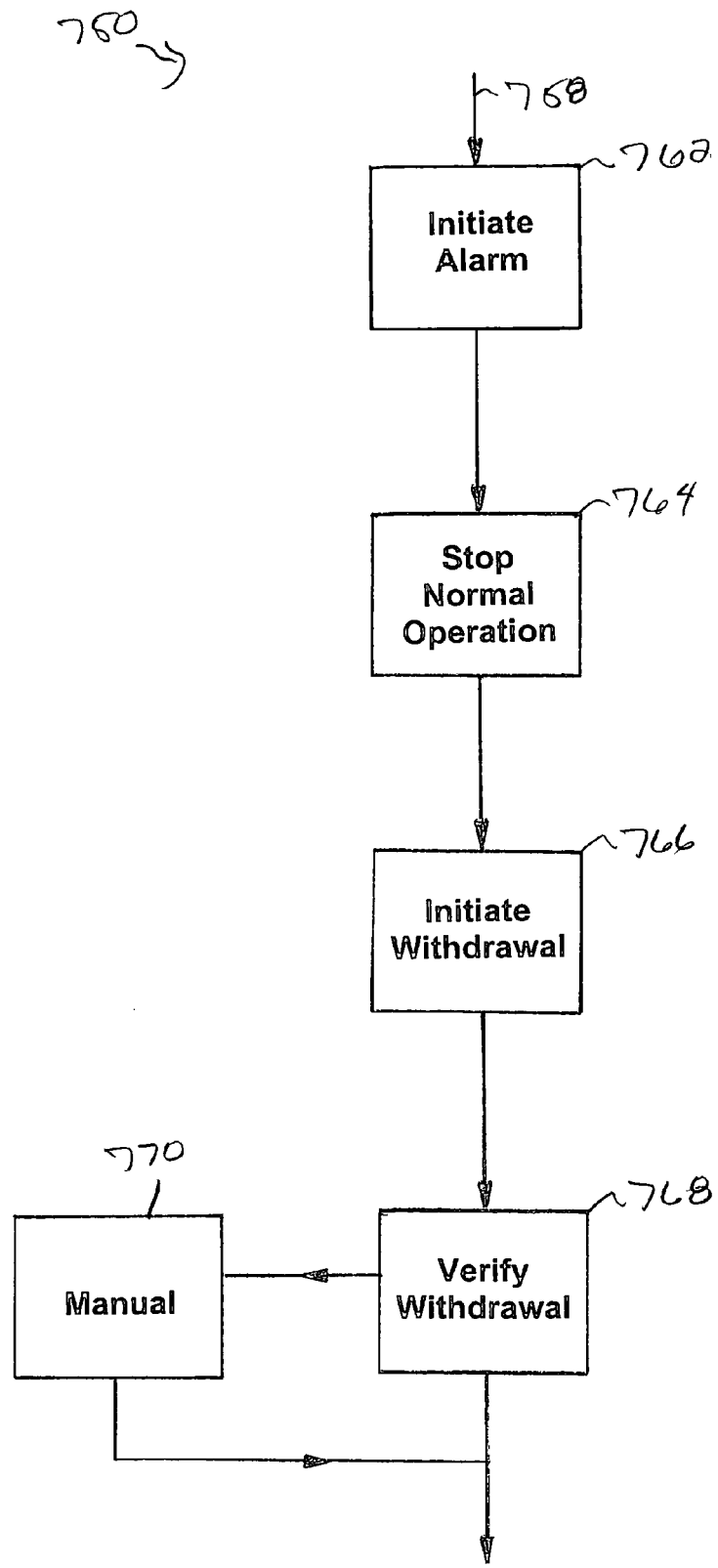
FIGS. 58a and 58b are a flow diagram of the withdraw towers subroutine of FIG. 54.
Figure 58B:
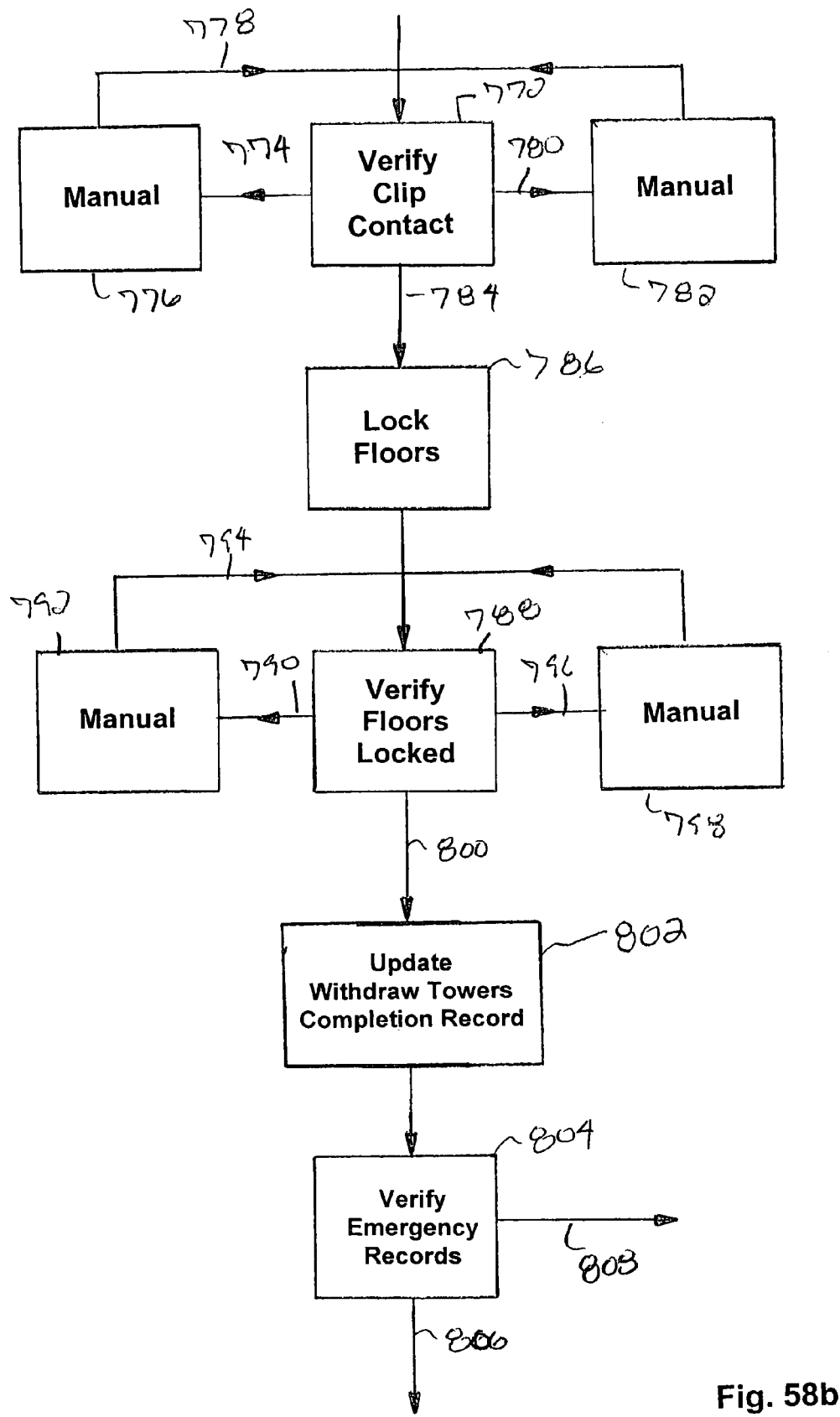
Figure 62:
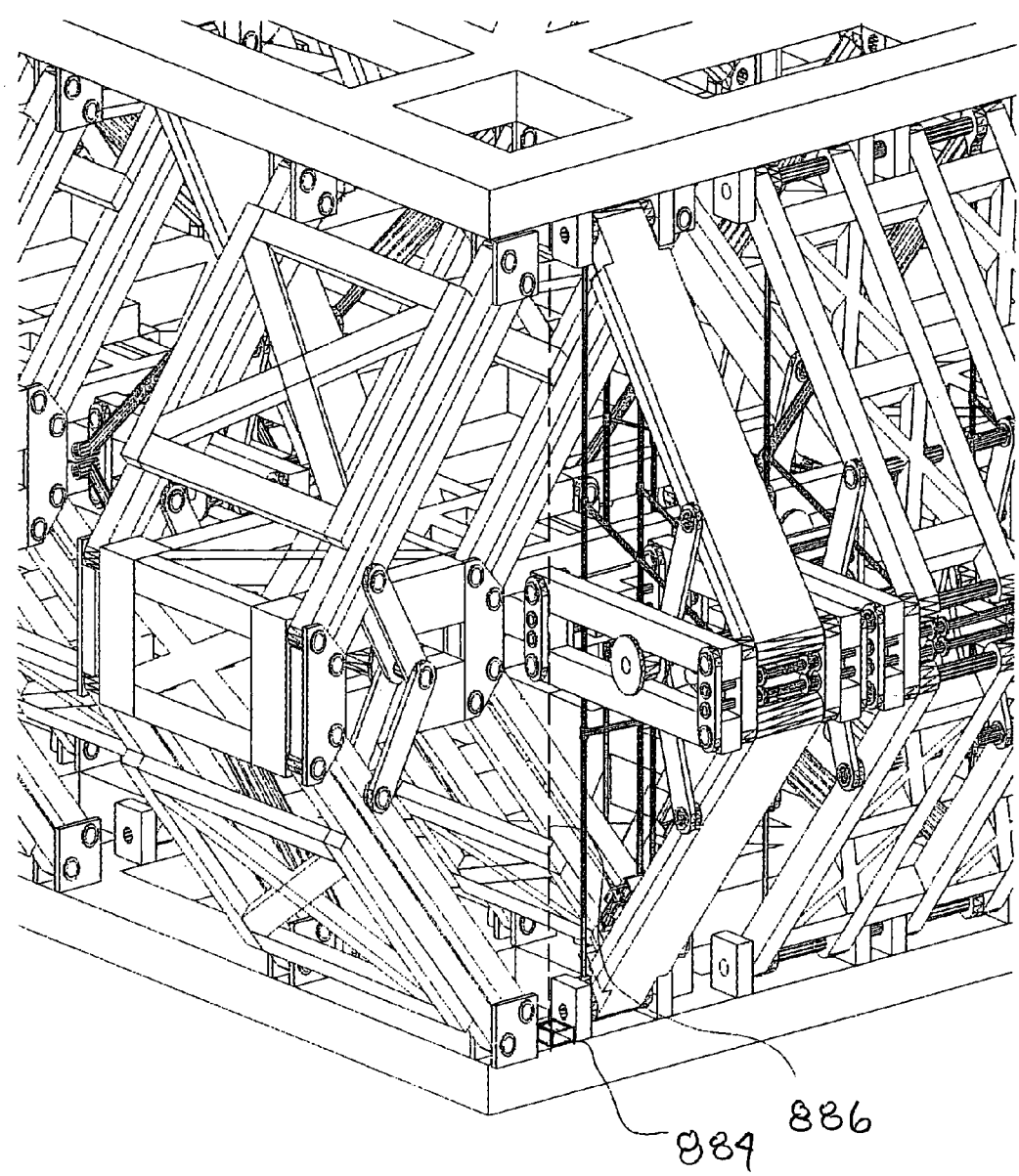
FIG. 62 is an enlarged side view of one of the floors of one of the towers of FIG. 1.

With reference to FIG. 58, the withdraw towers subroutine 750 starts by turning on an alarm 762. Next, the withdraw towers subroutine 750 stops normal operation 764 stop (all normal operation) processing which program concurrently run and execute in parallel to the control system 682. For example, the routine for determining the sun position is stopped and the hydraulic oil pump used to supply hydraulic fluid to the hydraulic jacks is stopped (refer to subroutine 730 normal operation processing determine sun position 852, initiate panel positioning 854, check floor level 856). Then the withdraw towers subroutine 750 initiates withdrawal 766. The computer 684 queries the level sensor 884 (FIG. 62) for each floor 288 of each tower 12, 14, 16 in order to determine the position of each such floor 288 with respect to the withdrawn position of the floor 288. After the individual floor positions have been determined, the withdraw towers subroutine 750 initiates withdrawal 766 by restarting the hydraulic oil pump to withdraw all of the oil from the hydraulic jacks that are not in the withdrawn position. The level sensor 884 is installed at the corner of tie beam members 634 of each floor 288 of each tower. The level sensor 884 may utilize a laser beam 886 or similar technology (FIG. 62).

The withdraw towers subroutine 750 then verifies 768 that all of the floors 288 have withdrawn by querying the level sensor 884 of each floor 288 of each tower 12, 14, 16. If any non-withdrawn floors 288 are detected, the withdraw towers subroutine 750 starts an alarm 770 to notify the appropriate personnel that floors 288 must be manually withdrawn. In this event, the operator(s) use the emergency hydraulic oil pump to withdraw the oil from the hydraulic jacks associated with the indicated floor(s) 288.

Figure 60:
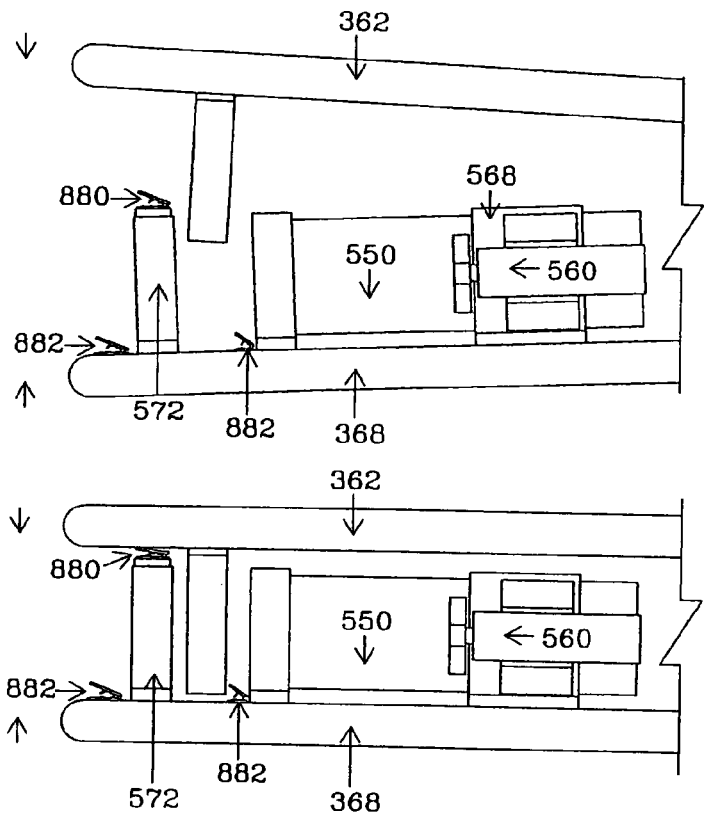
FIG. 60 is a simplified side view of two floors of one of the towers of FIG. 1, showing one of the floors tilted with respect to the other floor.

After the floors 288 are either verified as withdrawn or manually withdrawn, the withdraw towers subroutine 750 verifies 772 that all of the floors 288 have withdrawn to a level position by querying the clip contact sensors 880 installed on the top of guide 572. When the floor is withdrawn, the upper clippers 362 and the lower clippers 368 of the robots R1 will automatically fold together (FIG. 60). Finally, the lower face of upper clippers 362 will push the switch on the clip contact sensor, which indicates that the floor is level. In the event that a floor 288 is not level 774 (a clip contact sensor 880 is not compressed by withdrawal of the associated floor), the withdraw towers subroutine 750 starts an alarm 776 to indicate that the associated floor must be manually leveled by operating the oil emergency control valve to evacuate the oil from the associated hydraulic jack. The withdraw towers subroutine 750 then re-verifies 778 that all of the floors 288 have withdrawn to a level position by querying the clip contact sensors 880. If it is found that the floor is still not in a level position 780, the withdraw towers subroutine 750 starts an alarm 782 to indicate that the tower 12, 14, 16 must be inspected and repaired.

Figure 61:
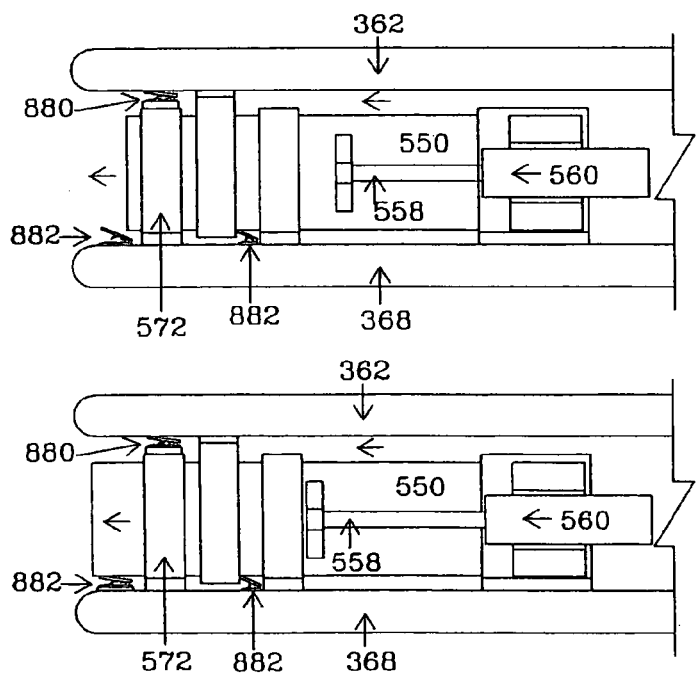
FIG. 61 is a simplified side view of two floors of one of the towers of FIG. 1, showing the two floors level with respect to each other.

If the clip contact sensors indicate that all of the floors 288 are in a fully withdrawn and level position 784, the withdraw towers subroutine 750 locks 786 the floors 288 of each tower 12, 14, 16 in the withdrawn position, actuating hydraulics to lock locking device 548. The withdraw towers subroutine 750 then verifies 788 that all of the floors 288 are locked by querying a locker contact sensor 882 installed at the upper-face of the lower clipper 368 (FIG. 61). When the locker shaft passes through the guide 572, the compressive force of the locker shaft 550 pushes the compression sensor switch, indicating that the locker shaft 550 has successfully passed through the last guide 572 and locked it. If any unlocked floors 288 are detected 790, the withdraw towers subroutine starts an alarm 792 to notify the appropriate personnel that floors 288 must be manually locked. In this event, the operator(s) use the emergency hydraulic oil pump to supply oil to the locking device hydraulic jack 552. The withdraw towers subroutine 750 then re-verifies 794 that all of the floors 288 have been locked by querying the locking device contact sensors 882. If it is found that the floor is still not locked 796, the withdraw towers subroutine 750 starts an alarm 798 to indicate that the tower 12, 14, 16 must be inspected and repaired.

If all of the floors 288 of each tower 12, 14, 16 are locked 800, the withdraw towers subroutine 750 updates 802 assign the withdraw completion record mean that withdraw the tower has been already completed withdraw and then checks 804 the emergency records to determine if there is an entry in the emergency record. If there is an entry in this record, the main routine 686 exits 806 the withdraw towers subroutine 750 and initiates the first step of the recover from event subroutine 730. If there is no entry in this record, the main routine 686 exits 808 the withdraw towers subroutine 750 and initiates a subsequent step 818 of the recover from event subroutine 730.

Figure 59A:
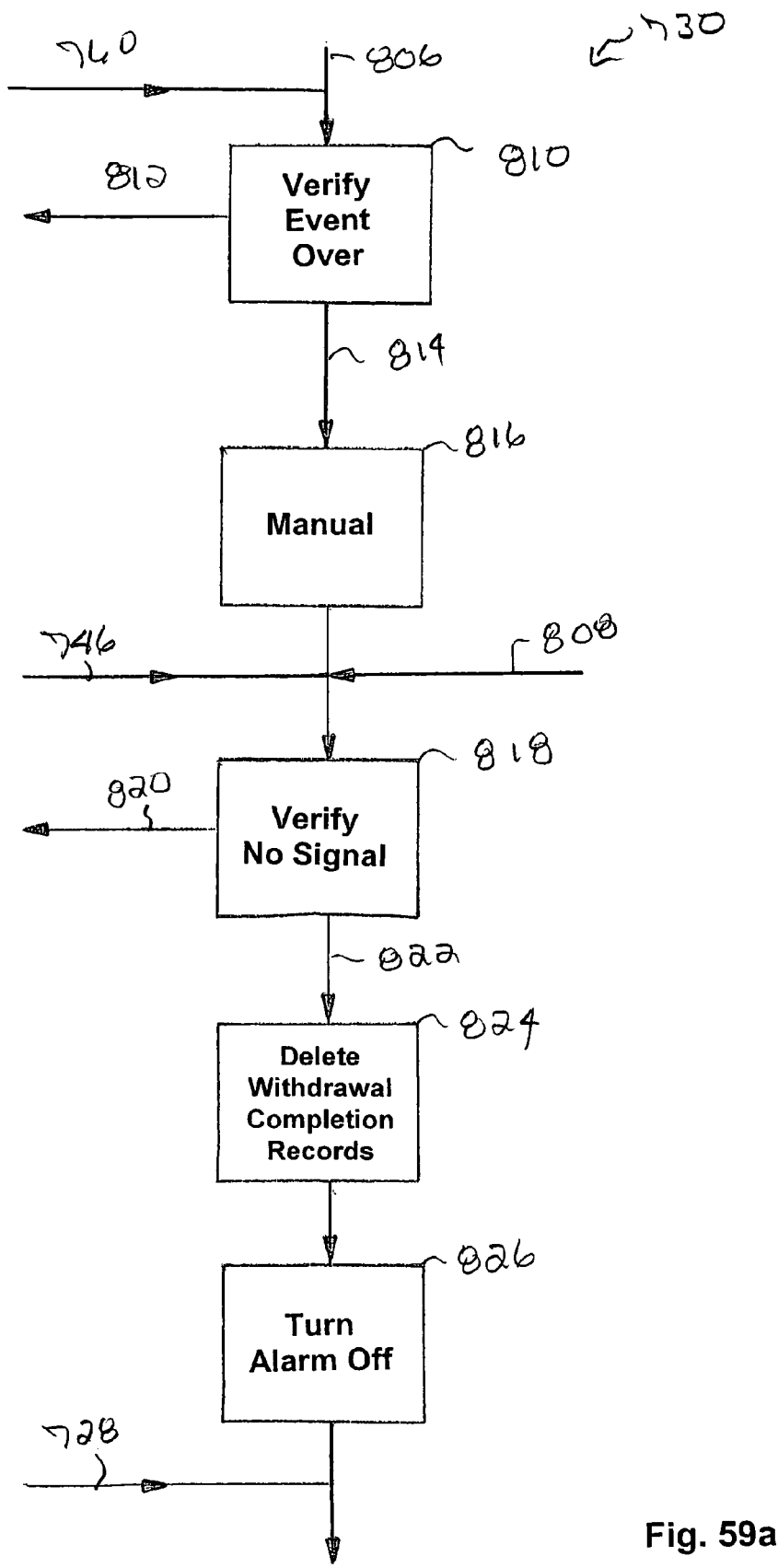
FIGS. 59a and 59b are a flow diagram of the recover from event subroutine of FIG. 54.
Figure 59B:
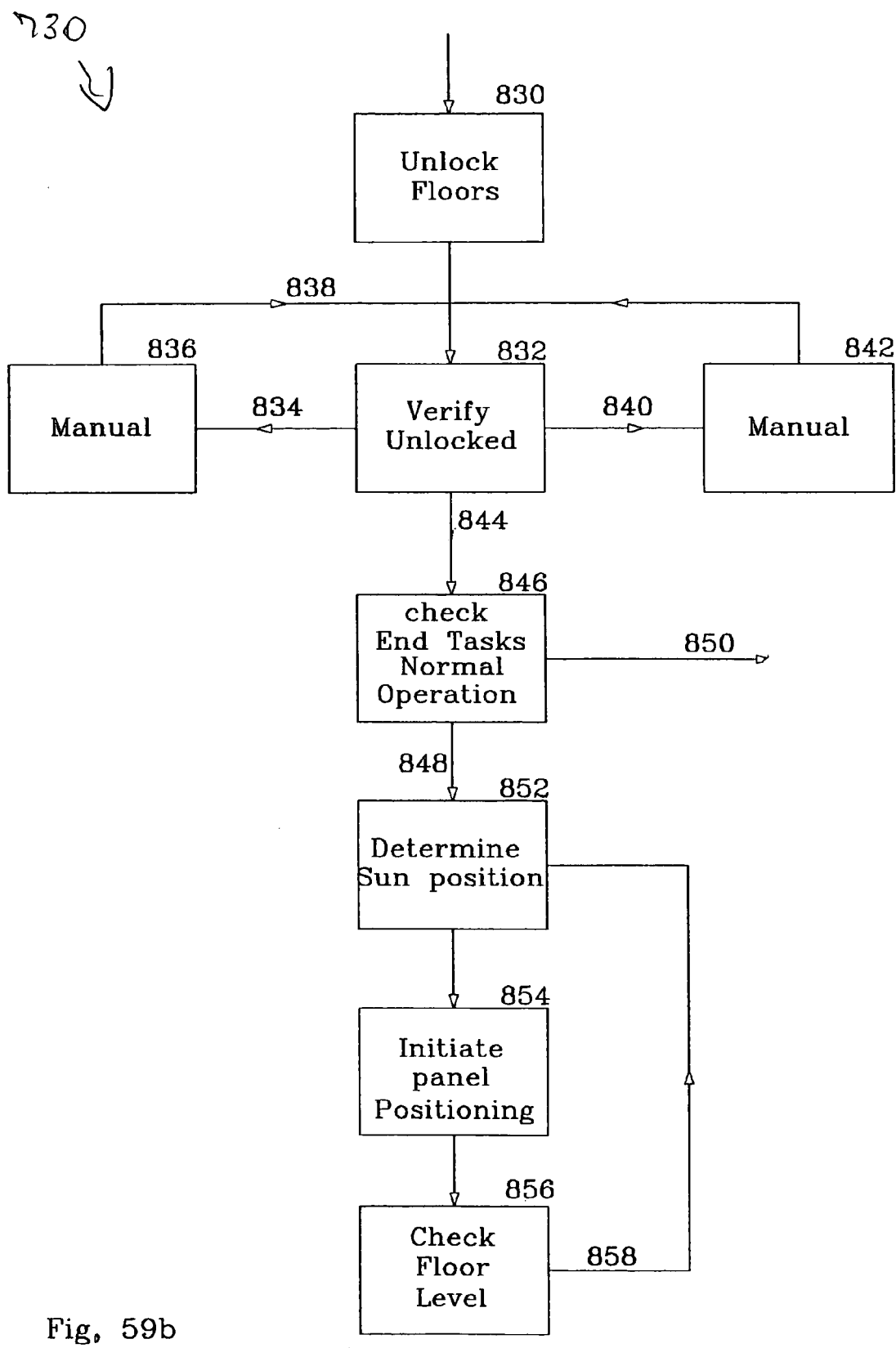

With reference to FIG. 59, the recover from event subroutine 730 starts by verifying 810 that the emergency fault/hurricane event is over by determining the proximity of the parameter source in the same manner as in the verify parameter subroutine 716. If it is determined that the parameter source is not sufficiently far away to preclude damage to the solar power station, the main routine 686 exits 812 the recover from event subroutine 730 and initiates the verify parameter subroutine 716. If it is determined that the parameter source is sufficiently far away 814, a manual entry is made 816, confirmed by appropriate people, that the parameter source event is over and delete the entry in the emergency record.

Next, the recover from event subroutine 730 compares the measured value of the parameter to the predetermined setpoint 818. If the measured value of each source (seismic/high wind force) is greater than the setpoint, the main routine 686 exits 820 the recover from event subroutine 730 to the verify parameter subroutine 716. If the measured value of each source (seismic/wind force) is less than the setpoint 822, the recover from event subroutine 730 then deletes withdraw completion record 824, deletes the entry in the withdraw completion record, stops the emergency procedure function and turns off emergency flashing lighting and the alarm 826.

Then, the recover from event subroutine 730 unlocks 830 all of the floors 288 of each tower 12, 14, 16, the hydraulic pump withdrawing oil from hydraulic jack 560, and then verifies 832 that all of the floors 288 are unlocked by querying locker contact sensors 882 (FIG. 61). If any locked floors 288 are detected 834, the recover from event subroutine 730 starts an alarm 836 to notify the appropriate personnel that floors 288 must be manually unlocked. In this event, the operator(s) use the emergency hydraulic oil pump to withdraw oil from the locking device hydraulic jack 560 and turn off alarm. The recover from event subroutine 730 then re-verifies 838 that all of the floors 288 have been unlocked by querying the locking device contact sensors 882 again. If it is found that the floor 288 is still locked 840, the recover from event subroutine 730 restarts an alarm 842 to indicate that the tower 12, 14, 16 must be inspected and repaired.

If all of the floors 288 of each tower 12, 14, 16 are unlocked 844, then the end normal operation subroutine 846 is checked. If the normal operation concurrent program is still running, then the main routine 686 exits 850 the recover from event subroutine 730 and reenters the beginning of the next cycle of main routine 686 of control system 682. If the normal operation concurrent program is not running 848, then the recover from event subroutine 730 initiates the normal operation programs that include the determine sun position subroutine 852, initiate panel positioning subroutine 854, and check floor level subroutine 856, which normally operate concurrently and in parellel with the control system computer main routine 686. The determine sun position subroutine 852 determines how the solar power panel 19 should be positioned to maximize solar collection. To do this, the main routine locates the sun, verifies the position of all of the floors 288 of each tower 12, 14, 16, using the level sensors 884, and calculates which floor(s) of which tower(s) must be repositioned to properly position the solar power panel 19.

The recover from event subroutine 730 initiates panel positioning subroutine 854, which actuates the hydraulic pump to supply oil to the hydraulic jacks of the computer selected floors 288 or using oil pump push out oil from the hydraulic jacks of the computer selected floors 288 designated above. The recover from event subroutine 730 then initiates check floor level 856 to continuously verify the position of all of the floors 288 of each tower 12, 14, 16, to ensure that the solar power panel 19 is properly positioned. The lever sensors 884 detect the level and send a signal to the computer which verifies that the floors are properly positioned. The computer starts and stops the hydraulic pump as necessary to supply/push out oil to/from the hydraulic jacks of the computer selected floors 288.

What is claimed is:

1. A method of operating a solar power station including a solar panel assembly having a plurality of towers, a substantially planar solar panel pivotally mounted to an upper end of each tower, and a control system, each of the towers having a plurality of floors and being individually extendable from a bottom position to an extended position, the control system including a computer, at least one earthquake sensor and at least one wind sensor, the computer having a main routine stored therein for operating the towers, the main routine comprising:
   a monitor parameter subroutine continually monitoring the earthquake and wind sensors;
   a computer check subroutine continually monitoring the performance of the computer;
   a maintenance check subroutine continually monitoring for maintenance being performed on the control system and providing notice of scheduled maintenance that must be performed; and
   a withdraw towers subroutine initiating withdrawal of the towers to the bottom position when the at least one earthquake sensor or the at least one wind sensor sense a seismic event or a high wind force, respectively;
   wherein the monitor parameter subroutine, the computer check subroutine and the maintenance check subroutine are run concurrently.

2. The method of claim 1 wherein if the computer check subroutine determines that the computer does not appear to be operating properly, the computer:
   initiates an alarm or other signal; and
   initiates computer diagnostics.

3. The method of claim 2 wherein if computer diagnostics verifies that the computer is not operating properly:
   the computer is placed out of service;
   the control system is placed in manual control until the computer is repaired; and
   an operator returns control of the control system to the main routine after the computer is repaired.

4. The method of claim 1 wherein the monitor parameter subroutine:
   displays the values of any wind or seismic force that is sensed;
   compares these value of any sensed wind or seismic force to a predetermined setpoint;
   queries the computer check and maintenance check subroutines to verify that the computer is operating properly and that maintenance is not being performed if the sensed parameter exceeds the setpoint; and
      initiates an alarm or other signal to alert personnel to manually initiate an appropriate action if the computer is not operating properly or maintenance is being conducted; or
      initiates a verify parameter subroutine if the computer is operating properly and maintenance is not being conducted, whereby the verify parameter subroutine attempts to determine the proximity of the sensed wind or seismic force.

5. The method of claim 4 wherein if a seismic event has been sensed, the verify parameter subroutine:
   locates the point of highest wave intensity and the epicenter;
   determines the distance from the solar power station to the point of highest wave intensity and the epicenter;
   queries the computer and appropriate personnel to evaluate the intensity of the seismic force to determine the effect on the solar power station; and
   prompts appropriate personnel to make a manual entry to initiate verifying withdrawal of the towers if the evaluation of the seismic event indicates that the seismic force is likely to damage the solar power station.

6. The method of claim 4 wherein if a high wind force has been sensed, the verify parameter subroutine:
   locates the source of the wind;
   determines the direction and intensity of the wind force;
   prompts appropriate personnel to contact a weather bureau to confirm the direction and intensity of the wind force;
   queries the computer and appropriate personnel to evaluate the effect of the wind force on the solar power station; and
   prompts appropriate personnel to make a manual entry to initiate verifying withdrawal of the towers if the evaluation of the wind force indicates that the wind force is likely to damage the solar power station.

7. The method of claim 4 wherein if the proximity of the wind or seismic force cannot be determined, the verify parameter subroutine
   compares the measured value of the parameter to the setpoint; and
   exits to a recover from event subroutine if the measured value is less than the setpoint; or
   attempts to determine the proximity of the wind or seismic force and evaluates the effect of the wind or seismic force if the measured value is greater than the setpoint
   queries the computer and appropriate personnel to evaluate the effect of the wind force or seismic force on the solar power station; and
   prompts appropriate personnel to make a manual entry to initiate verifying withdrawal of the towers if the evaluation of the wind or seismic force indicates that the wind force is likely to damage the solar power station; or
   automatically initiates verifying withdrawal of the towers if the proximity of the wind or seismic force cannot be determined when the measured value is greater than the setpoint.

8. The method of claim 1 wherein the withdraw towers subroutine:
   initiates an alarm;
   stops all normal operation of the control system;
   determines the position of each floor of each tower with respect to a withdrawn position of the floor; and
   initiates withdrawal of each floor that is not in the withdrawn position.

9. The method of claim 8 wherein the withdraw towers subroutine also:
   verifies that all of the floors have withdrawn;
   initiates an alarm if any non-withdrawn floors are detected; and
   prompts appropriate personnel to manually withdraw non-withdrawn floors that are detected.

10. The method of claim 9 wherein the withdraw towers subroutine further:
   verifies that all of the floors have withdrawn to a level position;

initiates an alarm if any non-level floors are detected; and
prompts appropriate personnel to manually level the non-level floors.

11. The method of claim 10 wherein the withdraw towers subroutine further:
locks the floors of each tower in the withdrawn position;
verifies that all of the floors are locked;
initiates an alarm if any unlocked floors are detected; and
prompts appropriate personnel to manually lock the unlocked floors.

12. The method of claim 11 wherein the main routine further comprises a recover from event subroutine that:
determines the proximity of the seismic event or high wind source;
evaluates whether the seismic event or high wind source is sufficiently far away to preclude damage to the solar power station, exits the recover from event subroutine and initiates the verify parameter subroutine if the seismic event or high wind source is not sufficiently far away to preclude damage to the solar power station;
compares a measured value of the seismic event or high wind force to a predetermined setpoint and exits the recover from event subroutine to the verify parameter subroutine if the measured value is greater than the setpoint; and
if the seismic event or high wind source is sufficiently far away to preclude damage to the solar power station, and the measured value is less than the setpoint, unlocks all of the floors of each tower.

13. The method of claim 12 wherein after floors of each tower are unlocked, the recover from event subroutine also;
verifies that all of the floors are unlocked
initiates an alarm if any locked floors are detected;
prompts appropriate personnel to manually unlock the locked floors; and
if the normal operation program is not running,
    initiates a normal operation program to position the solar power panel, and
    determines how the solar power panel should be positioned to maximize solar collection.

14. A method of operating a solar power station including a solar panel assembly having a plurality of towers, a substantially planar solar panel pivotally mounted to an upper end of each tower, and a control system, each of the towers having a plurality of floors and being individually extendable from a bottom position to an extended position, the control system including a computer, at least one earthquake sensor and at least one wind sensor, the computer having a main routine stored therein for operating the towers, the main routine comprising:
a normal operation subroutine selectively positioning the towers between the bottom position and the extended position to position the solar power panel for maximum solar collection;
a monitor parameter subroutine continually monitoring the earthquake and wind sensors;
a withdraw towers subroutine initiating withdrawal of the towers to the bottom position when the at least one earthquake sensor or the at least one wind sensor sense a seismic event or a high wind force, respectively, that is likely to damage the solar power station; and
a recover from event subroutine returning control from the withdraw towers subroutine to the normal operation subroutine when the seismic event or high wind force is no longer likely to damage the solar power station.

15. A method of operating a solar power station including a solar panel assembly having a plurality of towers, a substantially planar solar panel pivotally mounted to an upper end of each tower, and a control system, each of the towers having a plurality of floors and being individually extendable from a bottom position to an extended position, the control system including a computer, at least one earthquake sensor and at least one wind sensor, the computer having a main routine stored therein for operating the towers, the main routine comprising:
a normal operation subroutine selectively positioning the towers between the bottom position and the extended position to position the solar power panel for maximum solar collection;
a monitor parameter subroutine continually monitoring the earthquake and wind sensors;
a computer check subroutine continually monitoring the performance of the computer;
a maintenance check subroutine continually monitoring for maintenance being performed on the control system and providing notice of scheduled maintenance that must be performed;
a withdraw towers subroutine initiating withdrawal of the towers to the bottom position when the at least one earthquake sensor or the at least one wind sensor sense a seismic event or a high wind force, respectively, that is likely to damage the solar power station; and
a recover from event subroutine returning control from the withdraw towers subroutine to the normal operation subroutine when the seismic event or high wind force is no longer likely to damage the solar power station;
wherein the normal operation subroutine, the monitor parameter subroutine, the computer check subroutine and the maintenance check subroutine are run concurrently.

* * * * *